US012175415B2

(12) United States Patent
Javidan et al.

(10) Patent No.: US 12,175,415 B2
(45) Date of Patent: Dec. 24, 2024

(54) MOBILE DELIVERY VEHICLE MANAGEMENT AND ROUTING

(71) Applicant: Zoox, Inc., Foster City, CA (US)

(72) Inventors: Ali Javidan, Sunnyvale, CA (US); Jesse Sol Levinson, Redwood City, CA (US); Christopher John Stoffel, San Carlos, CA (US)

(73) Assignee: Zoox, Inc., Foster City, CA (US)

( * ) Notice: Subject to any disclaimer, the term of this patent is extended or adjusted under 35 U.S.C. 154(b) by 295 days.

(21) Appl. No.: 17/131,340

(22) Filed: Dec. 22, 2020

(65) Prior Publication Data

US 2021/0256466 A1 Aug. 19, 2021

Related U.S. Application Data

(60) Provisional application No. 62/977,105, filed on Feb. 14, 2020.

(51) Int. Cl.
  *G06Q 10/0835* (2023.01)
  *B60W 60/00* (2020.01)
  (Continued)

(52) U.S. Cl.
  CPC . *G06Q 10/08355* (2013.01); *B60W 60/00256* (2020.02); *G06Q 10/083* (2013.01);
  (Continued)

(58) Field of Classification Search
  CPC ........... G06Q 10/0832; G06Q 10/0833; G06Q 50/30; H04W 4/12; H04W 4/023
  (Continued)

(56) References Cited

U.S. PATENT DOCUMENTS 9,552,564 B1 * 1/2017 Martenis ............ G07C 9/00571
9,767,423 B2 * 9/2017 Lord .................. G01C 21/3438
(Continued)

FOREIGN PATENT DOCUMENTS

WO WO-2016132239 A1 * 8/2016 ........... B64C 39/024

OTHER PUBLICATIONS

Tilk, C., Olkis, K. & Irnich, S. The last-mile vehicle routing problem with delivery options. OR Spectrum 43, 877-904. https://doi.org/10.1007/s00291-021-00633-0 (Year: 2021).*
(Continued)

*Primary Examiner* — George Chen
*Assistant Examiner* — Lisa Ma
(74) *Attorney, Agent, or Firm* — Lee & Hayes, P.C.

(57) ABSTRACT

An autonomous delivery vehicle including locking storage containers may be used for item deliveries, rejections, returns, and/or third-party fulfillment. A delivery vehicle or robot may include a number of locking storage containers, an authorization interface, and one or more sensors to receive delivery requests, detect and authorize users, and control locker access at various delivery locations to allow users to receive delivered items, and reject or return items. The vehicle may also include a passenger compartment to transport one or more passengers. The vehicle may be reconfigurable to accommodate different combinations of lockers and/or passenger seats. An item delivery system may receive delivery requests and determine routes for delivery vehicles, including centralized delivery locations and/or direct deliveries to recipients.

20 Claims, 19 Drawing Sheets

(51) Int. Cl.
*G06Q 10/083* (2024.01)
*G06Q 10/0832* (2023.01)
*G06Q 10/0833* (2023.01)
*G06Q 50/40* (2024.01)
*G07C 9/00* (2020.01)
*H04W 4/02* (2018.01)
*H04W 4/12* (2009.01)

(52) U.S. Cl.
CPC ..... *G06Q 10/0832* (2013.01); *G06Q 10/0833* (2013.01); *G06Q 50/40* (2024.01); *G07C 9/00896* (2013.01); *H04W 4/023* (2013.01); *H04W 4/025* (2013.01); *H04W 4/12* (2013.01)

(58) Field of Classification Search
USPC ......................................................... 705/332
See application file for complete search history.

(56) References Cited

U.S. PATENT DOCUMENTS

| | | | |
|---|---|---|---|
| 10,198,707 B1* | 2/2019 | Bolton | G06Q 10/08355 |
| 10,245,993 B1 | 4/2019 | Brady et al. | |
| 10,303,171 B1* | 5/2019 | Brady | G05D 1/0088 |
| 10,545,509 B1 | 1/2020 | Jessen et al. | |
| 10,613,533 B1* | 4/2020 | Payson | G05D 1/0088 |
| 11,087,267 B1 | 8/2021 | Hatch et al. | |
| 11,157,866 B2* | 10/2021 | Bostick | G06Q 10/08355 |
| 2014/0052661 A1* | 2/2014 | Shakes | G06Q 10/0836 |
| | | | 705/339 |
| 2014/0172734 A1* | 6/2014 | Ginda | G06Q 10/083 |
| | | | 705/330 |
| 2014/0262690 A1 | 9/2014 | Henderson et al. | |
| 2015/0006005 A1 | 1/2015 | Yu et al. | |
| 2015/0154559 A1* | 6/2015 | Barbush | G06Q 10/08355 |
| | | | 705/338 |
| 2016/0342946 A1* | 11/2016 | Herraiz Herraiz | G08G 1/202 |
| 2017/0147959 A1 | 5/2017 | Sweeney | |
| 2017/0352124 A1 | 12/2017 | Semsey et al. | |
| 2018/0024554 A1 | 1/2018 | Brady et al. | |
| 2018/0187460 A1 | 7/2018 | Gordon | |
| 2018/0215376 A1* | 8/2018 | Kuhara | G05D 1/0212 |
| 2018/0232839 A1 | 8/2018 | Heinla et al. | |
| 2018/0300676 A1 | 10/2018 | Peterson et al. | |
| 2018/0311820 A1 | 11/2018 | Fritz et al. | |
| 2018/0349844 A1* | 12/2018 | Bounasser | G06Q 10/0833 |
| 2019/0033856 A1 | 1/2019 | Ferguson et al. | |
| 2019/0033868 A1 | 1/2019 | Ferguson et al. | |
| 2019/0047515 A1 | 2/2019 | Ferguson et al. | |
| 2019/0147401 A1* | 5/2019 | Bash | B64C 39/024 |
| | | | 701/3 |
| 2019/0228375 A1* | 7/2019 | Laury | G05D 1/0088 |
| 2019/0250636 A1* | 8/2019 | Szubbocsev | G05D 1/0291 |
| 2019/0287051 A1 | 9/2019 | Heinla | |
| 2019/0354776 A1 | 11/2019 | Ribeiro et al. | |
| 2020/0090117 A1 | 3/2020 | Luo et al. | |
| 2020/0265383 A1 | 8/2020 | Zhang | |
| 2021/0201261 A1 | 7/2021 | Anderson | |
| 2021/0212455 A1 | 7/2021 | Jung et al. | |
| 2021/0252715 A1 | 8/2021 | Javidan et al. | |
| 2021/0256466 A1 | 8/2021 | Javidan et al. | |
| 2021/0256472 A1 | 8/2021 | Javidan et al. | |
| 2022/0089237 A1 | 3/2022 | Sverdlov et al. | |

OTHER PUBLICATIONS

Office Action for U.S. Appl. No. 17/131,268, mailed on Aug. 30, 2021, Javidan, "Modular Delivery Vehicle With Access Lockers", 17 pages.

The PCT Search Report and Written Opinion mailed in May 27, 2021, for PCT Application No. PCT/US2021/016832, 10 pages.

Bergqvist et al., "The re-design of an electrical distribution moped-Development of a versatile cost-efficientvehicle." MS thesis. 2010. (Year: 2010).

The PCT Search Report and Written Opinion mailed in May 28, 2021, for PCT Application No. PCT/US2021/016832, 10 pages.

Office Action for U.S. Appl. No. 17/131,308, mailed on Jan. 20, 2023, Javidan, "Mobile Delivery System With Secure Access Lockers" 35 pages.

Office Action for U.S. Appl. No. 17/131,308, mailed on Jun. 30, 2023, Ali Javidan, "Mobile Delivery System With Secure Access Lockers", 39 pages.

Office Action for U.S. Appl. No. 17/131,340, mailed on May 15, 2024, Inventor # 1 Ali Javidan, "Mobile Delivery Vehicle Management and Routing," 43 pages.

Office Action for U.S. Appl. No. 17/131,308, Dated Mar. 29, 2024, Javidan, "Mobile Delivery System With Secure Access Lockers".

Office Action for U.S. Appl. No. 17/131,308, Dated Aug. 27, 2024, Javidan, "Mobile Delivery System With Secure Access Lockers".

Office Action for U.S. Appl. No. 17/131,308, Dated Nov. 1, 2023, Javidan, "Mobile Delivery System With Secure Access Lockers".

* cited by examiner

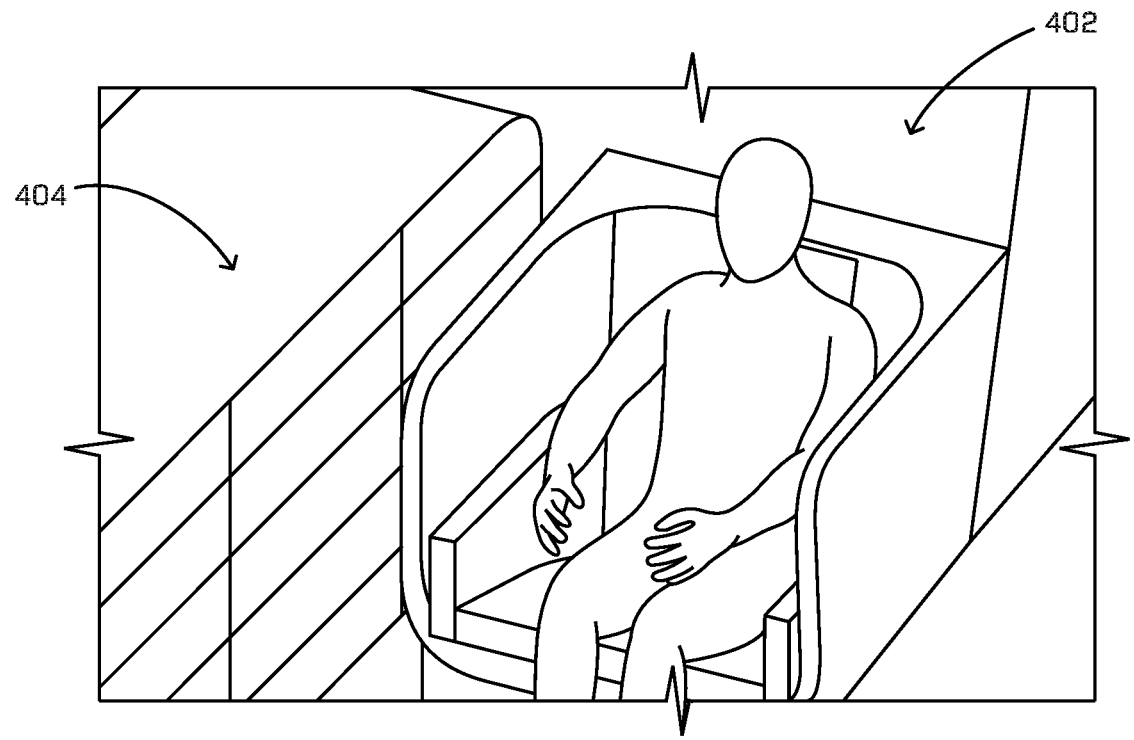
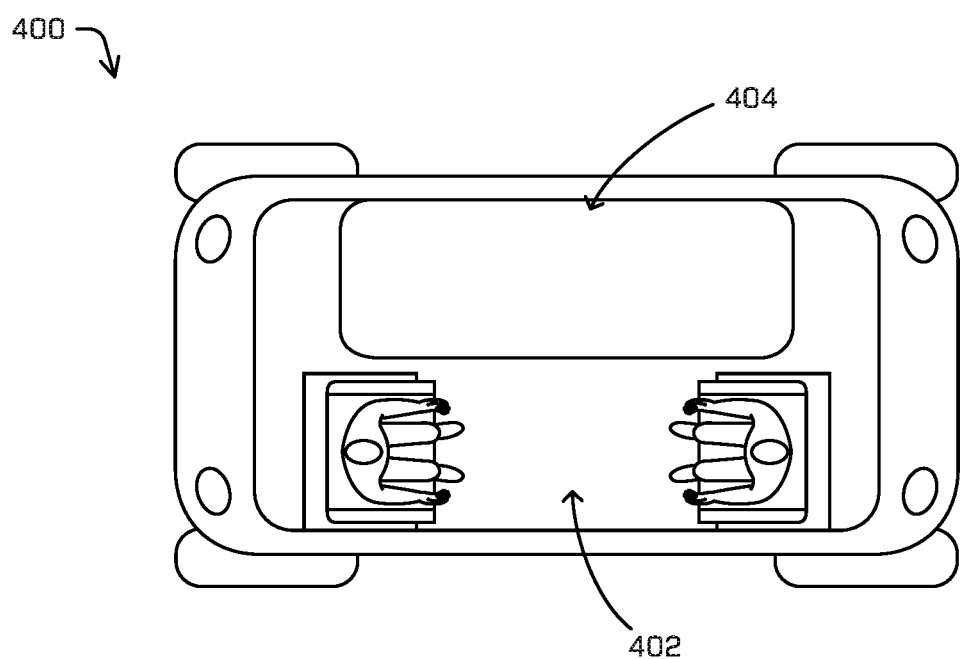
FIG. 4

MOBILE DELIVERY VEHICLE MANAGEMENT AND ROUTING

CROSS-REFERENCE TO RELATED APPLICATIONS

This application claims priority to and is a non-provisional of U.S. Patent Application No. 62/977,105, filed Feb. 14, 2020, and entitled "MODULAR DELIVERY SYSTEMS WITH ACCESS LOCKERS," the disclosure of which is incorporated by reference herein in its entirety for all purposes

BACKGROUND

Delivery services, such as the postal service and various commercial package delivery services, may provide shipping and delivery of goods from senders to recipients at requested home and business delivery locations. In order to deliver large numbers of packages to various delivery locations in a timely manner, a delivery service may maintain a fleet of delivery vehicles with drivers that drive delivery routes and physically deliver packages. Significant resources may be required for a delivery service to maintain and coordinate a fleet of delivery vehicles and drivers, as well as to track and verify the successful delivery of packages to their intended recipients. Package delivery services face additional challenges when delivering valuable, secure, or perishable goods, in that deliveries of such goods are often left on the recipient's doorstep or delivered to someone other than the intended recipient at the delivery address.

As an alternative delivery option, some delivery services may provide hubs of secure storage lockers at fixed locations around populated urban and residential areas. Such locker hubs may include self-service kiosks to allow the recipient to access an appropriate locker containing the recipient's package. However, such locker hubs may be costly to build and operate, and do not eliminate the need to maintain fleets of delivery vehicles and drivers, or the need for advanced package delivery routing and coordination systems. Fixed-location locker hubs also may be inconvenient to recipients and may increase delivery times, by requiring the recipient to preselect a locker hub location, then visit the selected locker hub location on one or more appointed days during regular business hours or other specific time windows during which access to the locker hub is permitted.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 1 illustrates an example delivery vehicle with access lockers, in accordance with implementations of the disclosure.

FIG. 4 depicts an example delivery vehicle including a passenger compartment and a set of lockers, in accordance with implementations of the disclosure.

DETAILED DESCRIPTION

Figure 1:
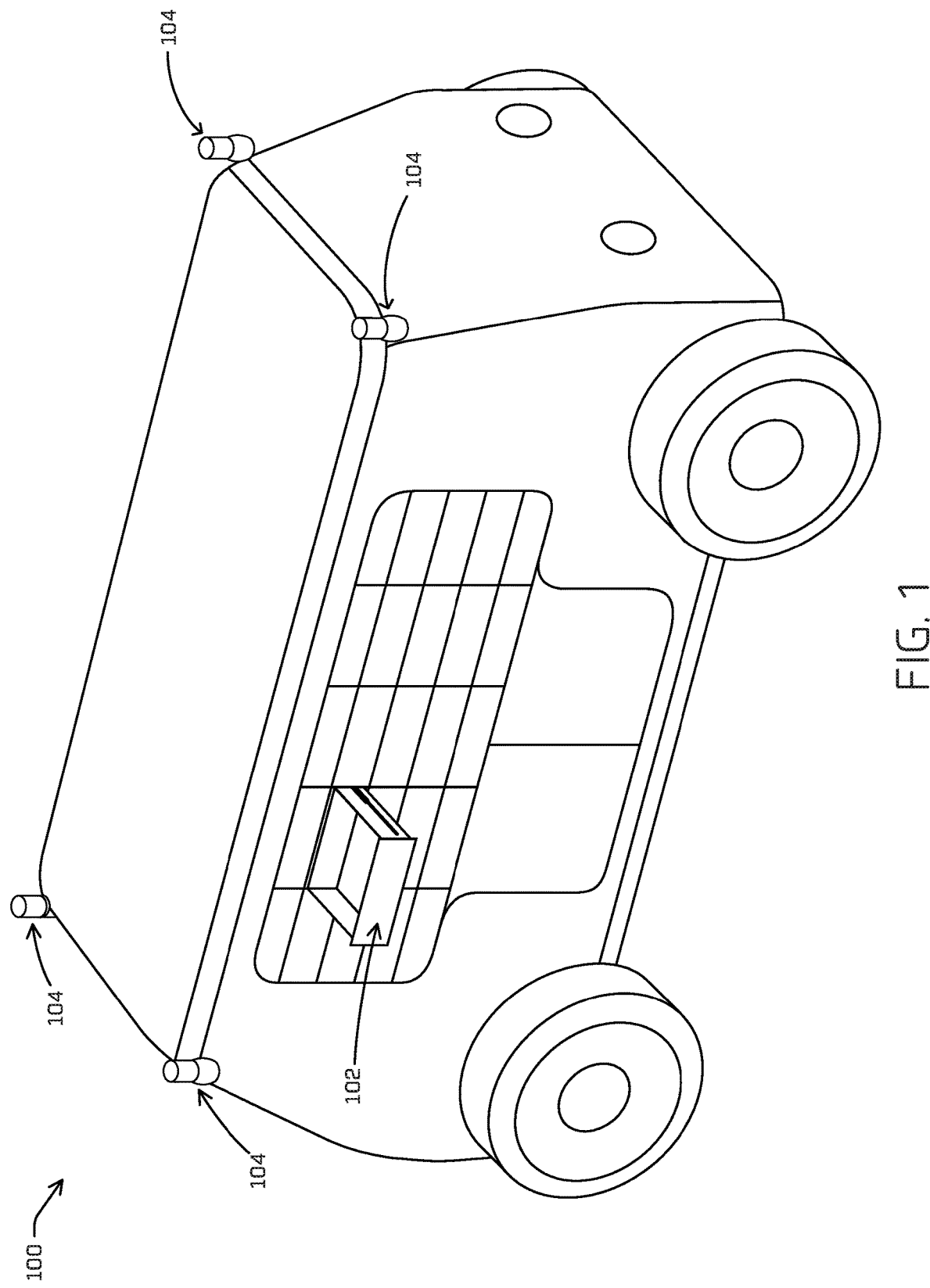
FIG. 1 illustrates an example process of determining and using a perception error probability distribution for an objects detected in an environment, in accordance with implementations of the disclosure.

The techniques discussed herein may relate to item access and delivery systems including autonomous delivery vehicles used to provide access to and/or deliver physical items to recipients. Autonomous delivery robots (which also may be referred to as delivery vehicles) may include locking storage containers to hold packages and other items for delivery to recipients at requested times and locations. In some examples, a delivery vehicle may drive a delivery route including a number of delivery locations. The delivery locations can be predetermined and scheduled, or can be determined on the fly (e.g., upon request, based on items remaining in the lockers, based on proximity to users that have items in the lockers (or items that may be generally stocked in the lockers-groceries, apparel, etc.), etc.). In some examples in which such delivery locations are optimized for a plurality of users (as determined by position, request, etc. from the multiple users), the delivery vehicle may stop at each location for a time window, during which multiple users may access the delivery vehicle at the single location to retrieve their items. Of course, in other examples, such delivery locations may be unique, and proximate to a requested location, of an individual user. Delivery locations and time windows may be determined based on delivery request data received from recipients, and multiple recipients may meet a delivery vehicle at a common nearby location. In other examples, delivery vehicles may deliver items directly to recipient locations, such as home or business addresses. In still other examples, items may be delivered to a user at their current location when the user orders a ride from a pickup location to a destination location. For instance, when a delivery vehicle arrives to pick up the user at the pickup location, the vehicle (or robot) may bring with it one or more items that have been designated for delivery to the user. In any of the various examples described, the lockers, portions of the lockers, or contents thereof may be reconfigured within a fleet of such vehicles, either in general determined locations or in warehouses specifically configured to facilitate transfer of goods, to further optimize the delivery process based on changes in users, changes in user requests, returns, etc. Delivery vehicles and/or item delivery systems also may provide real-time tracking and notifications to allow recipients to efficiently locate and access the delivery vehicle.

During an item delivery or return, a delivery vehicle and recipient mobile device may interact to schedule deliveries, track one another, and authorize/validate access requests from the recipient to retrieve items from the lockers of the delivery vehicle. For example, a delivery vehicle may receive a locker access request from a nearby mobile device, and may validate the request based on a mobile device identifier, information received from the recipient via the mobile device (e.g., a user identifier, order identifier, etc.), information received at or detected by the vehicle (e.g., proximity of user device to the vehicle, biometric information, etc.), and/or the current location of the delivery vehicle and user. In response to a successfully validated request, the delivery vehicle may unlock and/or open the appropriate locker to allow the recipient to remove the item(s) designated for delivery to that recipient. In some examples, the delivery vehicle may perform similar techniques to allow users to inspect and reject deliveries, or to return items from previous deliveries.

Autonomous delivery vehicles used in the examples discussed herein may include various configurations of lockers and features to support deliveries of different item sizes, shapes, and transportation requirements. For example, lockers may have self-actuating doors, pressure/weight sensors, cameras and/or other sensors to detect removal of items from and placement of items into the lockers. Security and privacy features integrated within the delivery vehicle and/or the individual lockers may allow recipients to inspect and accept/reject delivered items, as well as preventing unauthorized access and tampering. In some examples, a set of locker containers may be constructed as a modular locker cassette which is attachable and detachable to the vehicle to facilitate loading and unloading items from the lockers.

Delivery processes performed and managed by an item delivery system may be initiated by a delivery request (e.g., order or purchase) of an item by a recipient. In various examples, recipients may interact with merchant systems and/or delivery systems to request item deliveries, schedule deliveries, and track delivery vehicles. Item delivery systems may control a fleet of autonomous delivery vehicles to pick-up items from merchants and drive delivery routes determined based on recipient data. While a delivery vehicle is driving a delivery route, the item delivery system may allow recipients to track delivery vehicles, and vice versa, and may transmit notifications and updates to recipient mobile devices to facilitate deliveries. In some instances, to provide additional security and privacy for item pick-ups and deliveries, tracking capabilities may be configurable by item senders and/or recipients to limited tracking to one-way or two-way tracking, to limit tracking to generalized regions and/or based on proximity to specified delivery locations. In at least some such examples, users may request a stop location change (e.g., an update to a previous request) based on current tracking information. In those examples in which two-way tracking is utilized, the vehicle may suggest one or more preferred delivery locations to rendezvous with the customer based on aggregate optimization over users and items to be delivered (which may include passengers).

The item delivery system may determine delivery routes for autonomous delivery vehicles, based on delivery request data received from recipients. In some delivery routes, the delivery vehicle may drive directly to recipient locations for deliveries, while other routes may use shared/common delivery locations (or delivery hubs) that may be conveniently accessible to multiple recipients. The item delivery system may determine an optimal delivery route depending on the recipient data associated with the items contained within the delivery vehicle, including the requested or possible delivery locations for the recipients (e.g., homes, offices, etc.), delivery time requests, item characteristics, and/or item delivery priority. Determinations of delivery routes may include determining an optimal number of delivery locations, optimal positions for delivery locations, and/or optimal delivery time windows for each location. Such optimizations may be based at least in part on (either for a particular vehicle or for the fleet as a whole) one or more of minimizing a number of stops, minimizing an amount of energy (fuel, electricity, etc.), minimizing wait times/numbers of users, minimizing distance to a user's current, preferred, or requested point of delivery, or the like. In some examples, delivery routes may be designed to intersect the driving routes of passenger vehicles or robots carrying a recipient of an item being transported by the delivery vehicle. Item delivery systems also may perform on-the-fly modifications to delivery routes, for example, based on previous successful or unsuccessful deliveries during the route, and/or based on delivery request changes or cancelations from recipients received during the route.

These techniques and others discussed herein may improve systems and processes for delivery of physical items to recipients in several respects. For example, item delivery systems including autonomous delivery vehicles may improve delivery efficiency and convenience by providing multiple delivery options to recipients, including multi-stop delivery routes, direct delivery options, tracking and notifications, and on-the-fly delivery modifications. The use of delivery vehicles also may assure that items are delivered to verified recipients in-person, rather than being left on doorsteps or with people other than the intended recipient. The locking containers of the delivery vehicles may be designed to safely and securely store items for delivery, thus reducing or eliminating the need for the items to be boxed and packaged for transportation and delivery. Autonomous delivery vehicles also may improve the speed and efficiency of item rejections and returns, by eliminating the need for users to re-package and re-ship items, or to return items in-person to a retail location.

The techniques described herein can be implemented in a number of ways. Example implementations are provided below with reference to the figures. Example implementations are discussed below in which the delivery vehicles are implemented as autonomous vehicles. However, the methods, apparatuses, and systems described herein can be applied to fully or partially autonomous delivery vehicles, robots, and/or robotic systems and are not limited to autonomous vehicles. Moreover, at least some of the techniques described herein may be utilized with driver-controlled vehicles. Also, while examples are given with respect to land vehicles (e.g., cars, vans, trucks, or other wheeled or tracked vehicles), the techniques can also be utilized in an aviation or nautical contexts.

For ease of description, this application is divided into the following sub-sections:
Delivery Vehicle Design and Operation
Item Delivery System
Item Delivery Scenarios
Delivery Vehicle Routing However, these sub-sections are not meant to be limiting. For instance, any of the examples described in any of these sub-sections can be used in combination with any one or more of the other examples in the respective sub-section and/or in combination with any one or more of the examples described in any or all of the other sub-sections.

Delivery Vehicle Design and Operation

Certain techniques described herein relate to the use of autonomous delivery vehicles with locking storage containers to deliver items to recipients at delivery locations. In various examples, the locking storage containers (or lockers) within a delivery vehicle may be loaded with one or multiple items for delivery to one or more recipients at specified delivery times and locations. The delivery vehicle may drive delivery routes and interact with recipients, on-route and/or at delivery locations, to provide recipients with access to the appropriate items. Examples of autonomous vehicles and methods and systems for operating autonomous vehicles can be found in U.S. patent application Ser. No. 14/932,959, filed Nov. 4, 2015 (now U.S. Pat. No. 9,606,539), which is incorporated herein by reference. Examples of techniques for coordination of dispatching and routing of a fleet of autonomous vehicles can be found in U.S. patent application Ser. No. 14/756,996, filed Nov. 4, 2015 (now U.S. Pat. No. 9,958,864), which is incorporated herein by reference. In some examples, autonomous delivery vehicles according to this application may be dispatched, routed, and/or controlled in accordance with aspects of the foregoing applications.

FIG. 1 shows an example delivery vehicle 100 including multiple lockers 102 (which also may be referred to as locking containers or receptacles) used to transport and deliver items. In some instances, the delivery vehicle 100 may be an autonomous vehicle configured to operate according to a Level 5 classification issued by the U.S. National Highway Traffic Safety Administration, which describes a vehicle capable of performing all safety-critical functions for the entire trip, with the driver or occupant (if any) not being expected to control the vehicle at any time. However, in other examples, the delivery vehicle 100 may be a fully or partially autonomous vehicle having any other level or classification, or may be a manually drive vehicle. It is contemplated that the techniques discussed herein may apply to more than robotic control, such as for autonomous vehicles. For example, the techniques discussed herein may be applied to mining, manufacturing, agriculture, etc. Moreover, even though the delivery vehicle 100 is depicted as a land vehicle, delivery vehicle 100 may be an aircraft, spacecraft, watercraft, and/or the like. In some examples, delivery vehicle 100 may be represented in a simulation as a simulated vehicle. For simplicity, the discussion herein does not distinguish between a simulated vehicle and a real-world vehicle. References to a "vehicle" or "robot" may therefore reference a simulated and/or a real-world vehicle or robot. The configuration of the lockers 102 in this example is merely illustrative and, in other examples, the number, shape, size and/or locations of lockers may vary based on a variety of factors, such as a size and/or type of vehicle (e.g., car, truck, van, bus, aerial vehicle, aquatic vehicle, etc.), a number and/or size of items to be delivered, a nature of items to be delivered (e.g., electronics, clothing, prepared/hot foods, refrigerated foods, medicine, etc.), whether the vehicle will also be transporting passengers, etc.

As discussed below in more detail, delivery vehicle 100 may be routed by an item delivery system to a pickup location, at which lockers 102 may be loaded with items for delivery to recipients. Upon reaching a delivery location, the delivery vehicle 100 may receive a request for locker access from a recipient, and may open the appropriate locker(s) 102 to provide the recipient with access to the requested items. A delivery vehicle 100 may receive and validate requests for locker access (e.g., authenticate the user and verify the user's access permissions) based on, for example, communications with the recipient's mobile device, so that lockers 102 may remain closed and locked until the request has been successfully validated. For instance, the delivery vehicle 100 can short-range user authentication techniques such as facial recognition, fingerprint scanning, voice recognition, iris recognition, and/or proximity of mobile device (e.g., via Bluetooth, NFC, RFID, etc.) as part of an authorization process for a locker access request. In some examples, delivery vehicle 100 may include sensors 104, installed within view of but outside of the lockers 102 on the delivery vehicle 100, which may be activated to detect and capture images/video of items being removed from and inserted into the locker 102. Sensors 104 may include, for example, cameras, motion sensors, lidar sensors, radar sensors, sonar sensors, combinations or assemblies of any or all of these or other sensor modalities, and may be installed with field(s) of vision that cover both the lockers 102 and the area in the proximity of the delivery vehicle 100 to detect approaching users. For instance, sensors 104 may include cameras used to capture images of users interacting with the lockers 102, and to identify or authenticate the users as valid recipients. Although four (4) sensors 104 are shown in this example, any number of one or more sensors 104 may be used in other examples. Also, each sensor 104 may represent multiple individual sensors of the same or different modalities of sensor. For instance, each sensor 104 shown in FIG. 1 may represent an assembly comprised of multiple cameras and multiple lidar sensors oriented at different angels to provide coverage of an area surrounding a body of the vehicle. After delivering items to recipients, the delivery vehicle 100 may return (e.g., autonomously or at the direction of an item delivery system) to a warehouse or other pick-up location to be reloaded and dispatched for additional item deliveries.

Figure 2:
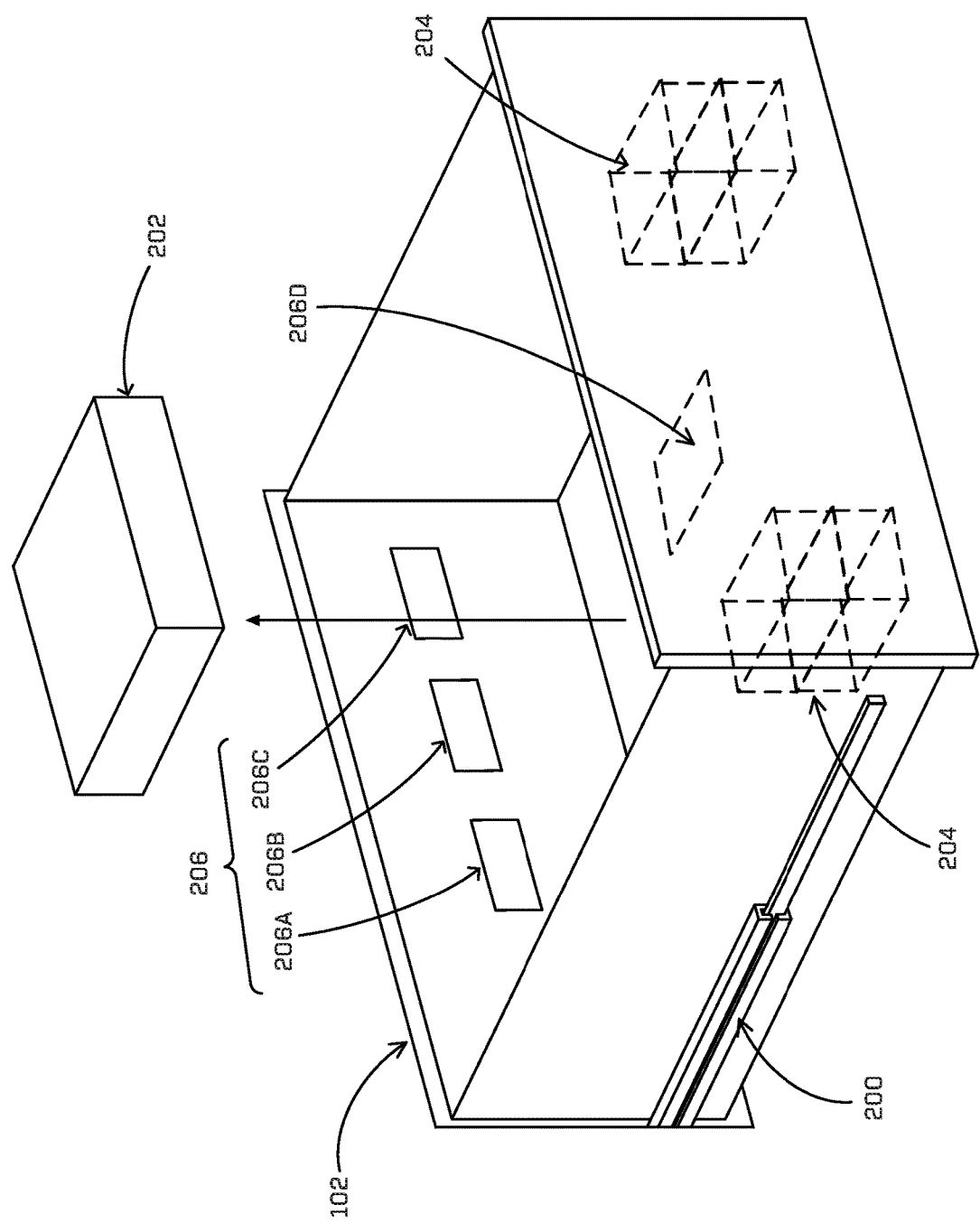
FIG. 2 depicts an example of access locker of a delivery vehicle, in accordance with implementations of the disclosure.

FIG. 2 shows an example of the locker 102 of delivery vehicle 100 in more detail. As shown in this example, locker 102 may slide out from the body of the delivery vehicle 100 along a track 200 to provide the user with access to an item 202 housed in the interior of the locker 102. In other examples, locker 102 may include a hinge and locking mechanism so that the locker door swings open to the side (or swings up or down) rather than the locker sliding out from the vehicle. Lockers 102 may include automated locking/unlocking mechanisms which may receive control signals from the delivery vehicle 100, and/or from an external computing device such as an item delivery system or from a recipient mobile device, to control the locking and unlocking of the locker 102. A locker 102 also may be self-actuating in some examples, including a motor to drive the door and/or container tray into the opened or closed position, in response to control instructions received from the delivery vehicle 100 and/or from a remote computing system.

Lockers 102 may be designed and built in any size, shape, or configuration capable of being transported by the delivery vehicle 100. As shown in FIG. 1, a delivery vehicle 100 may include lockers 102 of various different sizes and shapes, including smaller lockers 102 for delivery of smaller items, and larger lockers 102 for delivery of larger items. In various examples, delivery vehicles 100 may include various numbers of small lockers 102 capable of storing only small items (e.g., envelopes, USB drives, power adaptors, etc.), medium lockers 102 capable of storing medium-sized items (e.g., clothes, shoes, electronics, toys, etc.), and/or large lockers 102 capable of storing large items (e.g., furniture, suitcases, skis, golf clubs, etc.). A delivery vehicle 100 may be configured with a set of lockers 102 having any combination of locker numbers, sizes, and shapes, depending on, among other things, the items to be delivered by the delivery vehicle 100, and the size and weight load capacity of the delivery vehicle 100.

In at least some examples, the lockers may be dimensioned based at least in part on one or more lockers of a particular size. As a non-limiting example, a medium locker may have the same dimensions as two small lockers, whereas a large locker may have the dimensions of three small lockers. Of course, any shape and configuration based on such a minimum set of locker dimensions (including multiple "unit" locker dimensions) is contemplated. In such an example, such a design allows for easily reconfiguring a set of lockers to be optimized for the items stored therein.

Certain lockers 102 also may include special features for transportation of particular types of items. For example, lockers 102 may include various internal features 204 used for storage and transportation of fragile items, sensitive items, temperature-controlled items, etc. Such internal features 204 are represented generically within the locker 102, but may include structures of various sizes, shapes, and functions used for storing and transporting items. For instance, locker 102 may include features 204 for securing items 202, such as padding, netting, tie-downs and/or anchors for transporting fragile items. In some instances, lockers 102 may be temperature controlled for transporting perishable food or other temperature sensitive items. For instance, a locker 102 may be a refrigeration locker or a freezer locker for storing and transporting perishable food items. Locker 102 also may include a temperature control system (e.g., heating element(s), thermostat, insulation, etc.) to maintain the interior of the locker 102 at a predetermined temperature during transport for keeping prepared foods warm or hot. In other examples, the sound, scent, and lighting conditions within lockers 102 may be controlled for transportation of pets or other specialty items.

Lockers 102 may include one or more sensors 206A, 206B, 206C, and 206D (collectively "sensor(s) 206") in some examples, which may be installed on the interior or exterior of the locker 102. The sensor(s) 206 indicated in FIG. 2 may represent, for example, one or more cameras, internal and/or external lights, motion sensors, weight sensors, bar code scanners, biometric scanners (e.g., finger print scanners, retinal scanners, etc.), or the like. The sensors 206 may be integrated within a locker 102 and/or may be installed on an interior or exterior surface of the locker 102, or on the delivery vehicle 100 outside of the locker 102, to monitor the locker's contents, facilitate and verify pick-up or return of items, detect locker tampering attempts, etc. For example, when a locker access request is received from an authorized user, the locker(s) 102 designated for that user may be illuminated with external and/or internal lights. Sensors 206, such as motion sensors and/or cameras may be installed within a locker 102 to detect and capture images/video of items being removed from and inserted into the locker 102. The locker 102 also may include weight sensors within floor of the locker 102, to verify when items have been removed from or placed into the locker 102. Such sensors 206 may also be used in reconfiguration locations (e.g., warehouses) in which the locker contents are loaded and/or the lockers are reconfigured (including in between vehicles) to ensure that the proper contents are transported in the correct vehicle.

The delivery vehicle 100 may include one or more wireless network interfaces and/or wireless transceivers, to communicate with remote item delivery systems as well as the mobile devices of users accessing the lockers 102. For example, a delivery vehicle 100 may include one or more network interfaces to support long-range communications, including but not limited to cellular and/or WiFi interfaces for network communication via LAN/WLAN, Internet, Internet-of-Things (IoT) networks, etc. Additionally or alternatively, the delivery vehicle 100 may include one or more interfaces for short-range wireless communications with user mobile devices, including but not limited to Bluetooth, near field communication (NFC, Zigbee, etc. Delivery vehicle 100 also may include a global positioning system (GPS) receiver and/or other location and motion sensors, to enable to delivery vehicle 100 to detect and transmit its current location and motion. In various examples, discussed in more detail below, delivery vehicles 100 may use long-range network interfaces and protocols to receive and respond to delivery requests, delivery route modifications, etc., while using short-range network interfaces and protocols to receive and respond to locker access requests from mobile devices in the immediate proximity of the delivery vehicle 100. Additionally or alternatively, the delivery vehicle 100 may use long-range communication networks for interactions with nearby recipients. For instance, a user may use a mobile device to send an access request to an item delivery system and/or vehicle routing system, which may relay the message to the delivery vehicle 100. Similarly, the delivery vehicle 100 may transmit communications (e.g., authorization requests) to the item delivery system and/or vehicle routing system, which may relay the communications to the recipient's mobile device.

The delivery vehicles 100 themselves may include additional lights, cameras, motion sensors, infrared sensors and/or various other sensors to detect and identify users and other objects in the proximity of the delivery vehicle. For example, the delivery vehicle 100 may activate motion lights and/or cameras in response to detecting an approaching user, for the convenience of the authorized users and/or to deter unauthorized users from tampering with the delivery vehicle 100. The delivery vehicle 100 also may include automated alarm systems (e.g., siren alarms, alarm transmissions to law enforcement, etc.) which may be activated in response to tampering, vandalism, or theft attempts at the delivery vehicle 100. In some examples, the delivery vehicle 100 also may include security features such as automatic closing and locking of all lockers 102, and/or driving the delivery vehicle 100 to a different location in response to a threat detected via the sensors (e.g., impact to the vehicle, detection of nearby persons holding weapons, etc.).

FIGS. 3A-3G illustrate examples of a modular delivery vehicle 300. In some examples, any delivery vehicle 100 may be implemented using a modular vehicle construction as shown in the delivery vehicle(s) 300 shown in FIGS. 3A-3G. Modular delivery vehicles 300 may comprise relatively few assemblies, or "modules," that are mated during a final assembly step or process. In some examples, a vehicle 300 may be assembled from two main types of modules, for example, a body (or locker) module and a drive module (e.g., at least one drive module at one end of the locker module). Some examples of a modular vehicle architecture including a body module and multiple drive modules which may, in some examples, be used in connection with the instant delivery vehicle can be found in U.S. patent application Ser. No. 15/674,688, filed Aug. 11, 2017, which is incorporated herein by reference.

In some examples, a single type of drive module may be used with different types of locker modules, further reducing complexity. For instance, different models of locker modules may be constructed containing different numbers, types, configurations, and features of lockers 102, where each different locker module nonetheless may be compatible with the same drive module(s), thus allowing for more efficient item loading, and for locker module interchangeability depending on the types of items to be delivered. Modular designs may provide advantages for design and construction of delivery vehicle, including allowing the vehicle assembly plant to be more simple, compact, and inexpensive to construct and maintain. In addition, inventory management may be simplified as the assembly plant need only maintain the few modules used to assemble the vehicle in inventory.

The modular construction described herein also may improve the efficiency of item delivery and the serviceability of the delivery vehicles 300. For instance, locker modules (or cassettes) may be preloaded with items for delivery at a warehouse or fulfillment center, and then attached to the drive module after the loading process is completed, thus decreasing the amount of idle time of the drive modules which may improve delivery efficiency. Additionally, in the event of a failure or fault with a component of a single drive module or locker module, the faulty module can be simply and quickly removed and replaced with another module. For instance, if a fault occurs with a motor, battery, or other major system of a drive module, the drive module may be removed from the vehicle and replaced with another drive module. The replacement of a module may be performed by service personnel, an automated service robot (or robotic cart, as discussed below), or a combination thereof.

Figure 3A:
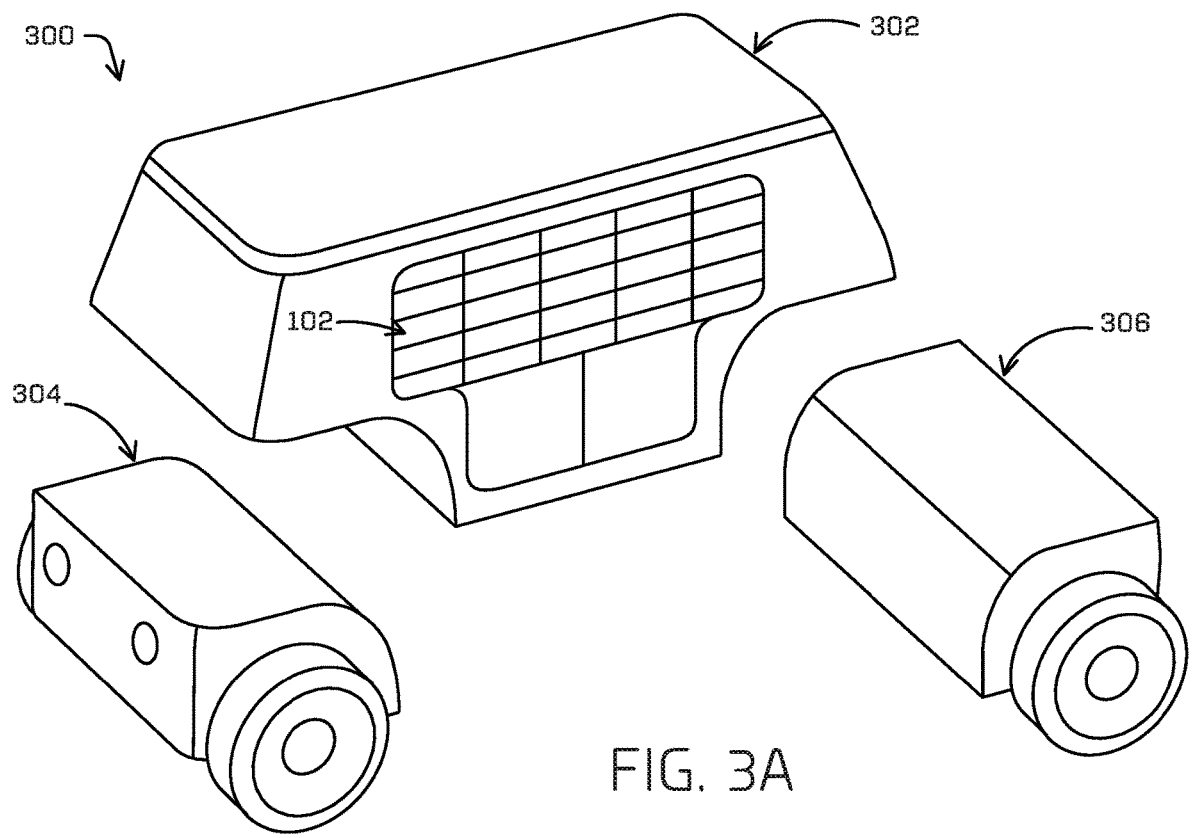
FIGS. 3A-3G depict examples of a modular delivery vehicle, in accordance with implementations of the disclosure.
Figure 3B:
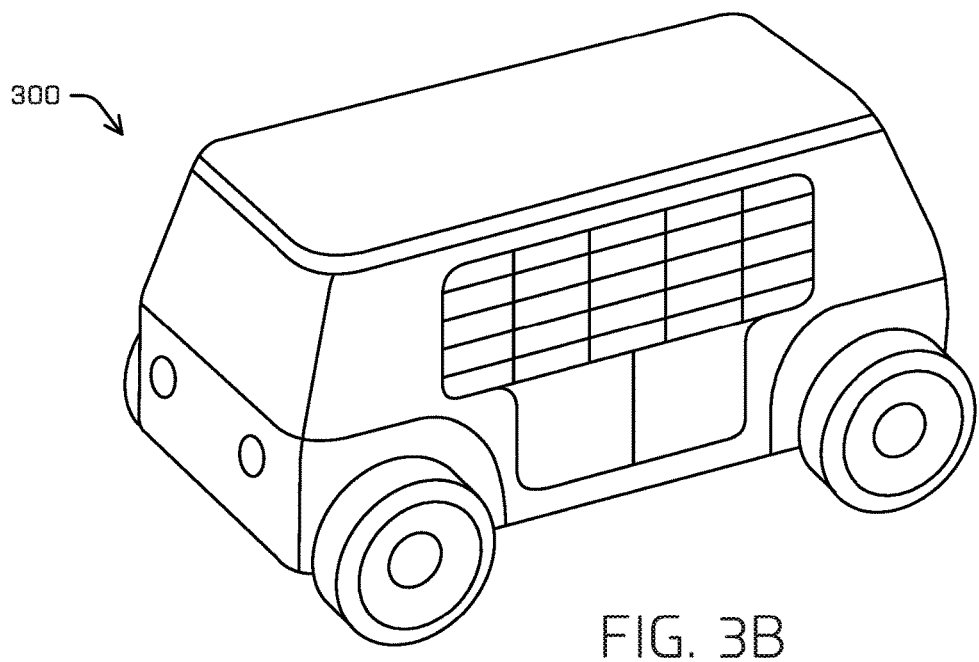

As shown in FIGS. 3A and 3B, a modular delivery vehicle 300 may be constructed comprising a body 302, a first drive assembly 304, and a second drive assembly 306, which can be assembled and disassembled horizontally and/or vertically. In this configuration, the vehicle body 302 may comprise the locker module (or cassette), and the drive assemblies 304, 306 may move and steer the vehicle, among other things. The first drive assembly 304 and/or the second drive assembly 306 can comprise, for example, one or more motors, internal combustion engines, fuel cells (or other power sources), differentials, controllers, steering systems, braking systems, heating, ventilation, and air conditioning (HVAC) systems, etc. The drive assemblies 304, 306 and the body 302 can be designed to mate precisely such that fluids, electronics, HVAC vents, and other functions between the subassemblies can be connected and disconnected using automated equipment and with little, or no, fluid loss.

Figure 3C:
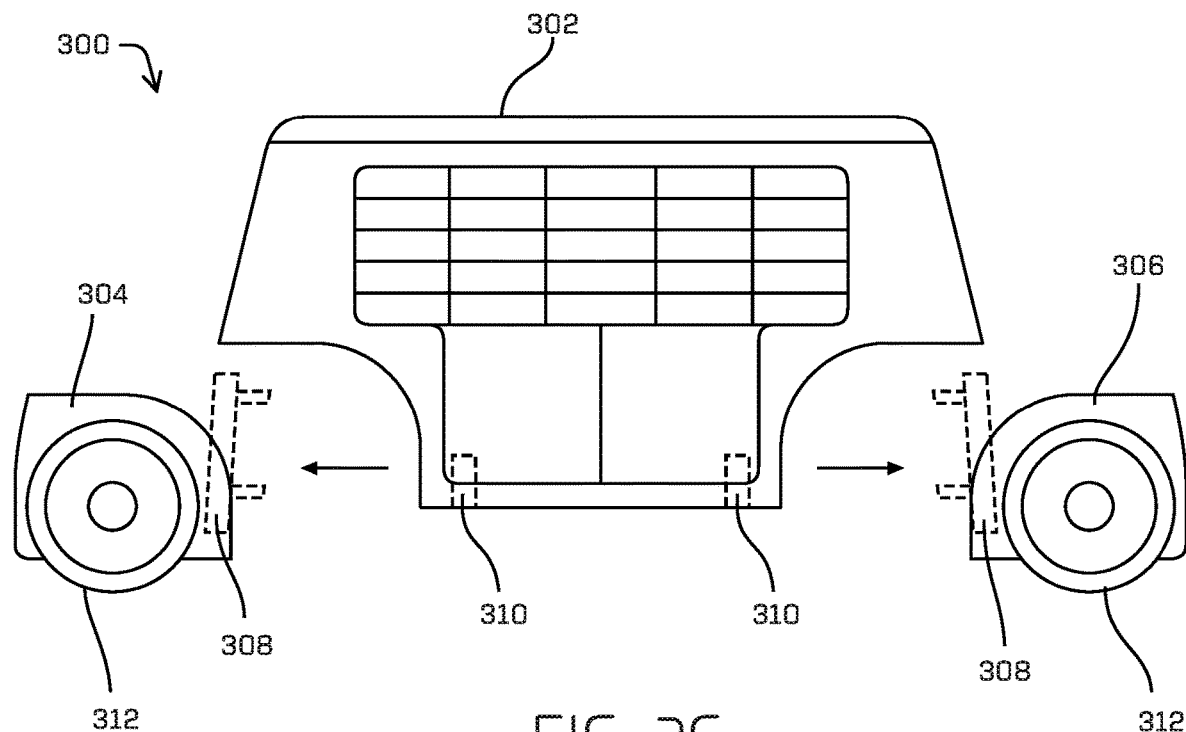
Figure 3D:
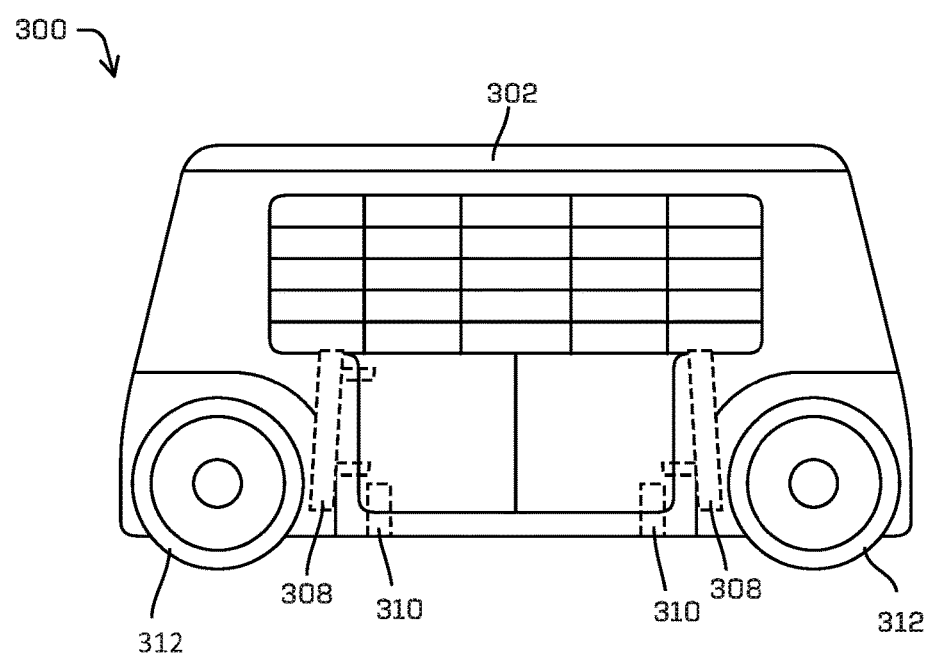

As shown in more detail in FIGS. 3C and 3D, the drive assemblies 304, 306 may be coupled to the body 302 through the use of automated machinery, such as automatic torque wrenches, robots, and/or robotic carts, as discussed below. In some examples, the fasteners may be "hidden," such that they are not visible during normal use. In some examples, the drive assemblies 304, 306 may be attached to the body 302 without penetrating the any of the lockers 102 or passenger compartment contained within the body 302. This can reduce water and air infiltration, reduce noise, reduce corrosion, improve structural rigidity, and avoid tampering, among other things. In some examples, the system may insert, tighten, and torque the fasteners in a single step to improve efficiency, without the need for grommets, covers, fascia, or other accessories.

To this end, a fastening system 308 can be used to non-destructively couple the drive assemblies 304, 306 to the body 302. As shown, the fastening system 308 can be attached to the drive assemblies 304, 306 and can be substantially hidden from view in the assembled state. The fastening system 308 can include one or more mechanisms to turn or otherwise activate one or more fasteners to removably secure the drive assemblies 304, 306 to the body 302. In addition, the fastening system 308 and fasteners can be substantially hidden from view when assembled, obviating the need for additional steps or parts (e.g., seals or aesthetic covers) and preventing tampering or attempts to access items stored in the lockers 102.

Figure 3E:
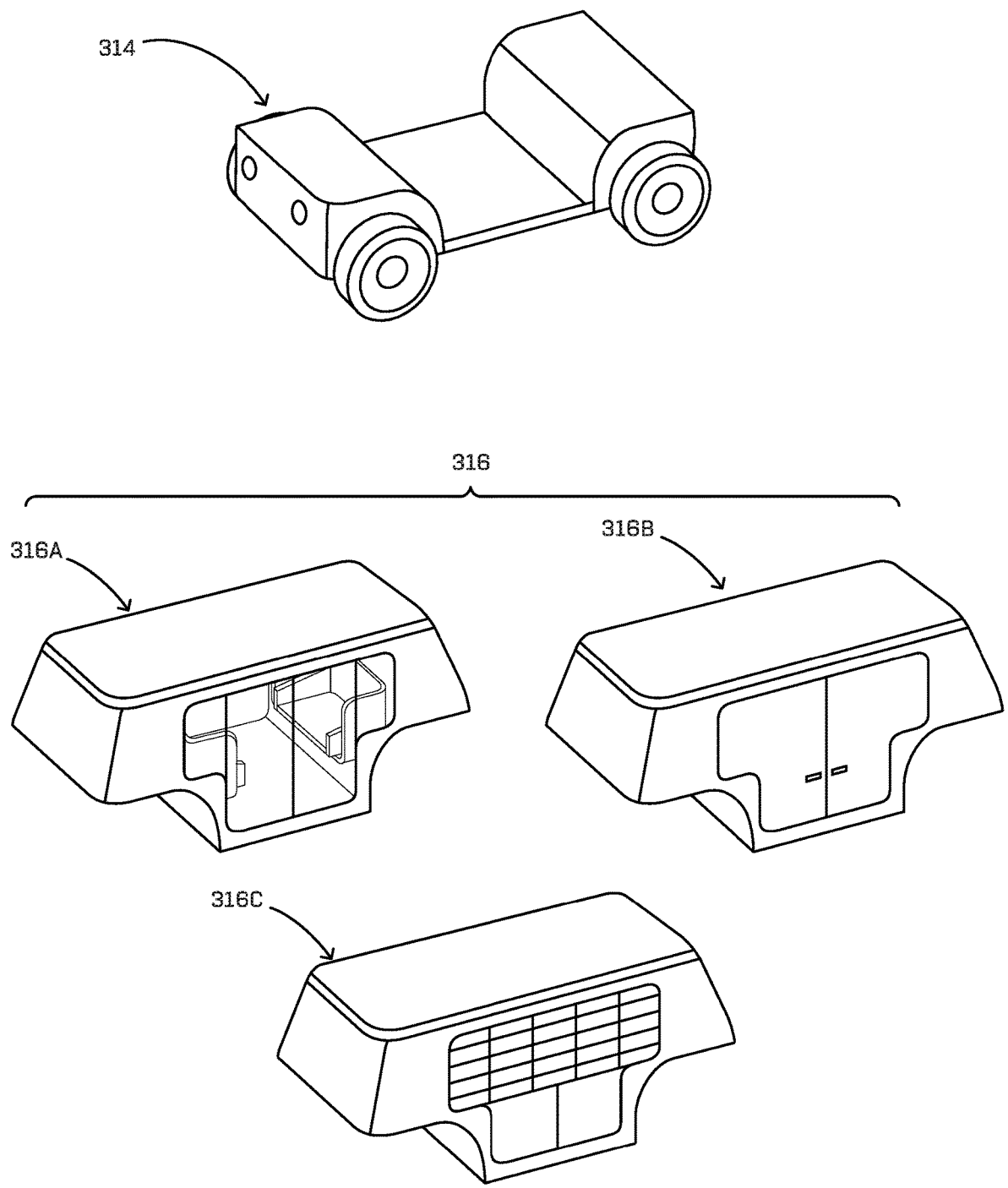
Figure 3F:
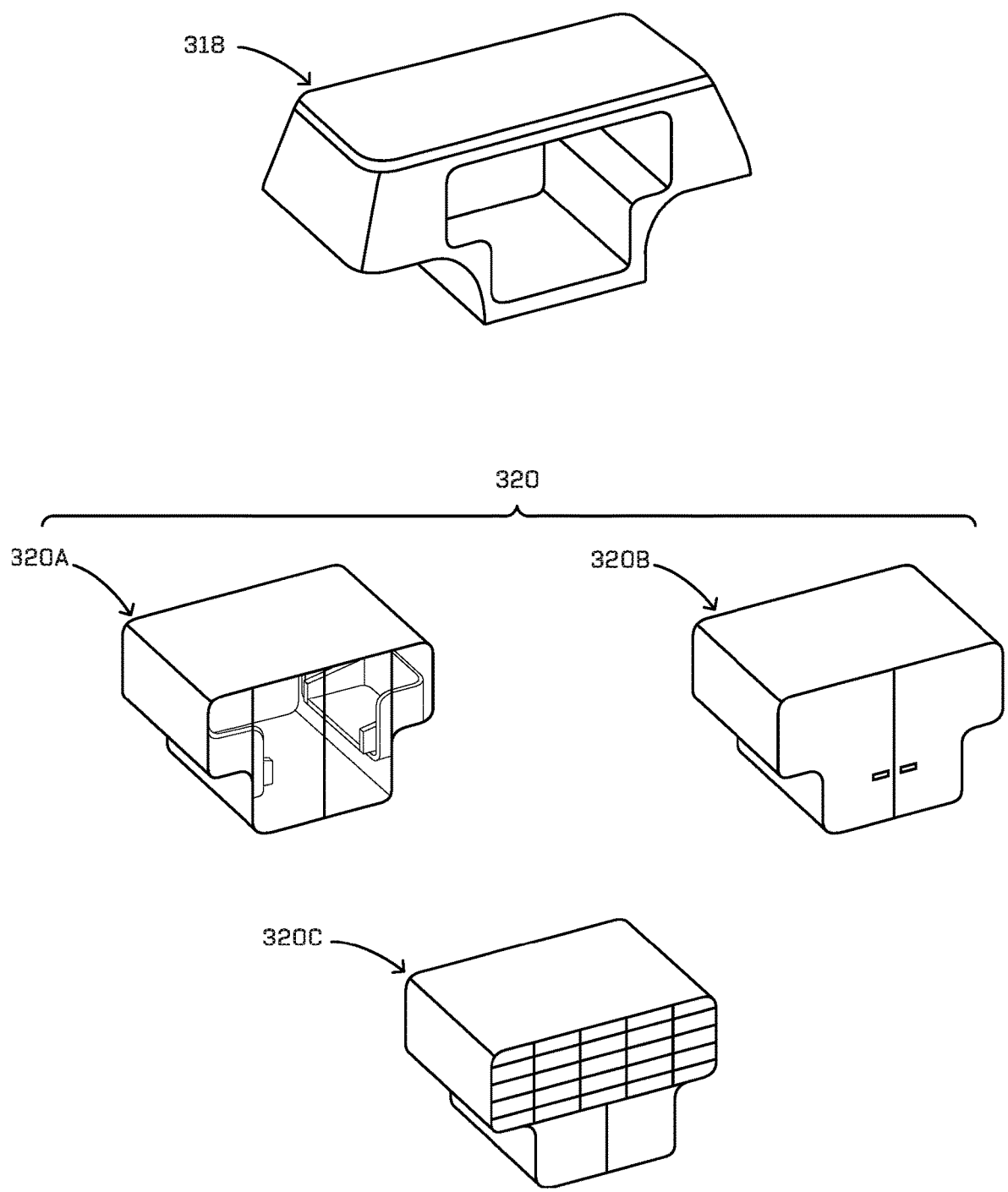

In some examples, jack stands, blocks, or internal jacks 310 (e.g., mechanically actuated, air actuated, and/or hydraulically actuated) can be used to support the body 302 when one or more of the drive assemblies 304, 306 is removed. For instance, during the loading and/or unloading processes of a locker cassette, the body 302 may be supported by jacks 310, or in other examples may be supported by a robotic cart with a separable vehicle stand. Similarly, the jacks 310 may support and/or reposition the body 302 while one body is replaced by another on the drive assemblies 304, 306 (as shown in FIG. 3E), or while a locker cassette is replaced by another within the body 302 (as shown in FIG. 3F). For instance, in the context of a warehouse or fulfillment center, body 302 can be wheeled or otherwise moved around the warehouse by a robotic cart, conveyor belt, or other conveyance mechanism. In some examples, jacks 310 may include wheels or other conveyance so that the body 302 can be moved to separate locations for load and unloading of the locker module cassette. Then, when the delivery vehicle 300 is in an assembled state, the vehicle 300 may be normally supported by the wheels 312. Examples of robotic carts that can be used to move and/or service a delivery vehicle and/or locker module cassette according to this application can be found in U.S. patent application Ser. No. 15/900,521, filed Feb. 20, 2018, which is incorporated herein by reference.

Figure 3G:
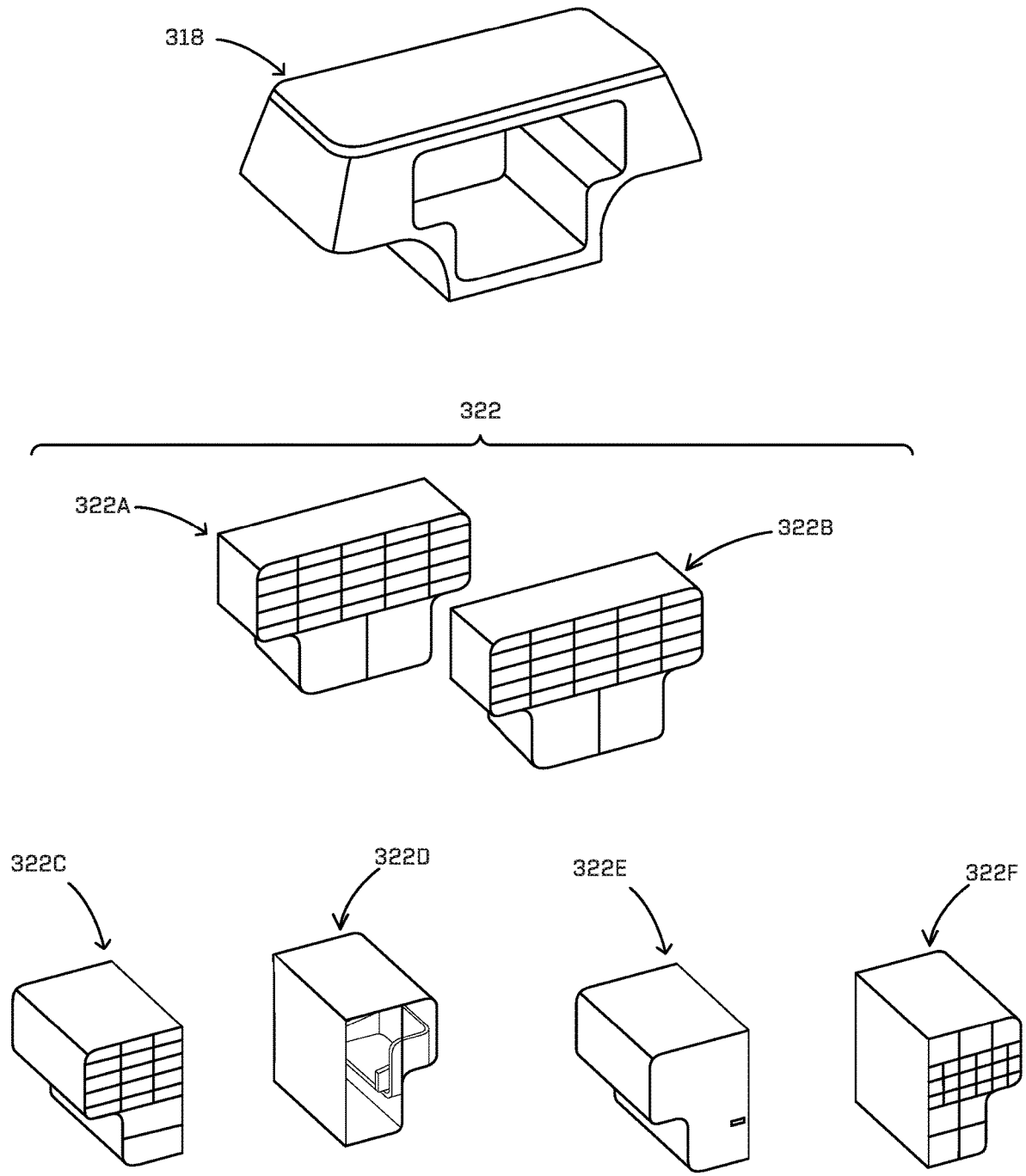

As shown in FIGS. 3E, 3F, and 3G, in some examples a vehicle drive assembly 314 may be assembled separately and configured to receive a body module cassette 316 that can be inserted and removed from the vehicle drive assembly 314 without disassembling the vehicle drive assembly 314. For example, in FIG. 3E, the vehicle drive assembly 314 may include the drive assemblies 304, 306, wheels 312, fastening system 308, and various other operational components and sensors of the vehicle 300. Multiple different body module cassettes 316 may include internal frame structures and may be compatible with the vehicle drive assembly 314, so that any of the cassettes 316 may be inserted onto and removed from the vehicle drive assembly 314 during the loading process. In FIG. 3E, three example body module cassettes 316 are shown: a passenger cassette 316A, a cargo transport cassette 316B, and a locker module cassette 316C. Each cassette 316 may include a vehicle frame and may be configured for insertion into the same drive assembly 314, thus allowing cargo transport cassettes 316B and locker module cassettes 316C to be interchangeably loaded and unloaded when they are not attached to the drive assembly 314.

In FIG. 3F, another example is shown of a modular vehicle assembly in which a generic vehicle frame 318, which may be configured to attach to a vehicle drive assembly (e.g., 306 and 308, or 314) and may be configured to receive one or more of the interchangeable body module cassettes 320. In some instances, the generic vehicle frame 318 may be a standardized component including any of the vehicle computer systems and/or sensor systems described herein. The generic vehicle frame 318 may be configured to receive purpose-built cassettes 320. As in the above example, body module cassettes 320 may be interchangeable and designed for specific purposes, such as passenger cassette 320A, a cargo transport cassette 320B, and a locker module cassette 320C. However, in this example the body module cassettes 320 need not include the vehicle frame components, and may be inserted into the generic vehicle frame 318 rather than directly into the drive assembly. In some examples, the generic vehicle frame 318 may receive additional types of body module cassettes, such as a hybrid locker/passenger cassette (e.g., shown in FIG. 4), a vehicle recharging body module cassette (e.g., including with a larger battery and/or additional batteries or generators) that may be used to provide additional battery life to the vehicle 300 and/or to charge other vehicles.

In FIG. 3G, other examples are shown of modular vehicle assemblies in which a generic vehicle frame 318, which may be configured to attach to a vehicle drive assembly (e.g., 306 and 308, or 314) may be configured to receive multiple interchangeable body module cassettes 322. In this example, the generic vehicle frame 318 may be configured to receive two different purpose-built cassettes 322, and different combinations of purpose-built cassettes 322 may be used depending on, among other things, the items to be delivered by the delivery vehicle 300, and the size and weight load capacity of the delivery vehicle 300, etc. For instance, an item delivery system may select one or more purpose-built cassettes based on the item specifications of the items to be delivered. The item specifications for an item to be delivered may include data such as the size/dimensions, weight, item type, fragility, temperature requirements, cost/value, security requirements, user authentication requirements, and the like. Certain items to be delivered may be unique items (e.g., correspondence, gifts or personal items, etc.) while other items may be general items (e.g., products having a product or model number from a supplier, etc.). Depending on the item specifications for one or more items to be delivered, and cassette availability, the item delivery system may select one or more purpose-built cassettes capability of storing the items and satisfying any item-specific transportation (e.g., temperature requirements, lighting requirements, cushioning/padding requirements, noise requirements, etc.) and/or any or delivery requirements (e.g., privacy requirements, secure item pickup requirements, advanced user authentication requirements, etc.).

Purpose-built cassettes 322A and 322B may be inserted and secured onto different lateral sides (e.g., left and right) of the delivery vehicle 300, so that each purpose-built cassette may be non-destructively detached, loaded, and reattached independently of the other. In this example, the purpose-built cassettes 322A and 322B may be oriented so that for cassette 322B the front (or recipient-facing) side of the lockers 102 are shown, while the back side of the lockers 102 (through which the items may be loaded at a warehouse or fulfillment center) are shown for cassette 322A. In the other examples shown, each of the purpose-built cassettes 322C, 322D, 322D, and 322F may be configured to be inserted and secured onto either longitudinal end (e.g., front or back) of the delivery vehicle 300. The purpose-built cassettes 322C, 322D, 322D, and 322F may be interchangeable and each designed for specific purposes, such as a first locker module cassette 322C, a passenger cassette 322D, a cargo transport cassette 322E, and a second locker module cassette 322F. In this example, any of the purpose-built cassettes 322C-322F may be used in combination with any other cassette 322C-322F, and may be non-destructively detached, loaded, and reattached independently of the other cassettes. Additionally, although the examples shown in FIG. 3G depict purpose-built cassettes 322 as either lateral or longitudinal halves of the generic vehicle frame 318, it is contemplated that any other size or number of purpose-built cassettes may be used in other examples (e.g., quarter-sized cassettes which are quarter length, quarter width, or half-length and half-width, etc., or any configuration of smaller-sized purpose-built cassettes cassettes).

FIG. 4 is a perspective view of an example delivery vehicle 400. In this example, delivery vehicle 400 includes both a passenger compartment and a set of lockers, to allow for scenarios of transporting passengers at the same time as delivering items to recipients. Delivery vehicles 400 containing both passenger compartments and lockers may be constructed using a number of different techniques. In some cases, delivery vehicle 400 may be a modular delivery vehicle as described above, in which a single body module cassette includes one or more passenger cassette (or compartments) and one or more integrated storage locker cassettes. As discussed above, the body module cassette may be attached to and detached from one or more drive modules during the vehicle assembly process.

Delivery vehicles 400 may support different types of vehicle body constructions (e.g., body module cassettes) that include both passenger compartments and lockers. In some examples, a first lateral side of the delivery vehicle 400 may include a locker module cassette 404, while a second lateral side includes a door providing access to a passenger compartment 402, or vice versa. Additionally or alternatively, a first longitudinal end of the vehicle may contain a set of lockers while a second longitudinal end of vehicle may include a passenger compartment, or vice versa. In some examples, the delivery vehicle 400 can be bidirectional, such that each longitudinal end can alternately be the leading or trailing end of the vehicle, and each lateral side can alternately be the right or left side of the delivery vehicle, depending on the direction of travel. Different types of body module cassettes for delivery vehicle 400 may include different allocations of space for passengers and locker storage. For example, a first design may include a relatively small passenger compartment 402 with a single seat and a large locker module cassette 404 for storage lockers, while a second design may include a larger passenger compartment 402 with seating for multiple passengers but a relatively small locker module cassette 404 for storage lockers. For instance, a delivery vehicle 400 may include a body module cassette having any number of different passenger compartment to locker storage ratios (e.g., 50/50, 60/40, 70/30, 80/20, 90/10, or vice versa), depending on the delivery requirements of the vehicle.

Delivery vehicles 400 that include both passenger compartments 402 and locker module cassettes 404 may be used in any of the same item delivery scenarios as delivery vehicles without passenger compartments, as well as a number of additional scenarios. For example, a delivery vehicle 400 may be used to deliver an item to a recipient, or to deliver a recipient to an item, after which both the recipient and item may be transported together to a destination location. Such examples may improve security for deliveries of valuable items, by assuring that the items are not left unattended at the delivery location, and also that the recipient need not walk around with the item in public after the delivery. Additionally, the delivery vehicle 400 may provide access to one or more of the lockers from within the passenger compartment 402. For example, a locker 102 may have a door that opens into the passenger compartment 402 on the interior of the vehicle, or may have one door opening into the interior of the vehicle and a separate door opening to the exterior of the vehicle. Such examples may provide recipients with additional privacy and convenience when accepting item deliveries, inspecting items, and/or rejecting or returning items.

In some examples, for delivery vehicles 400 that include both passenger compartments 402 and locker module cassettes 404, the passenger compartment may be customized based on the types of items being delivered. For example, specialized delivery vehicles 400 may deliver clothing orders to recipients, and the passenger compartment 402 may be designed as a dressing room to allow the recipients to inspect and try on the clothes before deciding whether or not to keep the items. In other examples, specialized delivery vehicles 400 may deliver food orders to recipients, and the passenger compartment 402 may be designed as a dining area to allow the recipient to eat the food in a comfortable and private environment. In still other examples, specialized delivery vehicles 400 may deliver electronic equipment to users (e.g., computing devices, cameras, televisions, video game systems, digital content, etc.), and the passenger compartment may be outfitted with the computing devices and accessories (e.g., power outlets, adaptors, screens, etc.) to allow the recipient to test out the electronic equipment before deciding whether to keep or reject the items.

Figure 5:
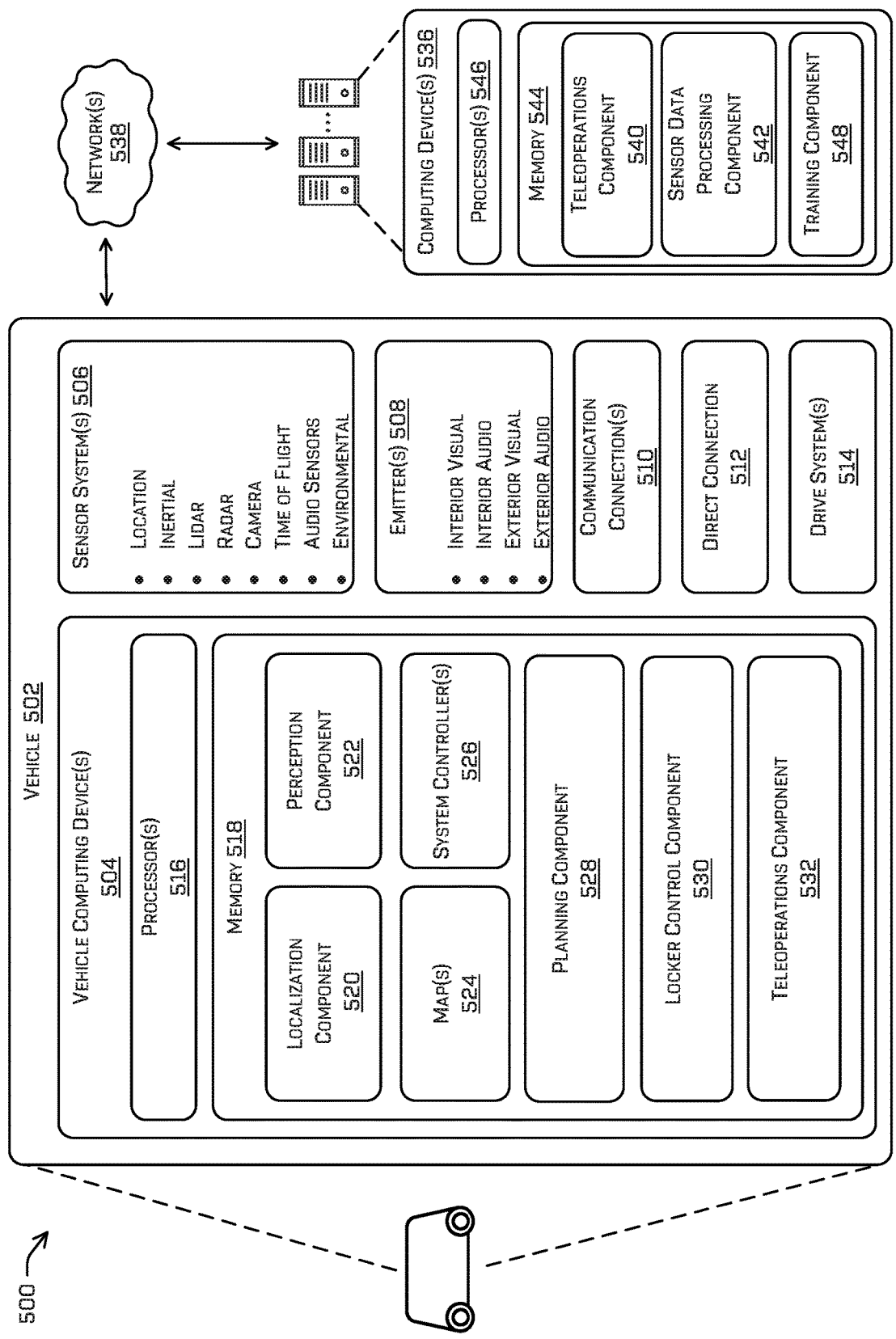
FIG. 5 is a block diagram of an example system for implementing various techniques described herein.

FIG. 5 depicts a block diagram of an example system 500 for implementing the techniques described herein. The vehicle 502 in this example may correspond to any of the delivery vehicles described herein. That is, each of the example delivery vehicles 100, 300, 400 discussed above, delivery vehicle 608 discussed below, and/or any other example delivery vehicles described herein, may include any combination of the features of vehicle 502 also may be incorporated within a similar or identical computing system. As shown in this example, vehicle 502 may include one or more vehicle computing devices 504 (also referred to as a vehicle computing device 504 or vehicle computing device(s) 504), one or more sensor systems 506, one or more emitters 508, one or more communication connections 510, at least one direct connection 512, and one or more drive systems 514.

The vehicle computing device 504 may include one or more processors 516 and memory 518 communicatively coupled with the one or more processors 516. In the illustrated example, the vehicle 502 is an autonomous vehicle; however, the vehicle 502 could be any other type of vehicle. In the illustrated example, the memory 518 of the vehicle computing device 504 stores a localization component 520, a perception component 522, one or more maps 524, one or more system controllers 526, a planning component 528, a locker control component 530, and/or a teleoperations component 532. Though depicted in FIG. 5 as residing in memory 518 for illustrative purposes, it is contemplated that the localization component 520, perception component 522, one or more maps 524, one or more system controllers 526, a planning component 528, a locker control component 530, and/or a teleoperations component 532 may additionally, or alternatively, be accessible to the vehicle 502 (e.g., stored remotely).

In at least one example, the localization component 520 may include functionality to receive data from the sensor system(s) 506 to determine a position and/or orientation of the vehicle 502 (e.g., one or more of an x-, y-, z-position, roll, pitch, or yaw). For example, the localization component 520 may include and/or request/receive a map of an environment and may continuously determine a location and/or orientation of the autonomous vehicle within the map. In some instances, the localization component 520 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 520 may provide data to various components of the vehicle 502 to determine an initial position of an autonomous vehicle for generating a trajectory and/or for generating or receiving map data, as discussed herein.

In some instances, the perception component 522 may include functionality to perform object detection, segmentation, and/or classification. In some examples, the perception component 522 may provide processed sensor data that indicates a presence of an entity that is proximate to the vehicle 502 and/or a classification of the entity as an entity type (e.g., car, pedestrian, cyclist, animal, building, tree, road surface, curb, sidewalk, unknown, etc.). For instance, the perception component 522 can include exterior sensors 104 on the delivery vehicle 100, and/or sensors 206 installed on or integrated into lockers 102, to detect users in proximity to the lockers 102, detect when objects are removed from or inserted into lockers 102, and perform operations to authenticate users and authorize requests to access one or more lockers 102 (e.g., passcode entry via a keypad, fingerprint scanning, voice recognition, facial recognition). In additional or alternative examples, the perception component 522 may provide processed sensor data that indicates one or more characteristics associated with a detected entity (e.g., a tracked object) and/or the environment in which the entity is positioned. In some examples, characteristics associated with an entity may include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

The memory 518 may further include one or more maps 524 that may be used by the vehicle 502 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some instances, the map may be stored in a tiled format, such that individual tiles of the map represent a discrete portion of an environment, and may be loaded into working memory as needed, as discussed herein. In at least one example, the one or more maps 524 may include at least one map (e.g., images and/or a mesh). In some examples, the vehicle 502 may be controlled based at least in part on the map(s) 524. Maps 524 may be stored on a remote computing device(s) (such as the computing device(s) 536) accessible via network(s) 538. In some examples, multiple maps 524 may be stored based on, for example, a characteristic (e.g., type of entity, time of day, day of week, season of the year, etc.). Storing multiple maps 524 may have similar memory requirements but increase the speed at which data in a map may be accessed.

In at least one example, the vehicle computing device 504 may include one or more system controllers 526, which may be configured to control steering, propulsion, braking, safety, emitters, communication, and other systems of the vehicle 502. These system controller(s) 526 may communicate with and/or control corresponding systems of the drive system(s) 514 and/or other components of the vehicle 502.

The planning component 528 may determine a path for the vehicle 502 to follow to traverse through an environment. For example, the planning component 528 may determine various routes and trajectories and various levels of detail. For example, the planning component 528 may determine a route to travel from a first location (e.g., a current location) to a second location (e.g., a delivery location). A route may include a sequence of waypoints for travelling between two or more locations. As non-limiting examples, waypoints include streets, intersections, global positioning system (GPS) coordinates, etc. Further, the planning component 528 may generate an instruction for guiding the autonomous vehicle along at least a portion of the route from the first location to the second location. In at least one example, the planning component 528 may determine how to guide a delivery vehicle 502 from a first waypoint in the sequence of waypoints to a second waypoint in the sequence of waypoints. In some examples, the instruction may include a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 502 to navigate.

In some examples, the planning component 528 may include a prediction component to generate predicted trajectories of objects (e.g., objects) in an environment. For example, a prediction component may generate one or more predicted trajectories for objects within a threshold distance from the vehicle 502. In some examples, a prediction component may measure a trace of an object and generate a trajectory for the object based on observed and predicted behavior.

The locker control component 530 may control operation of the lockers 102, based on input from the localization component 520, perception component 522, and/or maps 524. For example, the locker control component 530 may receive and process (e.g., authorize) locker access requests, by receiving authentication data from users within the proximity of the vehicle 502, authenticating the user as a valid recipient, and verifying the user's access permissions. Upon verification of a valid recipient's access permissions, the locker control component 530 may actuate a locker 102 associated with the recipient. In some instances, the locker control component 530 may control lockers 102 based on the current location or orientation of the vehicle 502, as received from the localization component 520. For example, a locker 102 may be associated with a predetermined geographic location or region, and the locker control component 530 may provide access to locker 102 only when the vehicle 502 is at the predetermined location or within the predetermined region. Additionally, the locker control component 530 may control access to lockers 102 in various different ways based on the perception data received from the perception component 522. For instance, the locker control component 530 may receive data from the perception component 522 indicating the presence of users near the vehicle 502, and may control a locker 102 based on the detection of nearby users. For example, the locker control component 530 may open a locker 102 in response to the detection of the authorized recipient associated with the locker 102 with a predetermined range of the locker 102 (e.g., 1 meter, 2 meters, etc.). In some instances, the locker control component 530 may delay opening a locker until a time when the authorized recipient is the only user within a distance threshold (e.g., 5 meters, 10 meters, 20 meters, etc.) of the locker 102, to provide additional privacy and security for the recipient. In some examples, the locker control component 530 may automatically close and lock all lockers 102 in response to a threat detected via the perception component 522 (e.g., an impact to the vehicle, detection of unauthorized persons near the vehicle, detection of nearby persons holding weapons, etc.).

The teleoperations component 532 may initiate communications with a teleoperator in the event of a problem or issue detected at the vehicle 502. For example, in response to the detection of a locker malfunction, locker tampering, a failed locker access request, the placement of an unauthorized object into a locker 102, or other locker-related problem or issue, the teleoperations component 532 may initiate a communication session with a teleoperator. In some instances, the teleoperations component 532 may select a particular teleoperator to contact, based on the locker 102 at which the problem or issue has occurred (e.g., a merchant or sender of the particular item), and different lockers 102 on the vehicle 502 may be associated with different teleoperators. Additionally or alternatively, the teleoperations component 532 may select a particular teleoperator to contact based on a current location of the vehicle 502 (e.g., a local locker repair service, local law enforcement agency, etc.), and different locations of the vehicle 502 may be associated with different teleoperators.

The teleoperations component 532 may enable wireless communication between the vehicle 502 and other vehicles 502 and/or an external teleoperations component 540 via the communication connection(s) 510. The teleoperations component 532 of the vehicle may send communication signals to the teleoperations component 540 of the computing device 536, providing locker data, sensor data, location data, and/or a request for guidance from the teleoperations component 540.

In various examples, the sensor data processing component 542 may be configured to receive data from one or more remote sensors, such as sensor system(s) 506. In some examples, the sensor data processing component 542 may be configured to process the data and send processed sensor data to the vehicle computing device(s) 504. In some examples, the sensor data processing component 542 may be configured to send raw sensor data to the vehicle computing device 504. In some examples, the sensor data processing component 542 may be configured to receive sensor data from the vehicle and to present the sensor data in raw or processed form to a remote teleoperator to apprise the teleoperator of a current state of the vehicle and/or to assist the teleoperator in providing guidance to the vehicle.

In some instances, aspects of some or all of the components discussed herein may include any models, algorithms, neural networks, and/or machine learning algorithms. For example, in some instances, the components in the memory 518 (and the memory 544, discussed below) may be implemented as a neural network. In such examples, the models, algorithms, neural networks, and/or machine learning algorithms may be trained by a training component 548 at the computing device 536.

In at least one example, the sensor system(s) 506 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), time of flight sensors, audio sensors, wheel encoders, environment sensors (e.g., temperature sensors, humidity sensors, light sensors, pressure sensors, etc.), etc. The sensor system(s) 506 may include multiple instances of each of these or other types of sensors. For instance, the lidar sensors may include individual lidar sensors located at the corners, front, back, sides, and/or top of the vehicle 502. As another example, the camera sensors may include multiple cameras disposed at various locations about the exterior and/or interior of the vehicle 502. In some examples, sensors 104 shown in FIG. 1 may include any combination of sensor system(s) 506, and may be installed on the delivery vehicle 100 at a position and angle to capture the area proximate to the exterior of the lockers 102. The sensor system(s) 506 may provide input to the vehicle computing device 504. Additionally, or alternatively, the sensor system(s) 506 may send sensor data, via the one or more networks 538, to the one or more computing device(s) at a particular frequency, after a lapse of a predetermined period of time, in near real-time, etc.

The vehicle 502 may also include one or more emitters 508 for emitting light and/or sound, as described above. The emitters 508 in this example include interior audio and visual emitters to communicate with passengers of the vehicle 502. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 508 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology. In some examples, emitters 508 may be used to communicate with users accessing items from the lockers 102. For instance, emitters 508 can include lights to illuminate an exterior of the locker(s) 102, or to activate lights on the specific lockers 102 associated with an authorized user in response to a locker access request. In some instances, emitters 508 can audibly emit a locker number (or other identifier) that contains the user's item(s), or may provide audible or visual instructions to the user (e.g., via an external display screen on the delivery vehicle 100) to allow the user to validate and access the lockers 102.

The vehicle 502 may also include one or more communication connection(s) 510 that enable communication between the vehicle 502 and one or more other local or remote computing device(s). For instance, the communication connection(s) 510 may facilitate communication with other local computing device(s) on the vehicle 502 and/or the drive system(s) 514. Also, the communication connection(s) 510 may allow the vehicle to communicate with other nearby computing device(s) (e.g., other nearby vehicles, traffic signals, etc.). For example, the communication connection(s) 510 can include one or more wireless communication interfaces for short-range communications, such as cellular, WLAN, Bluetooth, WiFi, or NFC, that the vehicle 502 can use to communicate with the user's computing device, a merchant system, and/or an item providing system, as described below in more detail in reference to FIG. 6. The communications connection(s) 510 also enable the vehicle 502 to communicate with a remote teleoperation computing device or other remote services.

The communications connection(s) 510 may include physical and/or logical interfaces for connecting the vehicle computing device 504 to another computing device or a network, such as network(s) 538. For example, the communications connection(s) 510 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 may include one or more drive systems 514. In some examples, the vehicle 502 may have a single drive system 514. In at least one example, if the vehicle 502 has multiple drive systems 514, individual drive systems 514 may be positioned on opposite ends of the vehicle 502 (e.g., the front and the rear, etc.). In at least one example, the drive system(s) 514 may include one or more sensor systems to detect conditions of the drive system(s) 514 and/or the surroundings of the vehicle 502. By way of example and not limitation, the sensor system(s) may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 514. In some cases, the sensor system(s) on the drive system(s) 514 may overlap or supplement corresponding systems of the vehicle 502 (e.g., sensor system(s) 506).

The drive system(s) 514 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 may include a drive system controller which may receive and preprocess data from the sensor system(s) and to control operation of the various vehicle systems. In some examples, the drive system controller may include one or more processors and memory communicatively coupled with the one or more processors. The memory may store one or more components to perform various functionalities of the drive system(s) 514. Furthermore, the drive system(s) 514 also include one or more communication connection(s) that enable communication by the respective drive system with one or more other local or remote computing device(s).

In at least one example, the direct connection 512 may provide a physical interface to couple the one or more drive system(s) 514 with the body of the vehicle 502. For example, the direct connection 512 may allow the transfer of energy, fluids, air, data, etc. between the drive system(s) 514 and the vehicle. In some instances, the direct connection 512 may further releasably secure the drive system(s) 514 to the body of the vehicle 502.

As shown in this example, the vehicle 502 may communicate with one or more computing device(s) 536 via the network(s) 538. In some cases, computing device(s) 536 may implement an item delivery system that may receive delivery requests, track items and recipients, determine delivery routes for one or more delivery vehicles 502, and control the vehicles 502 during the delivery routes. Additional examples of the feature and techniques performed by an item delivery system are described in more detail below.

In some examples, the vehicle 502 may send sensor data to one or more computing device(s) 536 via the network(s) 538. In some examples, the vehicle 502 may send raw sensor data to the computing device(s) 536. In other examples, the vehicle 502 may send processed sensor data and/or representations of sensor data to the computing device(s) 536. In some examples, the vehicle 502 may send sensor data to the computing device(s) 536 at a particular frequency, after a lapse of a predetermined period of time, in near real-time, etc. In some cases, the vehicle 502 may send sensor data (raw or processed) to the computing device(s) 536 as one or more log files.

The computing device(s) 536 may include processor(s) 546 and a memory 544 storing the teleoperations component 540, the sensor data processing component 542, and the training component 548, discussed above.

The processor(s) 516 of the vehicle 502 and the processor(s) 546 of the computing device(s) 536 may be any suitable processor capable of executing instructions to process data and perform operations as described herein. By way of example and not limitation, the processor(s) 516 and 546 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 518 and 544 are examples of non-transitory computer-readable media. The memory 518 and 544 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 518 and 544 may include at least a working memory and a storage memory. For example, the working memory may be a high-speed memory of limited capacity (e.g., cache memory) that is used for storing data to be operated on by the processor(s) 516 and 546. In some instances, the memory 518 and 544 may include a storage memory that may be a lower-speed memory of relatively large capacity that is used for long-term storage of data. In some cases, the processor(s) 516 and 546 may not operate directly on data that is stored in the storage memory, and data may need to be loaded into a working memory for performing operations based on the data, as discussed herein.

It should be noted that while FIG. 5 is illustrated as a distributed system, in alternative examples, components of the vehicle 502 may be associated with the computing device(s) 536 and/or components of the computing device(s) 536 may be associated with the vehicle 502. That is, the vehicle 502 may perform one or more of the functions associated with the computing device(s) 536, and vice versa.

Item Delivery System

Figure 6:
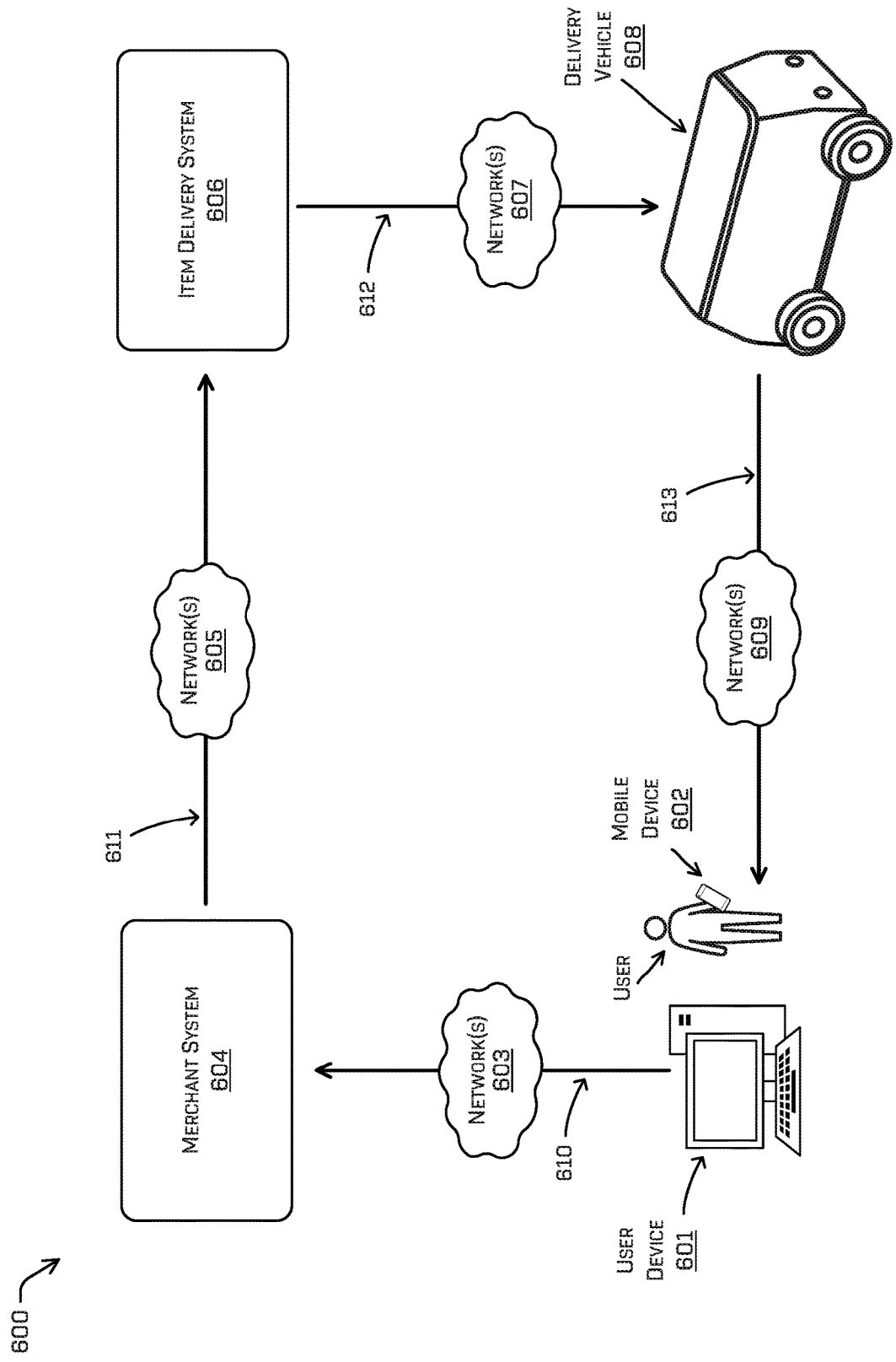
FIG. 6 is a block diagram depicting an example computing environment for implementing various techniques described herein.

FIG. 6 illustrates a block diagram of an example computing environment 600 that implements various techniques discussed herein. For example, computing environment 600 may be used to illustrate systems and methods of initiating, scheduling, and performing item deliveries using delivery vehicles. As shown in this example, a delivery to a user 601 (also referred to as a recipient or recipient user) may be initiated and scheduled by a merchant system 604 and/or item delivery system 606, after which a delivery vehicle 608 may be dispatched to deliver the item to the user 601. Delivery vehicle 608 may correspond to any of the delivery vehicles described herein, and thus may include any features or combination of features discussed above in connection with FIGS. 1-5. Merchant system 604 and/or item delivery system 606 may be implemented as separate computing devices or systems which operate separately from the user's mobile device 602 and the delivery vehicle 608, and thus may correspond to remote computing device(s) 536 in example system 500. Mobile device 602 may comprise a mobile phone or other user device, such as a laptop or tablet computer, smart watch, wearable computing device, and/or any other personal computing device.

Initially, FIG. 6 illustrates a simplified delivery scenario for an item purchased by a user 601 from a merchant system 604. At 610, the user 601 may order (e.g., purchase) an item via a merchant system 604. The user 601 may use mobile device 602 or any other computing device, to transmit the order through a network 603 to the merchant system 604. The order may be, for example, an online purchase made by the user 601 via a website operated by the merchant system 604, and the network 603 may correspond to the Internet or other wide-area public network. At 611, the merchant system 604 may transmit a delivery request, through network 605, to the item delivery system 606. In some examples, delivery request may include payment information transmitted to the item delivery system 606, and the network 605 through which the delivery request and/or payment information are transmitted may be a secure back-end computer network. At 612, the item delivery system 606 may transmit instructions to a delivery vehicle 608 to pick-up the item (e.g., from a merchant store or warehouse) and then deliver the item to a recipient location. Transmissions between the item delivery system 606 and delivery vehicle 608 may be sent via network 607, which may include one or more cellular networks and/or other secure wireless networks. Finally, at 613, the delivery vehicle 608 may drive to and park at a delivery location, where the vehicle may be accessible to the user 601 to complete the item delivery. As discussed below in more detail, the delivery vehicle 608 may communicate with the user's mobile device 602 directly or via the item delivery system 606 or merchant system 604 during the item delivery process to initially schedule the delivery, track or modify the delivery, authenticate the user 601, and/or confirm successful delivery (or rejection) of the item. Transmissions between the delivery vehicle 608 and the user's mobile device 602 may be send via one or more wireless networks 609, such as a cellular or WLAN networks for longer-range communications and/or Bluetooth, WiFi, or NFC for short-range communications.

Although FIG. 6 is depicted with unidirectional arrows to illustrate the simple item ordering and delivery process outlined above, it should be understood that each device and system in this example may perform bi-directional communications with any or all other devices and systems. Additional process features and device interactions not depicted in this example may be performed in other examples, such as modifications or cancelations to the initial order of the item, modifications or cancelations of delivery requests, on-route item tracking, delivery vehicle tracking, recipient tracking, proximity notifications, etc.

Additionally, although the merchant system 604 and item delivery system 606 are depicted as separate computing systems in FIG. 6, in other examples two or more of these systems may be implemented as a single computing system. For instance, a merchant system 604 may include components to perform item delivery functionality, including delivery scheduling, route determinations, and delivery vehicle dispatch and control. In still other examples, a merchant system 604 need not be involved at all in an item delivery scenario. For instance, users 601 may interact directly with an item delivery system 606 to return items previously purchased from a merchant, or to request delivery of their own items that are currently stored in a separate storage location. Users 601 also may initiate delivery requests at the item delivery system 606 for various other purposes, such as to send gifts or personal items to other people, return items previously borrowed from other people or request the return of items borrowed by other people, etc. Further, although the item delivery system 606 may be implemented as a centralized computing system configured to communicate with and control delivery vehicle 608 (or a fleet of delivery vehicles) as shown in this example, in other examples, any or all of features and functionalities of the item delivery system 606 may be integrated into a delivery vehicle 608.

FIGS. 7A-7C, 8, 9, 11, and 13 illustrate example processes in accordance with techniques of the disclosure. As described below, these processes may be performed by delivery vehicles, user mobile devices, item delivery systems, and/or various combinations of these components and the other devices and systems described herein. These examples processes are illustrated as interaction diagrams, logical flow graphs, and/or swim lane diagrams, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

Figure 7A:
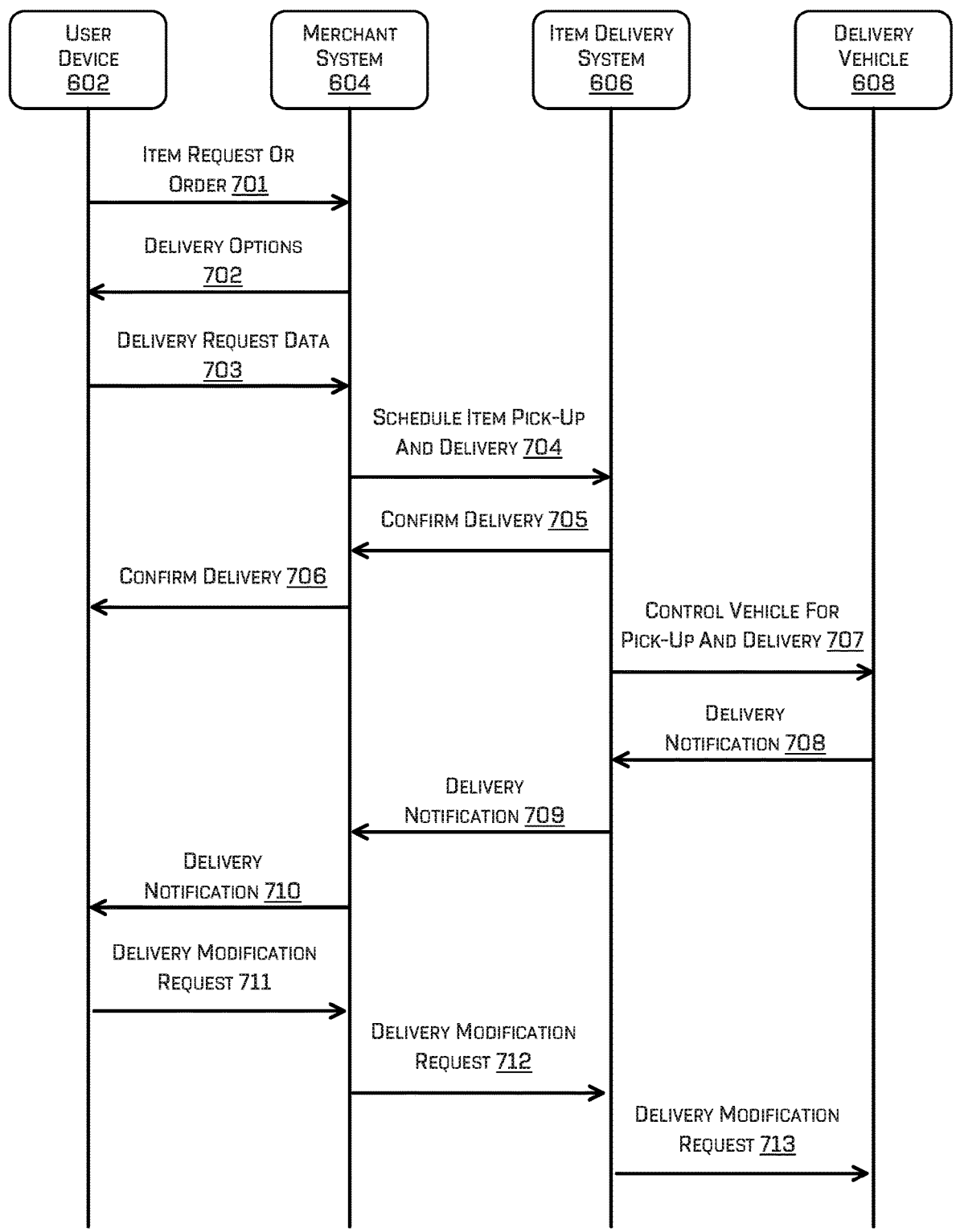
FIGS. 7A-7C are diagrams illustrating three example processes for item ordering and delivery using an item delivery system and delivery vehicle(s), in accordance with implementations of the disclosure.
Figure 7B:
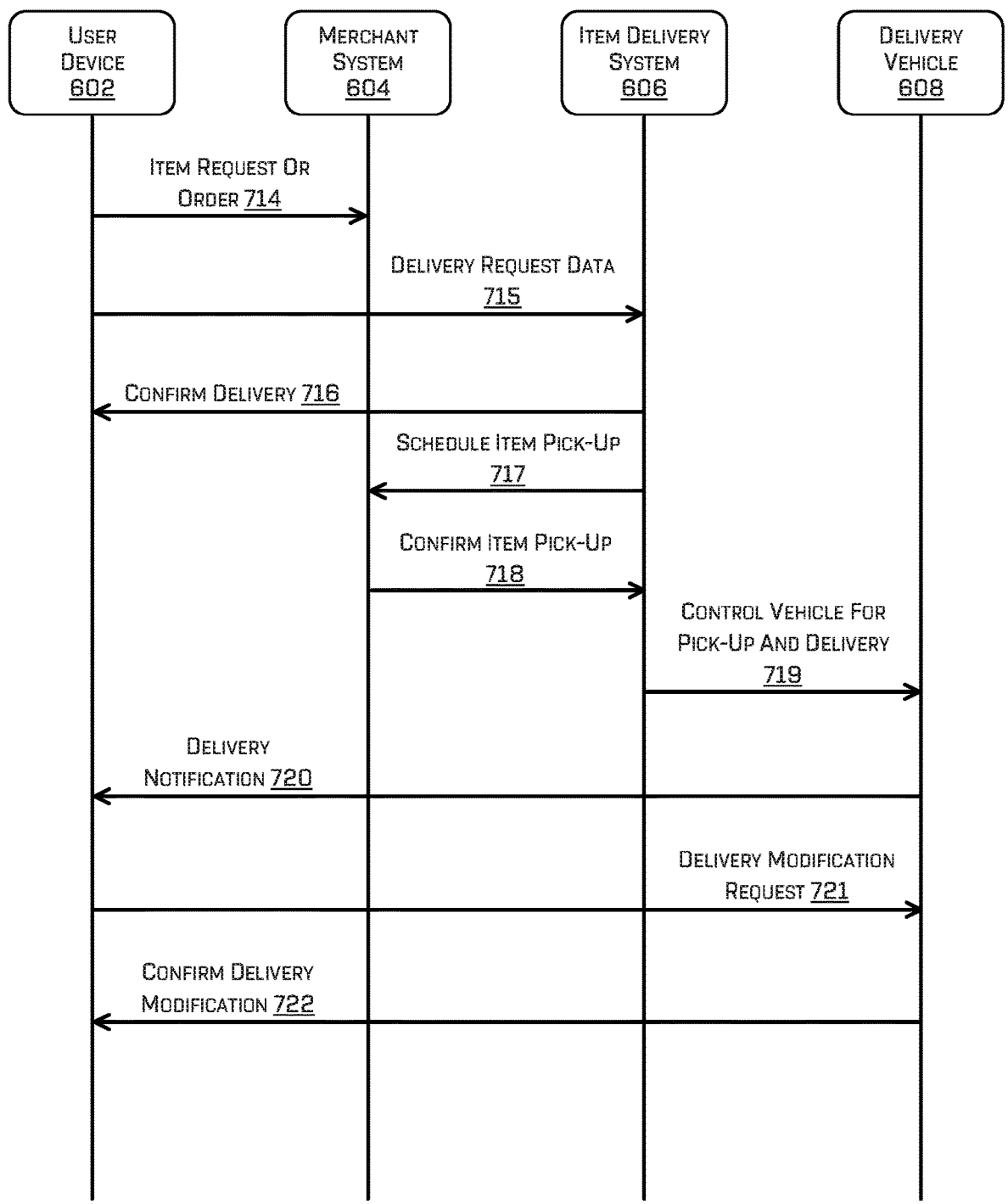
Figure 7C:
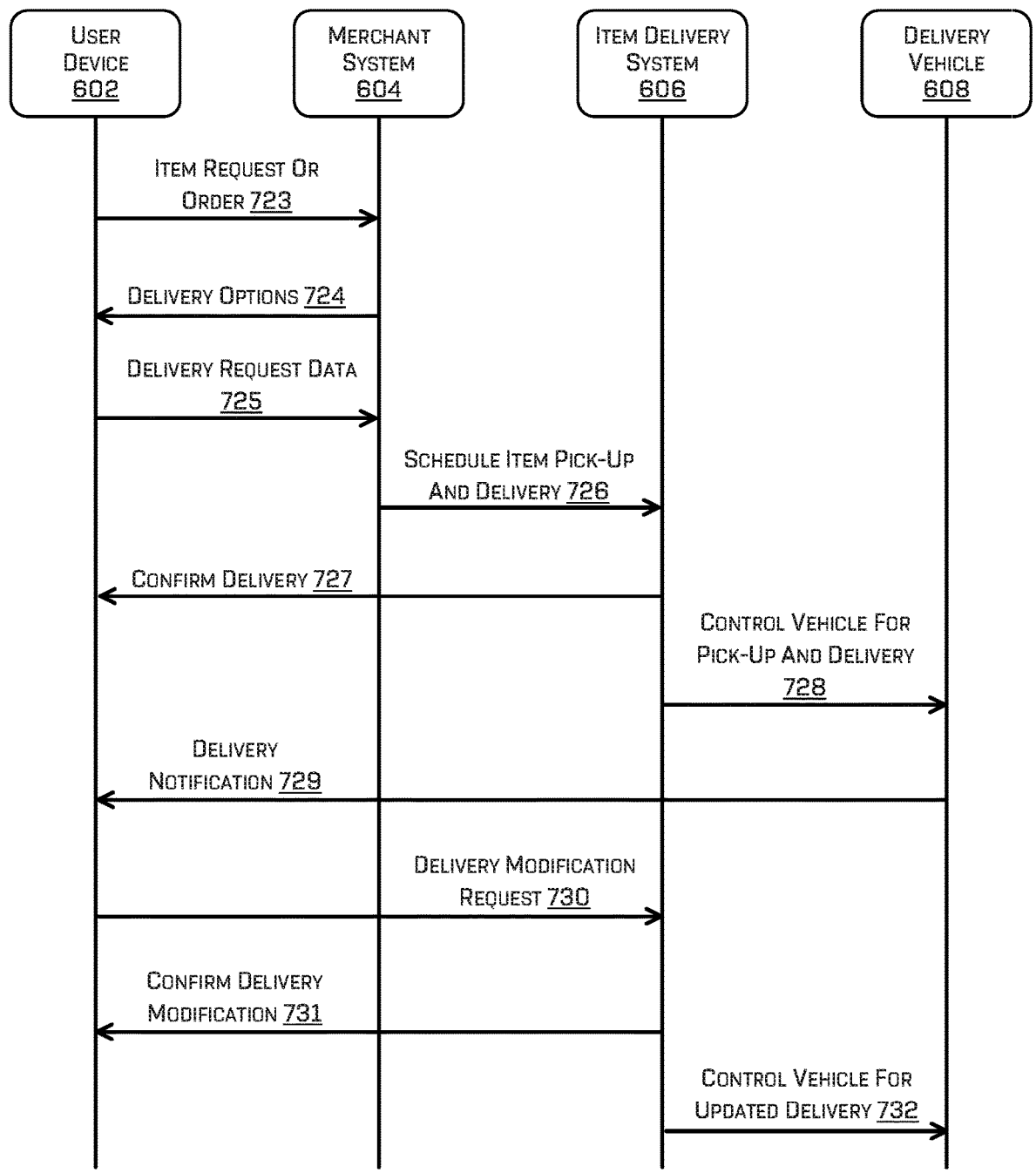

FIGS. 7A-7C show three swim lane diagrams illustrating three example processes for item ordering and delivery using an item delivery system and delivery vehicle(s). In these examples, FIG. 7A illustrates a first scenario in which the user 601 interacts only with a merchant system 604 to request and coordinate a delivery of an item. FIG. 7B illustrates a second scenario in which the user 601 orders an item via the merchant system 604, but then interacts only with the item delivery system 606 to request and coordinate delivery of the item. FIG. 7C illustrates a third scenario in which the user 601 interacts with both the merchant system 604 and the item delivery system 606 to request and coordinate a delivery of an item.

In FIG. 7A, at 701, a user 601 may request or order an item from a merchant system 604 (e.g., via a merchant website) using mobile device 602 (or other computing device). At 702, the merchant system 604 may confirm the order and transmit back to the user 601 one or more delivery options (e.g., delivery dates, times, locations, and cost options). At 703, the user 601 may respond to the merchant system 604 with delivery request data request identifying one or more delivery times, delivery locations, etc. For instance, the user 601 may request that the items be delivered to a parking lot near the user's office. At 704, the merchant system 604 may transmit the delivery information (e.g., item identifier, item pick-up location, item pick-up time, recipient identifier, delivery location(s), delivery time(s), etc.) to the item delivery system 606. At 705, the item delivery system 606 may confirm the delivery details (e.g., a delivery time and location) to the merchant system 604, and at 706 the merchant system 604 may confirm the delivery details to the user 601. At 707, the item delivery system 606 may transmit instructions to the delivery vehicle 608 to drive to pick-up the item (e.g., from a store, warehouse, or other merchant location) and deliver the item to the determined recipient location at the determined time. At 708, the delivery vehicle 608 may transmit a delivery notification to the item delivery system 606, such as an on-route status notification or a notification that the delivery vehicle 608 has reached the delivery location. At 709, the item delivery system 606 may relay the delivery notification to the merchant system 604, which may relay the delivery notification to the user 601 at 710. The user 601 could then proceed to the delivery location to access his or her item (e.g., from a locker of a delivery vehicle such as delivery vehicle 100). Alternatively, at 711, the user 601 may opt to cancel the delivery or modify the delivery time or location, in which case a delivery modification request may be transmitted to the merchant system 604. For instance, the user 601 may request that the item instead be delivered to the user's home. At 712, the merchant system 604 may forward the delivery modification request to the item delivery system 606. The item delivery system 606 may revise the delivery routes and/or schedules of one or more delivery vehicles 608, and at 713 may transmit the updated delivery information to the delivery vehicle 608. Thus, the example scenario of FIG. 7A may provide process efficiencies and convenience for the user 601 and the mobile device 602, by channeling all network communications through a single website or mobile application associated of the merchant system 604. Therefore, in this example, the mobile device 602 need not interact directly with the item delivery system 606 or delivery vehicle 608, and need not access any other websites, applications, or software services to request and coordinate the item delivery.

In FIG. 7B, at 714, the user 601 (via mobile device 602 or other computing device) may request or order an item from a merchant system 604. At 715, the user 601 may transmit a delivery request to the item delivery system 606 including item delivery details (e.g., a delivery date, time, location, etc.). At 716, the item delivery system 606 may respond to the user 601 with a delivery confirmation and/or updated delivery details. At 717, the item delivery system 606 may transmit a request to the merchant system 604 to schedule a pick-up of the item, and at 718 the merchant system 604 may reply with item pick-up information (e.g., item identifier, pick-up location, time(s), item size/weight, etc.). At 719, the item delivery system 606 may transmit instructions to the delivery vehicle 608 to drive to pick-up the item from the merchant and deliver the item to determined recipient location at the determined time. At 720, the delivery vehicle 608 may transmit a delivery notification directly to the user 601, such as an on-route status notification or a notification that the delivery vehicle 608 has reached the delivery location. At 721, the user 601 may opt to cancel the delivery or modify the delivery time or location, and a delivery modification request may be transmitted directly to the delivery vehicle 608. At 722, the delivery vehicle 608 (and/or the item delivery system 606) may determine a revised delivery route or schedule for the delivery vehicle 608, and at 722 may transmit the updated delivery information to the user 601. Thus, the example scenario of FIG. 7B may provide additionally efficiencies and convenience for the user 601 and the mobile device 602, by supporting direct communications with the delivery vehicle 608 to allow the user 601 to track the delivery vehicle, to allow the delivery vehicle 608 to track the user 601, and allow the user 601 and delivery vehicle to coordinate on-the-fly delivery modifications. For example, the user's mobile device 602 and/or the delivery vehicle 608 may perform location tracking of the other to facilitate item deliveries. In some instances, the location tracking capabilities of the user's mobile device 602 and/or the delivery vehicle 608 may be restricted to certain time periods and/or certain geographic regions. For instance, the user's mobile device 602 may access a mobile application or web service of the merchant system 604 or item delivery system 606 to track the delivery vehicle 608, at any time after the delivery vehicle 608 has been loaded and has departed from the warehouse, store, or fulfillment center. In some instances, tracking capabilities between the delivery vehicle 608 and the user's mobile device 602 may be activated during a certain time window (e.g., a delivery time window predetermined for the user 601), and/or during a certain geographical region (e.g., when the delivery vehicle 608 and the user's mobile device 602 are within a predetermined distance of one another, etc.).

In FIG. 7C, at 723, the user 601 (via mobile device 602 or other computing device) may request or order an item from a merchant system 604. At 724, the merchant system 604 may confirm the order and transmit back to the user 601 one or more delivery options (e.g., delivery dates, times, locations, and cost options). At 725, the user 601 may respond to the merchant system 604 with delivery request data request identifying one or more delivery times, delivery locations, etc. At 726, the merchant system 604 may transmit the delivery information (e.g., item identifier, item pick-up location, item pick-up time, recipient identifier, delivery location(s), delivery time(s), etc.) to the item delivery system 606. At 727, the item delivery system 606 may transmit a delivery confirmation and/or updated delivery details to the user 601. At 728, the item delivery system 606 may transmit instructions to the delivery vehicle 608 to drive to pick-up the item from the merchant and deliver the item to determined recipient location at the determined time. At 729, the delivery vehicle 608 may transmit a delivery notification to the user 601 (either directly or via the item delivery system 606), such as an on-route status notification or a notification that the delivery vehicle 608 has reached the delivery location. At 730, the user 601 may opt to cancel the delivery or modify the delivery time or location, and a delivery modification request may be transmitted directly to the item delivery system 606. At 731, the item delivery system 606 may determine revised delivery details (e.g., delivery location(s) and time(s)) for the delivery vehicle 608, and may confirm the revised delivery details with the user 601. At 732, the item delivery system 606 may transmit the updated delivery route and/or delivery details to the delivery vehicle 608. Thus, in the example scenario of FIG. 7C, the user 601 may request and schedule the initial delivery via the merchant system 604, but may interact directly with the item delivery system 606 and/or delivery vehicle 608 for subsequent delivery tracking, notifications, cancelations, and modifications.

Item Delivery Scenarios

The techniques described herein may include various item delivery scenarios and use cases. For example, an item delivery system 606 including one or more delivery vehicles 608, as described above, may perform multiple different delivery types and techniques for delivering items to recipient users 601, including predetermined delivery routes with shared delivery locations, direct deliveries to recipient locations, and/or pick-ups and transportation of items and recipients together to a drop-off location.

In some examples, the item delivery system 606 may determine a delivery route for a delivery vehicle 608, in which the delivery vehicle 608 stops at multiple delivery locations along the route for predetermined time windows. The item delivery system 606 may select centralized delivery locations and time windows based on the delivery request data received from recipients (e.g., recipient locations and requested delivery times), and authorized recipients may access the delivery vehicle 608 at any of the delivery locations along the route to retrieve their items. In some examples, the item delivery system 606 may determine and transmit a suggested delivery location to the recipient's mobile device 602, identifying a closest or most convenient stop for the recipient (e.g., delivery location and time window) along the delivery route based on the recipient's location information, previous delivery information, historical travel patterns, etc. Additionally or alternatively, the item delivery system 606 may transmit the complete delivery route information (e.g., all delivery locations and times windows) to the user's mobile device 602, to allow the user 601 to select a preferred time and location for meeting the delivery vehicle 608. In some examples, the user interface presented on the user's mobile device 602 may allow the user 601 to transmit a confirmation to the item delivery system 606, indicating which delivery location along the route that the user 601 intends to meet the delivery vehicle 608.

The item delivery system 606 and/or delivery vehicle 608 also may transmit a notification to a user 601 (via the recipient's mobile device 602) when the delivery vehicle 608 is approaching the particular delivery location designated for the user 601. For example, the item delivery system 606 and/or delivery vehicle 608 may automatically generate and transmit a notification when the delivery vehicle 608 is on-route and reaches a time or distance threshold of arriving at the particular delivery location. Such notifications may instantiate an interface on the mobile device 602, via an item delivery mobile application and/or a web page provided by the item delivery system 606, which may allow the user 601 to respond to the notification with a confirmation that the user 601 intends to retrieve the item, a request for a modified delivery time and/or location, or a request to cancel the item delivery.

As noted above, the item delivery system 606 may determine the route for a delivery vehicle 608 based on delivery requests and preferences from the recipients of the items stored in the delivery vehicle 608. Delivery routes may include a single stop at a centralized delivery location, or multiple stops each of which is accessible to one or more of the recipients. After a delivery route has been determined, the item delivery system 606 may instruct the delivery vehicle 608 to drive the determined route, including stops at each of the delivery locations for the duration of the time windows that have been determined for each stop.

The item delivery system 606 and/or delivery vehicle 608 may modify delivery routes on-the-fly based on item pick-ups, and/or delivery modification requests or cancelations received from recipients while the delivery vehicle 608 is on-route. For example, the delivery vehicle 608 may depart from a delivery location ahead of schedule if all pick-ups designated for that location have been made (or have been modified or canceled by the recipients). Conversely, the delivery vehicle 608 may stay longer than scheduled at a delivery location if the recipients of the items designated for pick-up at the location have not yet arrived.

In some examples, in addition to or instead of stopping at centralized or shared delivery locations, the item delivery system 606 may determine a delivery route for a delivery vehicle 608, in which the delivery vehicle 608 drives directly to one or more recipient locations to make deliveries. In such examples, rather than stopping at a shared delivery location for a predetermined time window, the delivery vehicle 608 may stop at a closest or most convenient location for a first recipient, provide the first recipient with access to the associated item(s), and then drive to the location of the next recipient. In some examples, the route may include a combination of centralized/shared delivery locations and direct deliveries to individual recipients.

For direct deliveries to individual recipients, the item delivery system 606 may receive a precise delivery time and location from the recipients via an item delivery request. The recipient may request a specific delivery location (e.g., the recipient's home address, work address, etc.) and a specific time (or time window) for delivery. Alternatively, the recipient may request a flexible delivery range of times and/or locations. For instance, the recipient may indicate to the item delivery system 606 that he/she will be somewhere within a certain region (e.g., neighborhood, city, etc.) during a time period, and may request that the delivery vehicle 608 track and drive to the recipient's precise location to deliver the item.

In some examples, the item delivery system 606 may determine multiple delivery options (e.g., different delivery locations, time windows, etc.) for a recipient, and may transmit the options to the recipient for selection. In some cases, the item delivery system 606 may determine different prices for different delivery options, and/or may determine a price to allow the recipient to move up in the delivery queue for the delivery vehicle 608. In some examples, the item delivery system 606 may implement a virtual auction by which the recipients who have items in the same delivery vehicle 608 may each bid on a particular delivery time and/or position in the delivery queue. Additionally, if a recipient misses their requested delivery time and/or location window, they may be prompted to request an updated delivery time and location for a second delivery attempt during the current route of the delivery vehicle 608. In some cases, fees may be charged to recipients for missed delivery attempts.

When dispatching a delivery vehicle 608 to a delivery location (e.g., directly to a recipient and/or to a shared delivery location along a predetermined route), the item delivery system 606 and/or the delivery vehicle 608 may transmit notifications to recipients. Some notifications may indicate that the delivery vehicle 608 has arrived at the delivery location and may provide the precise location (e.g., street address or GPS coordinates) of the delivery vehicle 608. Other notifications may indicate that the delivery vehicle 608 is on-route and within a time or distance threshold of arriving at the delivery location. In some examples, the item delivery system 606 may provide an interface to allow the recipient's mobile device 602 to track the delivery vehicle 608 in real-time, so the recipient may more efficiently meet the delivery vehicle 608 at the predetermined delivery location and time, and/or may request on-the-fly locker access when encountering the delivery vehicle 608 at a different point on the delivery route. In other examples, the item delivery system 606 may track both the delivery vehicle 608 and the recipient's mobile device 602, and may trigger a notification whenever the delivery vehicle 608 is within a predetermined distance (e.g., 0.5 mile radius, 1 mile radius, etc.) of the recipient's current position.

As discussed above, in some examples a delivery vehicle 608 may include a passenger compartment as well as one or more locking storage containers. In such cases, an item delivery system 606 may determine a delivery route that includes an item pick-up point, a recipient pick-up point, and a destination at which the recipient is to be dropped-off with the delivered item. As discussed above, such scenarios may use a number of different specialized delivery vehicles 608, which may provide additional security and privacy for item deliveries and also may provide the opportunity for the recipient to inspect and accept or reject the item on-route to the destination.

Although the various item delivery scenarios described above (e.g., predetermined delivery routes with shared common delivery locations, direct deliveries to recipient locations, transportation of recipients and items together, etc.) may apply to delivery of items to recipients, each of these scenarios also may apply to item returns made by a recipient using a delivery vehicle 608. For item return scenarios, the item delivery system 606 may schedule deliveries times and locations for recipients, determine delivery routes for delivery vehicles, and dynamically modify delivery schedules and routes using similar or identical techniques used for item deliveries. For example, a request by a merchant system 604 or user 601 for an item return may be processed by the item delivery system 606 as a request for delivery of an empty storage container to the user 601. When submitting a return request to the item delivery system 606, the merchant system 604 or user 601 may specify a locker size, shape, and/or other locker characteristics.

Figure 8:
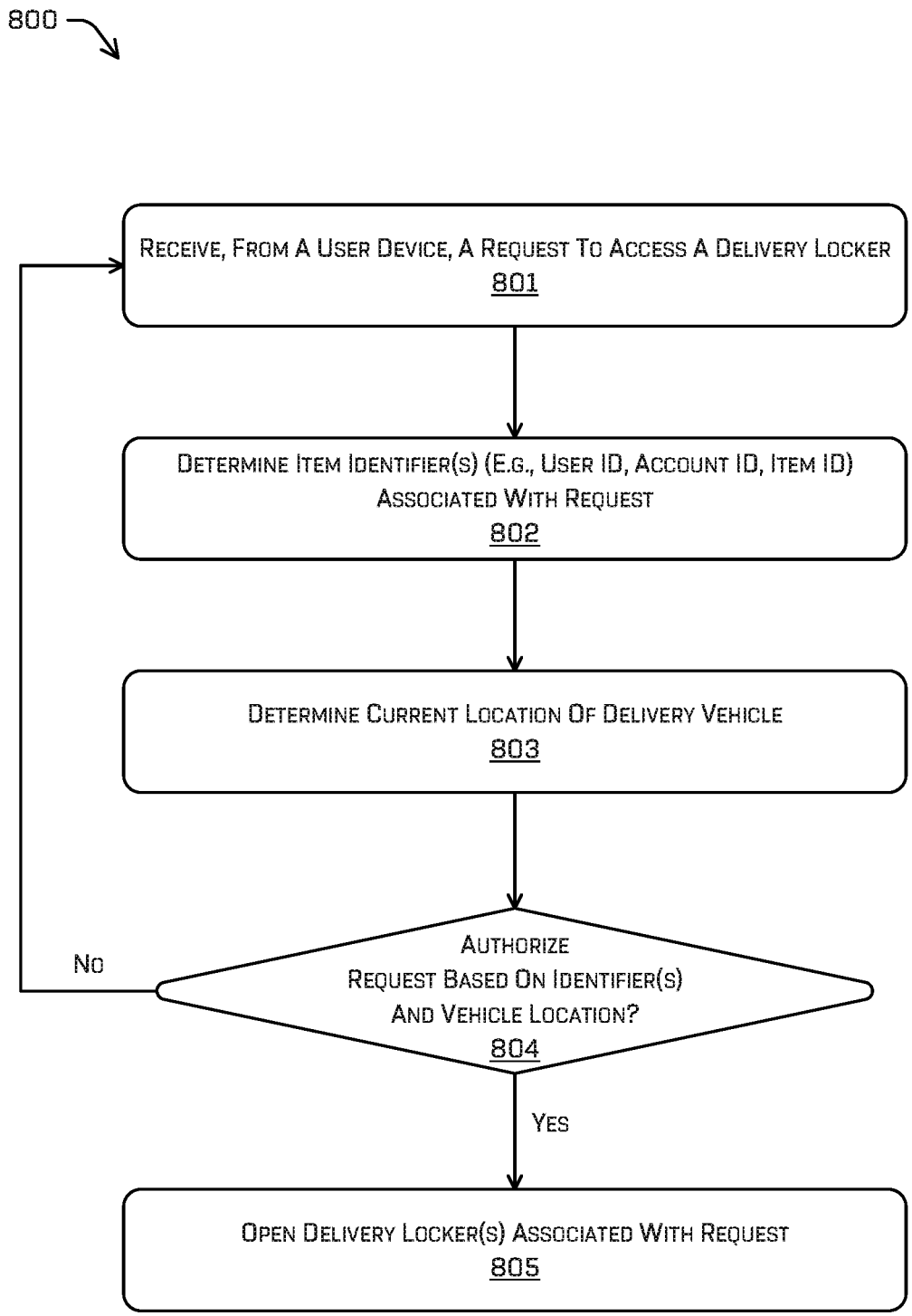
FIG. 8 is flow diagram illustrating an example process of authorizing a locker access request at a delivery vehicle, in accordance with implementations of the disclosure.

FIG. 8 illustrates a flow diagram of an example process 800 of authorizing a locker access request at a delivery vehicle 608, based on communications between the delivery vehicle 608 and the user's mobile device 602. Example process 800 may apply to item deliveries as well as item returns (e.g., a user is requesting an empty locker to place an item in for delivery either to the merchant or to a third party), user-to-user deliveries, and/or third-party fulfillment, and user authentication and/or validation of requests to open the lockers of the delivery vehicle 608 may be required in any of these scenarios.

At 801, the delivery vehicle 608 may receive a request from a user's mobile device 602 to access one or more of the vehicle's delivery lockers. A request from a recipient's mobile device 602 to access a locker on a delivery vehicle may include data uniquely identifying the user 601 or the mobile device 602, and/or data associated with the delivery request or item to be picked-up (e.g., an order ID, item ID, or locker number). In this example, the request may be transmitted using a short-range wireless network protocol (e.g., NFC, Bluetooth) from the mobile device 602 to the delivery vehicle 608, or the delivery vehicle 608 may capture a machine-readable code (e.g., bar code, QR code, text code, etc.) from a screen of the mobile device 602. However, in other examples, locker access requests may be processed and authorized by a remote item delivery system 606, and thus the user 601 may arrive at the delivery vehicle 608 and then use mobile device 602 to transmit the request via a mobile application or website to the item delivery system 606.

In some examples, the delivery vehicle 608 may be configured to receive requests for locker access from users and/or to provide locker access to users without interaction with the user's mobile device 602. For instance, the delivery vehicle 608 may include an external keypad or display screen to allow a user to enter a passcode or item identifier. Additionally or alternatively, the delivery vehicle 608 may include a scanner (e.g., bar code scanner, QR code scanner, etc.), and the user may be provided an item claim check that may be paper or electronic and can be scanned by the delivery vehicle 608 to provide access to the appropriate locker 102. In some examples, the delivery vehicle 608 also may use cameras and/or sensors 104 to perform user authentication based on facial recognition, voice recognition, iris recognition, fingerprint analysis, and the like, allowing even users without a mobile device 602 to complete item deliveries and returns.

At 802, the delivery vehicle 608 may receive the request from the user's mobile device 602, and may determine one or more item identifiers associated the request. For example, the delivery vehicle 608 may retrieve a user identifier or mobile device identifier from the request, which may be used to look up a user account, item identifier, and/or locker number associated with the user 601 and/or mobile device 602. In some cases, the delivery vehicle 608 may transmit data received from the request at 801 (e.g., a user identifier) to the item delivery system 606, which may respond with the item identifier and/or locker number designated for delivery to that user 601.

At 803, the delivery vehicle 608 may determine its current location, for example, using a localization system (e.g., localization component 520) of the delivery vehicle 608 based on data from a perception system (e.g., perception component 522) and/or map data (e.g., maps 524).

At 804, the delivery vehicle 608 may authorize the locker access request received at 801 from the user's mobile device 602. In various examples, a request may be authorized based on one or more of a user identifier, account identifier, mobile device identifier, item identifier, order identifier, locker number, etc. For instance, the delivery vehicle 608 may authorize the request by comparing an item-related identifier received from the user's mobile device 602 (e.g., an item ID, order ID, locker ID, etc.) to a separate user-related identifier (e.g., user ID, mobile device ID, account ID etc.) within a delivery data store, and verifying that the two item identifier is associated with the user identifier in the delivery data store. In some cases, the delivery vehicle 608 also may determine and compare the time at which locker access request was received in operation 801 to one or more time ranges within the delivery data store, identifying the authorized delivery time windows.

Additionally, as shown in 804, the authorization of the request may be based on the location of the delivery vehicle 608 in some cases. For example, a recipient may request and/or confirm an item delivery at a particular delivery location (e.g., a home or office location, or a shared delivery location along a delivery route). In this example, if the recipient attempts to access the delivery vehicle 608 and retrieve their item at a different location on the delivery route, then the request for authorization may be denied. In such examples, the delivery vehicle 608 also may authorize the request by determining and comparing its own current location to the delivery location(s), which may be defined in the delivery data store as addresses, regions defined by GPS coordinates, etc. Location-based authorization of item deliveries via delivery vehicles 608 may provide additional security for item deliveries and/or may allow a sender or shipper to limit the specific locations at which the recipient may pick-up an item. In some instances, authorizing a locker access request based on verifying the identity of the user may include verifying the age of the user to access items with age restriction (e.g., alcohol) that may be transported in a locker 102, and/or verifying that the user 601 is authorized to pick-up items restricted to particular individuals (e.g., prescription medication). In some such examples, magnetic readers for driver's license, preauthorization from a third-party system, or otherwise may be coupled with facial recognition (or other biometric scanning) to confirm the identity and age of the user.

If the delivery vehicle 608 successfully authorizes the locker access request based verifying and/or authenticating the user identifier, item identifier, and current vehicle location (804: Yes), then at 805 the delivery vehicle 608 may determine an appropriate locker associated with the request and may unlock/open the locker to provide the recipient with access to the interior of the locker. As noted above, the delivery vehicle 608 may include locking/unlocking mechanisms for each locker, and/or self-actuating locker doors that may slide open automatically. The delivery vehicle 608 also may activate interior or external lights to illuminate the recipient's locker, and/or cameras and other sensors to confirm successful delivery (or return) of the items.

If the delivery vehicle 608 does not successfully authorize the locker access request (804: No), then locker access may be denied, and the locker may remain closed and locked. In some examples, the delivery vehicle 608 may transmit a locker access denial notification to the user's mobile device 602, indicating the reason for the denial (e.g., wrong delivery time or location, item previously picked-up, item not in the delivery vehicle, invalid order ID, user not associated with the order ID, etc.). For instance, in response to a failed user authentication and/or failed locker access attempt, the delivery vehicle 608 may provide the user with an option to speak with a customer service agent of the merchant and/or a teleoperator of the item delivery service.

As described in the above examples, the authorization of a locker access request in process 800 may be performed by the delivery vehicle 608 based on the data received from a mobile device 602 of a user 601. However, in other examples, locker access requests may be received and authorized remotely by an item delivery system 606, which may interact with the user's mobile device 602 via a mobile application or website, authenticate the user and/or client device, authorize the request, and transmit instructions to the delivery vehicle 608 to open the appropriate lockers for the user 601.

Figure 9:
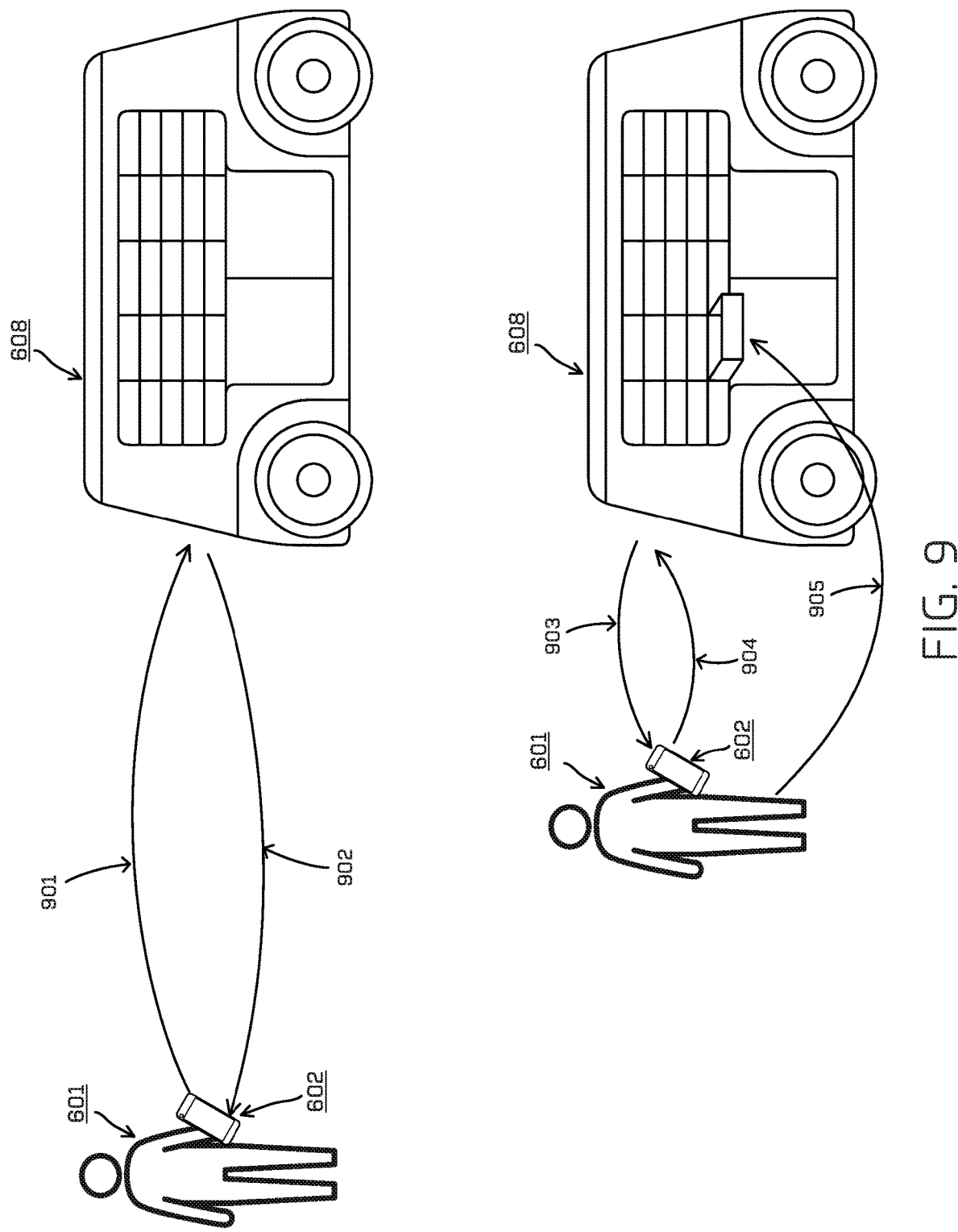
FIG. 9 depicts two diagrams illustrating interactions between a delivery vehicle and a user via mobile device, in accordance with implementations of the disclosure.

FIG. 9 shows two diagrams illustrating interactions between a user 601 (via mobile device 602) and a delivery vehicle 608, during a locker access request and retrieval (or return) of item. Thus, FIG. 9 may include similar or identical techniques to those discussed above in example process 800 for receiving and authorizing locker access requests.

In this example, 901 and 902 represent a first interaction (or set of interactions) between the user 601 and the delivery vehicle 608, when the user 601 and delivery vehicle 608 are not in close proximity to one another (e.g., within a few feet or meters). For instance, 901 and 902 may correspond to requests-responses between the user 601 and delivery vehicle 608 to schedule and coordinate a delivery, transmit delivery reminders, proximity notifications, or guide the user 601 to the precise location of the delivery vehicle 608. In the upper diagram of FIG. 9, the user 601 and delivery vehicle 608 may be anywhere from a few meters to several miles apart, and the communications in 901 and 902 may be transmitted wirelessly over the Internet or other computer network using medium- or long-range network protocols (e.g., Wifi, cellular, etc.).

In some cases, the delivery vehicle 608 may limit certain types of user requests or the set of actions that may be performed, to instances when the user 601 is within the direct proximity of the delivery vehicle 608. For example, in the interactions shown at interaction 903 and interaction 904 in the lower diagram of FIG. 9, the delivery vehicle 608 may receive and process a locker access request from a user 601 at or near the vehicle. In some examples, the delivery vehicle 608 may process locker access requests received using short-range network protocols (e.g., NFC, Bluetooth, etc.) to assure that the user 601 is near the delivery vehicle 608 before the requested locker is opened. To provide additional security, the delivery vehicle 608 also may use sensors to verify the presence and/or identity of the user 601 at or near the vehicle and/or that other users are not nearby before opening the requested locker. For instance, the delivery vehicle 608 may perform one or more short-range user authentication techniques, such as facial recognition, fingerprint scanning, voice recognition, iris recognition, proximity of mobile device (e.g., Bluetooth, NFC, RFID, etc.), or any combination thereof, as part of the authorization process for a locker access request.

At 905, for an item delivery, the delivery vehicle 608 may open the appropriate locker allowing the user 601 to retrieve the items from the interior of the locker. The delivery vehicle 608 may use cameras, motion sensors, and/or weight sensors to detect when the user 601 has removed the item(s) from the locker, and may automatically close the locker in response to detecting that the items have been removed.

For item returns, at 905, the delivery vehicle 608 may open an empty locker to allow the user 601 the place the returned item into the locker, after which the delivery vehicle 608 may automatically close the locker to secure the item. In some cases, a locker within delivery vehicle 608 may be preassigned for a particular item return, while in other cases the delivery vehicle 608 may select a locker on-the-fly for an item return based on the size and shape of the item and the inventory of lockers currently available on the vehicle. In some examples, as soon as a locker is emptied (e.g., upon delivery of an item) the locker may become available to receive returns.

For rejections of delivered items, the delivery vehicle 608 may allow the user 601 to inspect the item for a period of time after removing it from the locker, and to reject the item by returning it to the locker if desired. In some examples, the user 601 may initiate the rejection via their mobile device 602, causing the delivery vehicle 608 to re-open the same locker in which the item was previously stored.

When the delivery vehicle 608 is receiving an item into a locker for a rejection or a return, the vehicle sensors (e.g., cameras, weight sensors, etc.) may be used to verify that the appropriate items have been placed into the locker. In at least some examples, a user may provide input to the system indicative of what item the user intends to return. In additional or alternative examples, various systems and subsystems may be used on the robot to determine the particular item placed in a vacant locker. For instance, if a user purporting to return an electronic device (e.g., as may be indicated via user input at the mobile device and/or a web-based interface) places an empty box for the electronic device in a locker, a weight sensor associated with the locker may determine that the weight of the box, visual features in image data, bar/QR codes, etc., or any combination thereof, do not match those of the expected item. In that case, the delivery vehicle 608 may not accept the item being returned and/or may notify the merchant of the discrepancy. In some cases, the delivery vehicle 608 may include a bar code scanner to automatically scan returned or rejected items, or to allow the user 601 to manually scan the items. For rejections in multi-item deliveries, the delivery vehicle 608 may use to sensor data to determine whether the rejection is a partial or complete rejection, by identifying which items have been returned to the locker and which items have been kept by the user 601.

After the completion and verification (e.g., using sensor data) of a successful item delivery, item return, or item rejection, the delivery vehicle 608 may generate and transmit a confirmation to the item delivery system 606 and/or the user's mobile device 602. In some cases, the delivery vehicle 608 may capture and store images of the items delivered or returned, and/or the user 601 removing items from or returning items to the locker to verify the successful delivery or return.

Delivery Vehicle Routing

Additional techniques described herein may relate to determining preferred and/or optimal delivery routes for delivery vehicles in various item delivery and return scenarios and use cases. For example, in some delivery and/or return scenarios, a delivery vehicle 608 may drive a predetermined delivery route comprising a number of delivery locations at which the vehicle may stop for a predetermined time window to allow recipients to access the vehicle and retrieve their items. In other scenarios, a delivery vehicle 608 may drive a route for an ordered set of direct deliveries to recipient locations. In still other scenarios, an autonomous passenger vehicle transporting a user 601 may be routed to a delivery vehicle 608, or vice versa, to allow the user 601 to pick-up or return an item from the delivery vehicle 608 on-route to their destination. For each of these item delivery and/or item return scenarios, an item delivery system 606 and/or delivery vehicle 608 may determine a delivery route based on delivery requests and corresponding recipient data.

As noted above, in some examples a delivery vehicle 608 may drive a predetermined delivery route comprising an ordered set of recipient locations, in order to complete an item delivery or item return for a user 601 at each recipient location. For instance, 30 separate lockers 102 within a delivery vehicle 608 may be loaded with items for delivery to 30 separate recipients. After a preferred or optimal delivery route is determined, the delivery vehicle 608 may drive the route to each of the 30 recipient locations to deliver the appropriate item at each location. In this example, any or all of the deliveries may comprise pick-ups of returned items at the recipient location, instead of or in addition to an item delivery at the location. Additionally, as noted above, once a locker is emptied upon delivery of an item to a recipient, the locker becomes available to accept returns from users at subsequent locations during the route and/or upon completion of the route. In some examples, the route may be modified or extended to add locations to accept returns after the vehicle has delivered one or more of the items so that at least one locker is available to accept returns.

For scenarios involving delivering items directly to (or collecting items directly from) recipient locations, the item delivery system 606 may determine the delivery route based on user/recipient data associated with each of the recipient locations. For example, the item delivery system 606 may receive requested delivery times and/or locations for each recipient. A recipient may provide, via a delivery request or other user inputs, a delivery location (e.g., home or work address) and requested delivery time, or multiple alternate locations and corresponding time windows (e.g., a work address for delivery between 2-4 pm, or a home address for delivery between 5-7 pm, etc.). The item delivery system 606 may determine a delivery route that is compatible with the requested delivery data for all recipients, so that a delivery vehicle 608 may successfully complete a delivery to each recipient location. For the delivery route determination, the item delivery system 606 may take into account distances and driving route data between the recipient locations, traffic data, weather data, requested delivery speeds (e.g., one-hour delivery), item characteristics (e.g., prepared food, items, etc.), to verify that the determined delivery route is compatible with the delivery preferences for all recipients.

The item delivery system 606 may optimize the delivery route for a delivery vehicle 608 to deliver items to a number of recipient locations, using any one of multiple different optimization algorithms and techniques. In some examples, a delivery route may be optimized with respect to the maximum number of item deliveries and/or returns, or the maximum number of recipient locations assigned to a delivery vehicle 608. In other examples, a delivery route may be optimized with respect to minimizing driving time, driving distance, power consumption, and/or with respect to maximizing the time that the vehicle may spent at each recipient location. In various examples, different optimization algorithms and/or machine-learning techniques may be used to determine a delivery route for the delivery vehicle 608.

In some examples, the item delivery system 606 may use any one or a combination of delivery vehicle routing techniques, including route optimization algorithms and/or machine-learning techniques, for determining the delivery routes for a delivery vehicle 608 and/or fleet of delivery vehicles 608. For instance, the item delivery system 606 may optimize delivery routes for delivery vehicles 608, using one or more cost-based optimization techniques that take into account the relevant (e.g., cost-related) variables, including one or more of the vehicle driving distance and/or driving time, the number of item pickup locations (e.g., warehouses or fulfillment centers), the number of delivery locations, the length of delivery time windows at each location, the amount of energy (fuel, electricity, etc.) used by the delivery vehicles 608, and/or the anticipated delivery times for each user/item, etc. In various examples, any one or a combination of these variables may be minimized, maximized, or optimized by the item delivery system 606 during the route determination and optimization process, using vehicle routing algorithms and/or trained machine-learned models. Additionally or alternatively, the item delivery system 606 may be configured to enforce one or more predetermined delivery requirements, such as a First-In-First-Out (FIFO) constraint and/or a Last-In-Last-Out (LILO) constraint for items and/or passengers. In some examples, the route optimization technique also may take into account requirements for predetermined item delivery times (e.g., specific time windows for delivery to certain recipients and/or delivery hubs), and/or may prioritize based on a recipient priority level and/or item priority level.

In some instances, the item delivery system 606 also may determine optimal routes for delivery vehicles 608 that take into account and/or are constrained by the characteristics of the items being transported. For example, in addition to considering the item pickup times/locations and the item delivery times/locations, the item delivery system 606 may determine optimal delivery routes based on characteristics of the items loaded in the delivery vehicle 608, such as sizes and weights of the items, the specific transportation requirements of the items (e.g., fragile items, sensitive items, perishable or temperature-controlled items, etc.), and the capacity limitations and features of the delivery vehicle 608 (e.g., weight capacity, fuel/energy efficiency, etc.). Additionally, the item delivery system 606 may optimize delivery routes that include scheduled item pickups, to ensure that an item delivery from an appropriate locker 102 has been completed before the scheduled pickup, so that the same locker 102 may be reused for the pickup.

In addition to the initial delivery route determination and optimization, the item delivery system 606 and/or the delivery vehicle 608 may re-determine and/or re-optimize the delivery route based on data received during the execution of a delivery route by the delivery vehicle 608. For instance, in response to requests for delivery modifications, cancelations, or item rejections that are received while the delivery vehicle 608 is on-route, the item delivery system 606 and/or the delivery vehicle 608 may re-optimize the delivery route on-the-fly, using similar or identical techniques to those used for the initial route determination while taking into account the requested delivery modification or cancelation. Additionally, if all items designed for pickup at a shared delivery hub are picked-up before the ending time of the designated delivery window, then the item delivery system 606 and/or the delivery vehicle 608 may re-optimize the delivery route to take into account the additional available time. Delivery route re-optimization also may be performed on-the-fly, in response to location tracking data for the item recipients, and/or in response to changes in traffic conditions, weather conditions, or road conditions, etc.

After the item delivery system 606 determines a delivery route to a number of recipient locations, the delivery vehicle 608 may drive the route in the determined order to stop for a delivery at each of the recipient locations at the determined time associated with each location. For each recipient location, the delivery vehicle 608 may transmit notifications to the recipient's mobile device 602 when approaching the location and/or at arrival at the location, and then may wait a predetermined amount of time for the user 601 to retrieve from or deposit into the delivery vehicle 608 the appropriate items to complete the delivery or return. For instance, the delivery vehicle 608 (or merchant system 604 or item delivery system 606) may transmit a notification to the recipient's mobile device 602 asking the user 601 to confirm a pick-up time and location. In some instances, if the user 601 does not respond within a threshold amount of time, or if the user rejects the pick-up time/location, the delivery vehicle 608 may re-route to a next stop or delivery location. In some examples, if the recipient does not complete the delivery in a predetermined amount of time after the delivery vehicle 608 arrives at the recipient location, the delivery vehicle 608 may proceed to the next recipient location to maintain compliance with the times and locations of the delivery route. The predetermined wait time for a delivery vehicle 608 may be a fixed amount (e.g., 2 minutes, 5 minutes, 10 minutes, etc.), or may vary based on user preferences, the initial design of the delivery route, and/or an on-the-fly calculation of how far ahead or behind schedule the delivery vehicle 608 is currently within the delivery route. In some examples, a recipient associated with an item may be provided an option (e.g., via an alert on a mobile application or web page on the user's mobile device 602) to pay an additional amount for the delivery vehicle 608 to wait at the delivery location for an additional amount of time (e.g., "Your delivery vehicle has arrived at the scheduled location and will wait for 5 minutes. Do you need a little extra time to meet the vehicle? Pay $5 for an extra 10 min)." Notifications with options for the delivery vehicle 608 to remain at the delivery location for a longer period of time, or for the delivery vehicle 608 to move to a different location (e.g., drive directly to the user's current location) may be transmitted to the user's mobile device 602 when the delivery vehicle 608 arrives at the delivery location, and/or if the item has not been picked-up from the delivery vehicle 608 at the end of the initial predetermined wait time.

As discussed above, in some examples the item delivery system 606 may determine a delivery route in which the delivery vehicle 608 does not stop at the recipient location for every recipient. Instead, the delivery route may comprise fewer stops than there are recipients for the items within the delivery vehicle 608, where the stops may be shared (or common) delivery locations that are centrally located and/or accessible to multiple recipients.

Figure 10:
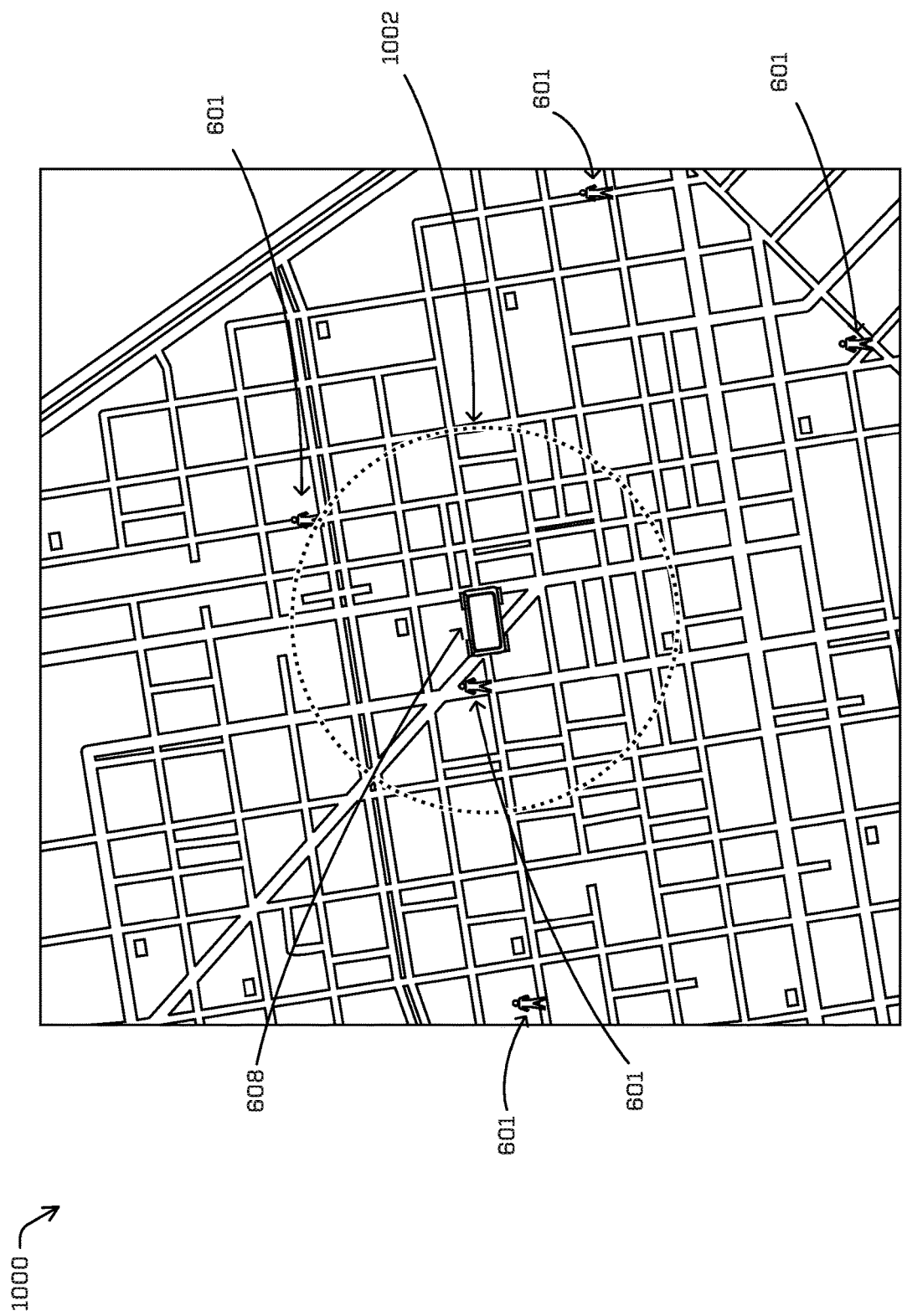
FIG. 10 is a street grid diagram depicting a delivery vehicle at a delivery location, in accordance with implementations of the disclosure.

FIG. 10 is a diagram 1000 showing a grid of streets, including a delivery vehicle 608 parked at a delivery location that is accessible and relatively central to a number of different recipients or users 601. In some examples, the diagram 1000 may be sent to the mobile device 602 of the user 601 for display via a user interface of an application (e.g., a web browser, a merchant application, an item delivery application, etc.) on the mobile device 602. In this example, each recipient may receive a delivery confirmation and/or notification informing them of the delivery location and time window at which the delivery vehicle 608 will be parked at the location. As shown in FIG. 10, in some cases a delivery route may consist of a single delivery location that is accessible to all of the users/recipients assigned to the delivery vehicle 608. In other cases, a delivery route may include multiple delivery locations, and a time window for each location during which the delivery vehicle 608 will be parked at the location. For instance, for a 12-hour delivery time window for delivery vehicle 608, a first possible delivery route may include a single delivery location at which the delivery vehicle 608 is parked for 12 hours, a second example delivery route may include three delivery locations where the delivery vehicle 608 may be parked at each location for 4 hours, a third example delivery route may include 12 separate delivery locations where the delivery vehicle 608 is parked at each location for one hour, and so on. A delivery route may include any number of delivery locations and any associated time window at which the delivery vehicle 608 may be parked at each delivery location. The length of the time windows may be the same for each delivery location in a delivery route, or may vary so that the delivery vehicle 608 may be parked at certain delivery locations for longer periods of time than at other locations within a route.

For scenarios in which the delivery vehicle stops at a number of common/shared delivery locations, rather than driving to each recipient location, the item delivery system 606 may determine a preferred or optimal delivery route using similar or identical techniques to those discussed above for delivery routes with direct delivery to recipient locations. However, because the determined delivery route need not stop at each recipient location, the output from a route generation/optimization model or algorithm in these examples may include the number of delivery locations in the route (e.g., anywhere between one and the total number of recipients), the address or coordinates for each delivery location, and the time window (e.g., start time and duration) at which the delivery vehicle 608 will park and wait at each delivery location. The delivery route determined by the item delivery system 606 may be compatible with the delivery request data provided by each of the recipients, so that each recipient has at least one opportunity to access the delivery vehicle 608 during the route. In some instances, the user 601 may be given the option to cancel pickup at one location along the route and reschedule to meet the delivery vehicle 608 at a subsequent location along the scheduled route. Additionally, in various examples, the item delivery system 606 may optimize the delivery route with respect to one or a combinations of factors, such as minimizing the distance between the recipients and delivery locations, maximizing the number of delivery locations and/or that cumulative amount of time for each recipient that the delivery vehicle 608 is accessible to (e.g., within a threshold distance or threshold driving time of) the recipient.

Figure 11:
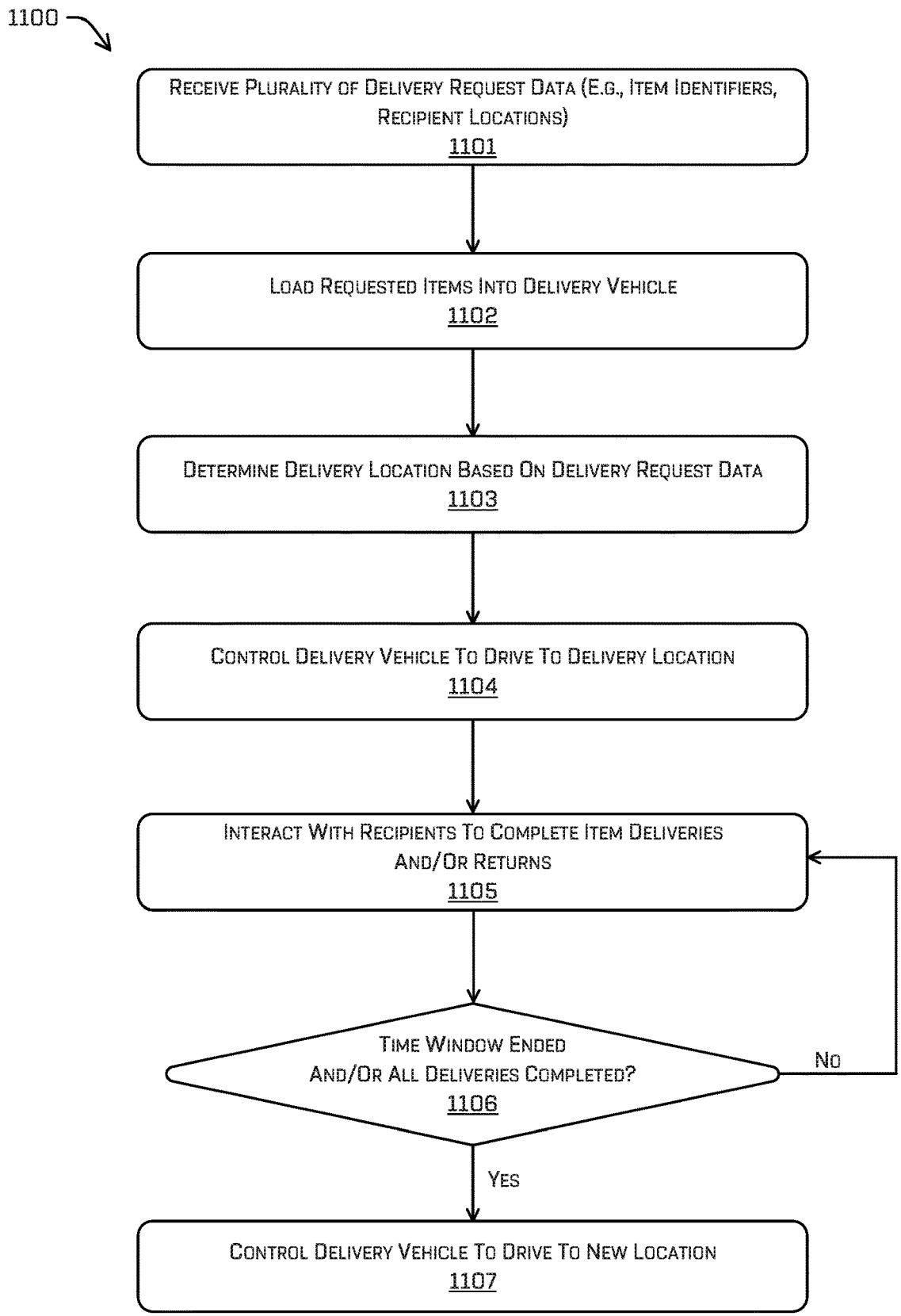
FIG. 11 is a flow diagram illustrating an example process for determining and executing a delivery route to a delivery location, in accordance with implementations of the disclosure.

FIG. 11 illustrates a flow diagram of an example process 1100 for determining a delivery route comprising a delivery location, and then driving a delivery vehicle 608 to the location to allow recipients to complete item deliveries and/or returns at the delivery vehicle 608. In some examples, an item delivery system 606 may determine a delivery route compatible with the delivery request data (e.g., ranges of delivery times and locations) for each recipient and/or may optimize the delivery route with respect to delivery vehicle 608 driving time or costs, recipient proximity, recipient opportunities to access the delivery vehicle 608, etc.

At 1101, the item delivery system 606 may receive delivery request data for a plurality of recipients. The delivery request data may include data relating to items to be delivered to the recipient (e.g., merchant identifiers, order identifiers, item identifiers, etc.), as well as data relating to the delivery preferences of the recipient (e.g., delivery times, locations, etc.).

At 1102, the item delivery system 606 may initiate the loading of the items requested for delivery, into a delivery vehicle 608. In some examples, the item delivery system 606 may transmit instructions to control the delivery vehicle 608 to drive to one or more merchant locations at which the items may be loaded into the vehicle.

At 1103, the item delivery system 606 may determine a delivery location for a delivery route, based on the delivery request data received at 1101 for the recipients. As described above, the delivery location may be a single standalone location determined based on its accessibility to the plurality of recipients, and/or may be one of multiple delivery locations in a delivery route.

At 1104, the delivery vehicle 608 may drive to the determined delivery location and park, after which, at 1105, the delivery vehicle 608 may be accessible to interact with recipients to complete item deliveries and/or returns. In some examples, the item delivery system 606 may control the delivery vehicle 608 by transmitting driving instructions including the delivery location and arrival time to the delivery vehicle 608. However, the delivery vehicle 608 may operate autonomously to control its trajectories to navigate to the delivery location.

In some cases, while the delivery vehicle 608 is driving the delivery location and/or upon arrival at the delivery location, the item delivery system 606 or delivery vehicle 608 may transmit notifications to recipients. Such notifications may include the current location of the delivery vehicle 608, the precise delivery location, the amount of time that the vehicle will stay at the delivery location, and/or a listing of items on-board the vehicle that are designated for delivery to the recipient. In some cases, each delivery location may be associated with a subset of the recipients for a loaded delivery vehicle 608, and notifications may be transmitted to those recipients associated with the delivery location and not to recipients associated with the other delivery locations of a delivery route. For example, notifications may be transmitted to any recipients within a predetermined range 1002 (e.g., 0.5 mile radius) of the delivery vehicle 608, during the time window that the vehicle is parked at the delivery location.

At 1106, after the delivery vehicle 608 has been parked at the delivery location for a period of time, the delivery vehicle 608 and/or the item delivery system 606 may determine when the delivery vehicle 608 is to be driven to a different location. In this example, the delivery vehicle 608 may leave the delivery location in response to the end of the designated time window for parking the vehicle at the delivery location, and/or an indication from the delivery vehicle 608 that all of the deliveries (and/or returns) scheduled for the delivery location have been performed.

When the delivery vehicle 608 and/or the item delivery system 606 determines that the delivery vehicle 608 should be driven to a different location (1106: Yes), then at 1107 the delivery vehicle 608 may be controlled again to drive to a new location. In various examples, the new location may be the next location in a delivery route, an item pick-up location (e.g., merchant warehouse) to receive a new load of items for delivery, an item drop-off location (e.g., merchant retail location or return certain) to unload returned items, or a passenger pickup location to pick up a passenger to be transported to a destination.

As noted above, in some item delivery and/or item return scenarios, the user 601 may be in a different autonomous passenger vehicle, on-route between a source and destination location. In such examples, the item delivery system 606 may determine a delivery route for delivery vehicle 608, the passenger vehicle containing the recipient, or for both vehicles, so that the vehicles come into proximity each other at some point during the recipient's trip to the destination location.

Figure 12:
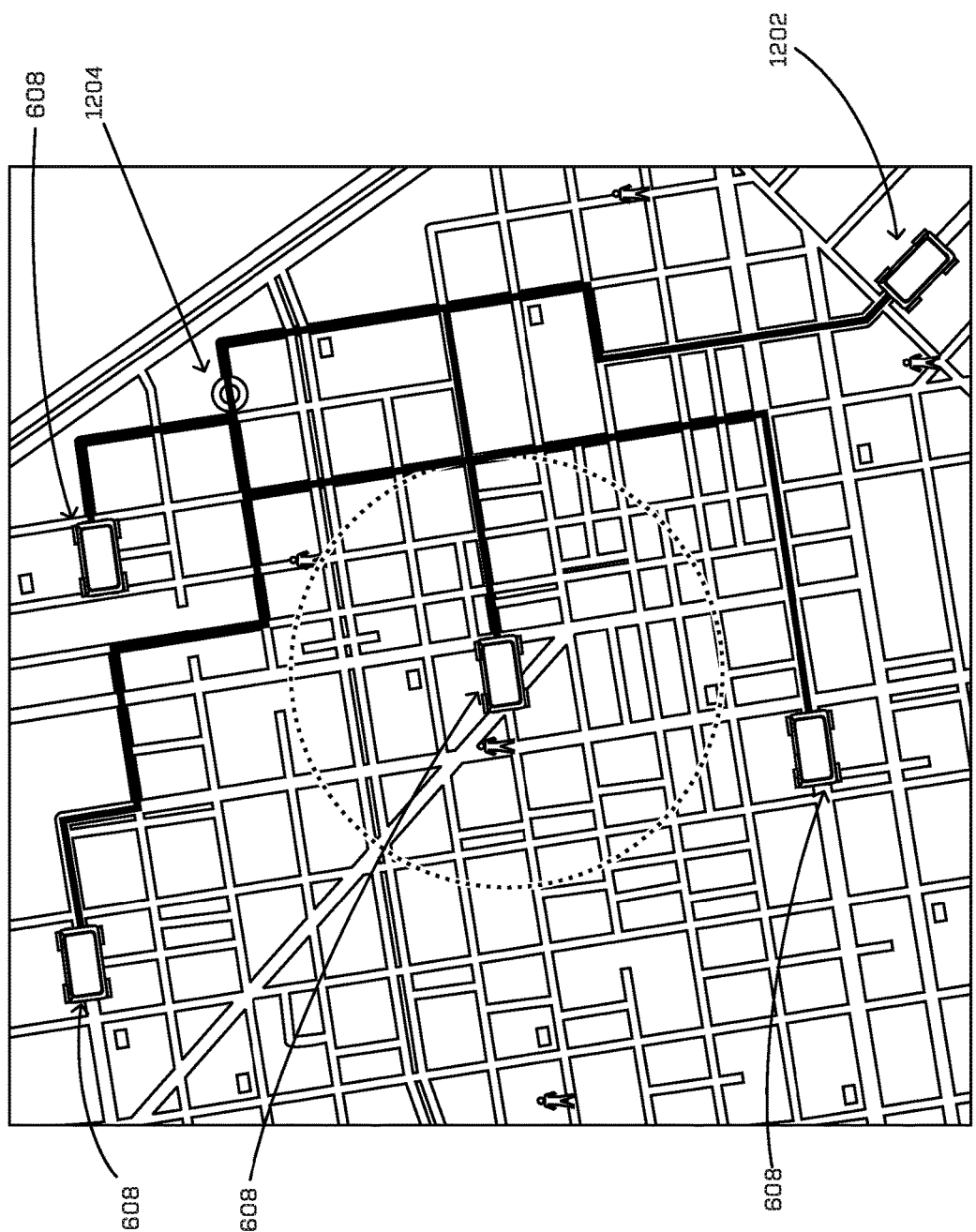
FIG. 12 is a street grid diagram depicting multiple delivery vehicles, in accordance with implementations of the disclosure.

FIG. 12 is another diagram 1200 showing a grid of streets including multiple delivery vehicles 608, each driving a separate delivery route. A passenger vehicle 1202 is also shown driving within the street grid, on-route to a destination location. In some examples, when the user 601 initiates and/or reserves the passenger vehicle 1202 for the trip to the destination, the item delivery system 606 may determine if there are any items that are scheduled for delivery to the user 601 and available for pick-up (e.g., via a merchant warehouse or other pick-up location). If so, the item delivery system 606 may transmit a notification to the user 601, providing the user with the option to schedule a delivery of the user's items on-route during their trip to the destination. When the user 601 accepts the option to schedule an on-route item delivery, the item delivery system 606 may determine delivery routes for both the user's passenger vehicle and the delivery vehicle 608, so that both vehicles arrive at a common location 1204 at the same time during the user's trip, making the delivery vehicle accessible to the user 601 to complete their item deliveries and/or returns on-route to their destination, with minimal delay or inconvenience.

In some examples, for any of the item delivery and/or item return scenarios discussed herein, the item delivery system 606 and/or the delivery vehicle 608 itself may monitor the progress and activities of the vehicle during the delivery route, and may perform on-the-fly modifications to the delivery route as needed. On-the-fly modifications to delivery routes may be determined and initiated by the item delivery system 606 and/or the delivery vehicle 608. For instance, the item delivery system 606 may detect any number of conditions related to a delivery vehicle 608 on a delivery route, and may update the vehicle's delivery route in response to the conditions.

When a delivery vehicle 608 is driving a delivery route to delivery items directly to recipient locations, various conditions including successful deliveries and unsuccessful deliveries, cancelations or changes to scheduled deliveries requested by recipients, or on-route driving delays caused by traffic, weather, or mechanical issues. For instance, if a recipient misses a scheduled delivery at the recipient's location, they may receive a notification with an option to reschedule the delivery at later point during the delivery route. In such cases, the recipient also may have option of accessing the delivery vehicle 608 at another delivery location on the originally scheduled route. As another example, if all of the item deliveries and/or returns designated for a certain delivery location are performed early in the time window for that location, the item delivery system 606 may modify the route to perform additional deliveries and/or to complete the scheduled deliveries earlier or more efficiently. Additionally, if a recipient requests a modification or cancelation of an item delivery while the delivery vehicle 608 is already on-route, the item delivery system 606 may modify the to change or exclude the item delivery, and/or may re-optimize the remaining delivery route to accommodate the modification or cancelation received from the recipient.

For scenarios in which the delivery vehicle 608 stops at a number of common/shared delivery locations, rather than driving to each recipient location, the item delivery system 606 may use similar data and techniques to determine and initiated route modifications. For instance, in response to a recipient requests for delivery modifications or cancelations, the item delivery system 606 may determine an updated delivery route, including an updated number of delivery locations (or stops on the route), updated addresses or coordinates for the delivery locations, and/or updated time windows for the delivery locations. In some examples, the item delivery system 606 also may determine updated subsets of the recipients that are assigned to each delivery location. Similar route modifications may be performed in response to item deliveries and/or returns being missed, or being performed more quickly than expected by the recipients.

Figure 13:
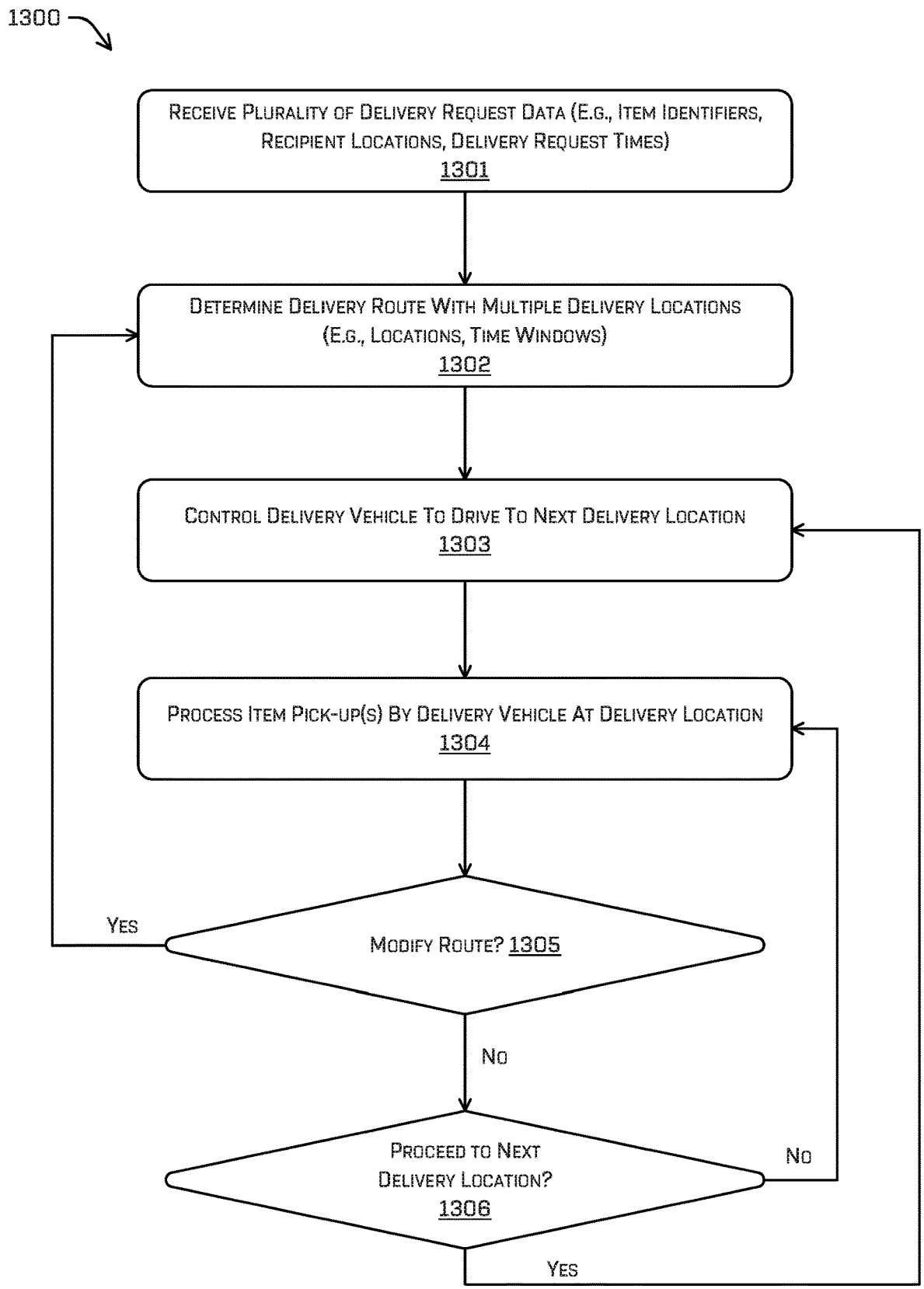
FIG. 13 is a flow diagram illustrating an example process for modifying a delivery route of a delivery vehicle, in accordance with implementations of the disclosure.

FIG. 13 illustrates a flow diagram of an example process 1300 for performing an on-the-fly modification of a delivery route for a delivery vehicle 608. In various examples, modifications to the route of a delivery vehicle 608 may be determined by an item delivery system 606 and/or by the delivery vehicle 608 itself. Such modifications may be triggered and determined based on analyses of the previous successful or unsuccessful deliveries completed during the delivery route, as well as other delivery factors such as cancelations or changes to scheduled deliveries requested by recipients, on-route driving delays caused by traffic, weather, mechanical issues, etc.

At 1301, the item delivery system 606 may receive delivery request data for a plurality of recipients. The delivery request data may include data relating to items to be delivered to the recipient (e.g., merchant identifiers, order identifiers, item identifiers, etc.), as well as data relating to the delivery preferences of the recipient (e.g., requested delivery times, locations, etc.).

At 1302, the item delivery system 606 may determine a delivery route with multiple delivery locations and associated time windows, based on the delivery request data received at 1301.

At 1303, the delivery vehicle 608 may proceed with the delivery route, driving in order to the determined delivery locations at the time windows associated with each location, and then parking so the vehicle may be accessible to recipients to complete item deliveries and/or returns. As noted above, the item delivery system 606 may control the delivery vehicle 608 remotely in some examples, by transmitting driving instructions including the delivery locations and arrival times to the delivery vehicle 608.

At 1304, one or more item deliveries and/or item returns may be completed at the delivery vehicle 608 at a delivery point on the delivery route. In some examples, the item delivery or return at 1304 may correspond to an unsuccessful item delivery or return (e.g., a missed time window or a user authentication failure) by a recipient. As an example, the delivery vehicle 608 may use one or more sensors (e.g., internal sensors within an access locker) to detect removal of an item from the access locker and/or insertion of an item into the access locker. Such sensors may include, for instance, weight sensors of the access locker, internal cameras within the access locker, and/or item scanners within the access locker. After determining based on the sensor data that one or more items have been removed from and/or inserted into the access locker, the delivery vehicle 608 may update a datastore associated with the user with an indication that the user has received or deposited an item. Additionally, as described below in operation 1306, the determination that items have been removed from and/or inserted into the access locker may cause the delivery vehicle 608 to navigate to a new delivery location.

At 1305, in response to detection of the item deliveries and/or item returns, the item delivery system 606 may determine whether or not to modify the current route of the delivery vehicle 608. As discussed above, modifications to delivery routes may be initiated in response to successful and unsuccessful deliveries, changes or cancelations in delivery requests, and/or other factors. Based on any or all of the on-route data received by the item delivery system 606, the item delivery system 606 may determine that the delivery route for delivery vehicle 608 may be modified (1305: Yes), in which case the example process may return to 1302 to redetermine a delivery route that is compatible with the remaining item deliveries and returns, and/or is optimized by the item delivery system 606. In other cases, the item delivery system 606 may determine that the delivery route for delivery vehicle 608 need not be modified (1305: No), in which case example process may proceed to 1306.

At 1306, the delivery vehicle 608 and/or item delivery system 606 may determine whether or not the delivery vehicle 608 should drive to the next delivery location on the delivery route. For instance, if the predetermined time window for a delivery location has elapsed, or the time window has not yet elapsed but all of the item deliveries and returns scheduled for the delivery location have been completed, then the item delivery system 606 may determine instruct the delivery vehicle 608 to proceed to the next delivery location in the route.

In some examples, the delivery vehicle 608 driving a predefined delivery route may determine whether to stop at a particular delivery location or to bypass the delivery location, based on the presence or absence of deliveries and/or requests for items to be delivered or returned at that delivery location. For instance, when the delivery vehicle 608 approaches a delivery location (e.g., within a particular time or distance threshold), or when the delivery vehicle 608 arrives at the delivery location, it may access an item delivery request/status datastore to determine a delivery stop signal. For instance, a delivery stop signal may include a determination by the delivery that an item currently stored in the delivery vehicle is associated with the delivery location, or that a user request is associated with a request to deposit an item within the delivery vehicle at the delivery location. In this example, a delivery stop signal may cause to the delivery vehicle 608 to drive to and stop at the delivery location for a time window, whereas the absence of a delivery stop signal may cause to the delivery vehicle 608 to drive a next location along the predefined delivery route.

EXAMPLE CLAUSES

A. A vehicle comprising: multiple access lockers arranged to house multiple items; one or more processors; and one or more non-transitory computer-readable media storing instructions that, when executed by the one or more processors, cause the vehicle to perform operations comprising: receiving a locker access request comprising a first identifier, wherein the first identifier is associated with a user and a user location; determining a location of the vehicle at a time associated with the locker access request; causing the vehicle to navigate to the user location; authorizing the locker access request, based at least in part on the first identifier, the location of the vehicle, and the user location; and based at least in part on authorizing the locker access request: determining a first locker on the vehicle; and providing access to an interior portion of the first locker, from a position exterior to the vehicle.

B. The vehicle of paragraph A, wherein providing access to the interior portion of the first locker comprises: activating a motor to drive a tray of the first locker into an open position; detecting, by a sensor of the vehicle, a removal of an item from the first locker; and activating the motor to drive the tray of the first locker into a closed position.

C. The vehicle of paragraph A, wherein the first locker includes a sensor, the sensor comprising at least one of a weight sensor, an internal camera, or a scanner, and wherein providing access to the interior portion of the first locker comprises: determining, based on data received from the sensor, that an item has been inserted into the first locker; and controlling the vehicle based at least in part on determining that the item has been inserted into the first locker.

D. The vehicle of paragraph C, wherein providing access to the interior portion of the first locker further comprises: updating a database to indicate the item has been received from the user.

E. The vehicle of paragraph A, the operations further comprising: transmitting a notification to a device associated with the user based at least in part on determining that the vehicle is within a threshold distance of the user location.

F. A method comprising: controlling a delivery robot comprising an access locker to traverse through a plurality of access locations along a predefined route; receiving, at the delivery robot, a locker access request from a user device; determining an identifier associated with the locker access request; determining a location of the delivery robot at a time associated with the locker access request, the location comprising an access location of the plurality of access locations; authorizing the locker access request, wherein the authorizing is based at least in part on the identifier and the location; and providing access to a first locker of the delivery robot associated with the locker access request.

G. The method of paragraph F, wherein the access locker is one of a plurality of access lockers, and wherein providing access to the first locker comprises activating a motor arranged to drive a tray of the first locker into an open position.

H. The method of paragraph F, wherein authorizing the locker access request comprises one or more of: comparing the time associated with the locker access request to an access time window associated with the first locker, or comparing a location associated with the locker access request with the location of the delivery robot.

I. The method of paragraph F, further comprising: detecting, by a sensor of the delivery robot, at least one of a removal of an item from the first locker or an insertion of an item into the first locker; controlling the delivery robot based at least in part on the detecting; and updating a datastore associated with a user with an indication that the user has received or deposited the item.

J. The method of paragraph F, wherein controlling the delivery robot comprises: determining, as a delivery stop signal, one or more of: an item currently stored in the delivery robot is associated with the location, or the locker access request is associated with a request to deposit an item with the delivery robot; and causing the delivery robot to drive to a delivery location based at least in part on the delivery stop signal.

K. The method of paragraph F, wherein the identifier is a first identifier associated with at least one of a user device or an item stored for delivery in the first locker, and wherein authorizing the locker access request comprises: determining a second identifier associated with the user device; and determining that the first identifier and the second identifier are associated in a delivery data store.

L. The method of paragraph F, further comprising: transmitting a notification to the user device based at least in part on determining that the delivery robot is within a threshold distance of a delivery location associated with the first locker.

M. The method of paragraph F, wherein the first locker of the delivery robot includes a sensor comprising at least one of a weight sensor, an internal camera, or a scanner, and wherein providing access to the first locker comprises: determining, based on data received from the sensor, that an item has been inserted into first locker; and controlling the delivery robot based at least in part on determining that the item has been inserted into the first locker.

N. One or more non-transitory computer-readable media storing processor-executable instructions that, when executed by one or more processors, cause the one or more processors to perform operations comprising: controlling a delivery robot comprising an access locker to traverse through a plurality of access locations along a predefined route; receiving, at the delivery robot, a locker access request from a user device; determining an identifier associated with the locker access request; determining a location of the delivery robot at a time associated with the locker access request, the location comprising an access location of the plurality of access locations; authorizing the locker access request, wherein the authorizing is based at least in part on the identifier and the location; and providing access to a first locker of the delivery robot associated with the locker access request.

O. The one or more non-transitory computer-readable media of paragraph N, wherein the access locker is one of a plurality of access lockers, and wherein providing access to the first locker comprises activating a motor arranged to drive a tray of the first locker into an open position.

P. The one or more non-transitory computer-readable media of paragraph N, wherein authorizing the locker access request comprises one or more of: comparing the time associated with the locker access request to an access time window associated with the first locker, or comparing a location associated with the locker access request with the location of the delivery robot.

Q. The one or more non-transitory computer-readable media of paragraph N, the operations further comprising: detecting, by a sensor of the delivery robot, at least one of a removal of an item from the first locker or an insertion of an item into the first locker; controlling the delivery robot based at least in part on the detecting; and updating a datastore associated with a user with an indication that the user has received or deposited the item.

R. The one or more non-transitory computer-readable media of paragraph N, wherein controlling the delivery robot comprises: determining, as a delivery stop signal, one or more of: an item currently stored in the delivery robot is associated with the location, or the locker access request is associated with a request to deposit an item with the delivery robot; and causing the delivery robot to drive to a delivery location based at least in part on the delivery stop signal.

S. The one or more non-transitory computer-readable media of paragraph N, wherein the identifier is a first identifier associated with at least one of a user device or an item stored for delivery in the first locker, and wherein authorizing the locker access request comprises: determining a second identifier associated with the user device; and determining that the first identifier and the second identifier are associated in a delivery data store.

T. The one or more non-transitory computer-readable media of paragraph N, the operations further comprising: transmitting a notification to the user device based at least in part on determining that the delivery robot is within a threshold distance of a delivery location associated with the first locker.

U. A system comprising: one or more processors; and one or more non-transitory computer-readable media storing instructions that, when executed by the one or more processors, cause the system to perform operations comprising: receiving first recipient location data associated with a first delivery identifier and second recipient location data associated with a second delivery identifier; receiving a first indication of a first locker of an autonomous delivery vehicle associated with the first delivery identifier; receiving a second indication of a second locker of the autonomous delivery vehicle associated with the second delivery identifier; determining a delivery location based at least in part on the first recipient location data and the second recipient location data, wherein the delivery location is different from the first recipient location data and the second recipient location data; and causing the autonomous delivery vehicle to drive to the delivery location.

V. The system of paragraph U, the operations further comprising: determining, as confirmation data, that requests associated with the first and second delivery identifiers have been fulfilled, the requests comprising one or more of receiving an item or depositing an item; and causing the autonomous delivery vehicle to drive to a second location, based at least in part on the confirmation data.

W. The system of paragraph U, the operations further comprising: determining that: a delivery time window associated with the delivery location has elapsed; and that requests associated with the first and second delivery identifiers have been unfulfilled, the requests comprising one or more of receiving an item or depositing an item; and causing the autonomous delivery vehicle to drive to a second location, based at least in part on the determining that the delivery time window has elapsed.

X. The system of paragraph U, the operations further comprising: receiving, while the autonomous delivery vehicle is traversing to the delivery location, updated first recipient location data associated with the first delivery identifier; determining at least one of an updated delivery location or an updated delivery time window, based at least in part on the updated first recipient location data; and transmitting, to the autonomous delivery vehicle, the at least one of the updated delivery location or the updated delivery time window.

Y. The system of paragraph U, the operations further comprising: determining that the autonomous delivery vehicle is traversing to the delivery location; and transmitting a notification to a user device associated with at least one of the first delivery identifier or the second delivery identifier, based at least in part on determining that the autonomous delivery vehicle is within at least one of a threshold distance or a threshold time of the delivery location.

Z. A method comprising: receiving, by an item delivery system, first recipient location data associated with a first request; receiving, by the item delivery system, second recipient location data associated with a second request; determining, by the item delivery system, a delivery location for a delivery vehicle based at least in part on the first recipient location data and the second recipient location data, wherein the delivery location is different from the first recipient location data or the second recipient location data; and transmitting, by the item delivery system, the delivery location to the delivery vehicle, wherein transmitting the delivery location to the delivery vehicle causes the delivery vehicle to traverse to the delivery location.

AA. The method of paragraph Z, wherein: the first request is associated with a first requested delivery time, the second request is associated with a second requested delivery time, and the delivery location is determined based at least in part on the first requested delivery time and the second requested delivery time.

AB. The method of paragraph Z, wherein determining the delivery location comprises: determining a first distance between the delivery location and the first recipient location data; and determining a second distance between the delivery location and the second recipient location data.

AC. The method of paragraph Z, further comprising: determining, as confirmation data, that the first and second requests have been fulfilled, the first and second requests comprising one or more of a request to deposit an item or a request to receive an item; and causing the delivery vehicle to drive to a second location, based at least in part on the confirmation data.

AD. The method of paragraph Z, further comprising: causing the delivery vehicle to drive to the delivery location; determining that: a delivery time window associated with the delivery location has elapsed; and the first request and the second request have been unfulfilled, wherein the first request and the second request comprising one or more of receiving an item or depositing an item; and causing the delivery vehicle to drive to a second location, based at least in part on the determining that the delivery time window has elapsed.

AE. The method of paragraph Z, further comprising: receiving, while the delivery vehicle is traversing to the delivery location, updated first recipient location data associated with the first request; determining at least one of an updated delivery location or an updated delivery time window, based at least in part on the updated first recipient location data; and transmitting, to the delivery vehicle, the at least one of the updated delivery location or the updated delivery time window.

AF. The method of paragraph Z, further comprising: determining that the delivery vehicle is traversing to the delivery location; and transmitting a notification to a user device associated with at least one of the first request or the second request, based at least in part on determining that the delivery vehicle is within at least one of a threshold distance or a threshold time of the delivery location.

AG. The method of paragraph Z, further comprising: receiving third recipient location data associated with a third request; determining a second delivery location for the delivery vehicle, based at least in part on the third recipient location data, wherein the second delivery location is different from the delivery location; and determining a first delivery time window associated with the delivery location and a second delivery time window associated with the second delivery location, wherein the first delivery time window and the second delivery time window are determined based at least in part on the delivery location and the second delivery location.

AH. One or more non-transitory computer-readable media storing processor-executable instructions that, when executed by one or more processors, cause the one or more processors to perform operations comprising: receiving first recipient location data associated with a first request; receiving second recipient location data associated with a second request; determining a delivery location for a delivery vehicle based at least in part on the first recipient location data and the second recipient location data, wherein the delivery location is different from the first recipient location data or the second recipient location data; and transmitting the delivery location to the delivery vehicle, wherein transmitting the delivery location to the delivery vehicle causes the delivery vehicle to traverse to the delivery location.

AI. The one or more non-transitory computer-readable media of paragraph AH, wherein: the first request is associated with a first requested delivery time, the second request is associated with a second requested delivery time, and the delivery location is determined based at least in part on the first requested delivery time and the second requested delivery time.

AJ. The one or more non-transitory computer-readable media of paragraph AH, wherein determining the delivery location comprises: determining a first distance between the delivery location and the first recipient location data; and determining a second distance between the delivery location and the second recipient location data.

AK. The one or more non-transitory computer-readable media of paragraph AH, the operations further comprising: determining, as confirmation data, that the first and second requests have been fulfilled, the first and second requests comprising one or more of a request to deposit an item or a request to receive an item; and causing the delivery vehicle to drive to a second location, based at least in part on the confirmation data.

AL. The one or more non-transitory computer-readable media of paragraph AH, the operations further comprising: causing the delivery vehicle to drive to the delivery location; determining that: a delivery time window associated with the delivery location has elapsed; and the first request and the second request have been unfulfilled, wherein the first request and the second request comprising one or more of receiving an item or depositing an item; and causing the delivery vehicle to drive to a second location, based at least in part on the determining that the delivery time window has elapsed.

AM. The one or more non-transitory computer-readable media of paragraph AH, the operations further comprising: receiving, while the delivery vehicle is traversing to the delivery location, updated first recipient location data associated with the first request; determining at least one of an updated delivery location or an updated delivery time window, based at least in part on the updated first recipient location data; and transmitting, to the delivery vehicle, the at least one of the updated delivery location or the updated delivery time window.

AN. The one or more non-transitory computer-readable media of paragraph AH, the operations further comprising: determining that the delivery vehicle is traversing to the delivery location; and transmitting a notification to a user device associated with at least one of the first request or the second request, based at least in part on determining that the delivery vehicle is within at least one of a threshold distance or a threshold time of the delivery location.

AO. A vehicle comprising: a drive assembly; a vehicle body; a fastening system configured to couple the vehicle body to the drive assembly; and a locker cassette comprising a plurality of storage lockers, wherein the locker cassette is removably and non-destructively coupled to at least one of the drive assembly or the vehicle body.

AP. The vehicle of paragraph AO, further comprising a passenger cassette containing a passenger compartment removably and non-destructively coupled to at least one of the drive assembly or the vehicle body.

AQ. The vehicle of paragraph AP, wherein a first storage locker of the plurality of storage lockers is accessible from a position exterior to the vehicle and a second storage locker of the plurality of storage lockers is accessible from within the passenger compartment.

AR. The vehicle of paragraph AO, wherein the vehicle body comprises a receptacle sized to receive the locker cassette, and wherein the locker cassette is removably and non-destructively coupled within the receptacle of the vehicle body.

AS. The vehicle of paragraph AO, wherein: the locker cassette is formed integrally with the vehicle body; and the fastening system is configured to removably and non-destructively couple the vehicle body including the locker cassette to the drive assembly.

AT. A method comprising: receiving, by an item delivery system, item specification data associated with an item to be delivered, the item specification data including at least one of an item weight, an item size, or an item type; determining, by the item delivery system, a cassette including a configuration of lockers, based at least in part on the item specification data; and causing, by the item delivery system, the cassette to be attached to at least one of a vehicle body or a drive assembly of a delivery vehicle.

AU. The method of paragraph AT, further comprising: determining, based at least in part on the item specification data, the cassette from a plurality of cassettes; and causing loading of the item into a locker of the cassette, wherein the loading of the item is performed before the cassette is attached to the at least one of the vehicle body or the drive assembly of the delivery vehicle.

AV. The method of paragraph AU, wherein the cassette further comprises a second item in a second locker of the cassette, and wherein the item and the second item are determined from a plurality of items for inclusion in the cassette based at least in part on an optimal route for delivery.

AW. The method of paragraph AT, further comprising: causing loading of a second item into a second locker of the cassette, wherein loading the second item comprises detaching the cassette, loading the second item into the second locker, and reattaching the cassette.

AX. The method of paragraph AT, wherein determining the cassette comprises: determining a transportation requirement associated with the item, wherein the transportation requirement comprises at least one of a locker temperature requirement, a locker padding requirement, or a locker security requirement; and determining that the cassette satisfies the transportation requirement associated with the item.

AY. The method of paragraph AT, further comprising: determining a pick-up location associated with the item; determining a destination location associated with the item; determining a route including the pick-up location and the destination location; and transmitting the route to the delivery vehicle.

AZ. The method of paragraph AT, wherein the cassette is a first cassette, the method further comprising: causing a second cassette to be attached to at least one of the vehicle body or the drive assembly of the delivery vehicle, wherein the second cassette comprises a passenger cassette comprising a passenger compartment.

BA. The method of paragraph AZ, further comprising: determining a first pick-up location associated with the item; determining a second pick-up location associated with a passenger; determining a destination location associated with the passenger; determining a route including the first pick-up location, the second pick-up location, and the destination location; and transmitting the route to the delivery vehicle.

BB. The method of paragraph BA, wherein determining the first cassette is based at least in part on determining a locker of the first cassette is accessible from within the passenger compartment.

BC. The method of paragraph AT, wherein the vehicle body comprises a receptacle sized to receive the cassette, and wherein the cassette is removably and non-destructively coupled within the receptacle of the vehicle body.

BD. The method of paragraph AT, wherein: the cassette is formed integrally with the vehicle body; and the vehicle body including the cassette is removably and non-destructively coupled to the drive assembly.

BE. One or more non-transitory computer-readable media storing processor-executable instructions that, when executed by one or more processors, cause the one or more processors to perform operations comprising: receiving, by an item delivery system, item specification data associated with an item to be delivered, the item specification data including at least one of an item weight, an item size, or an item type; determining, by the item delivery system, a cassette including a configuration of lockers, based at least in part on the item specification data; and causing, by the item delivery system, the cassette to be attached to at least one of a vehicle body or a drive assembly of a delivery vehicle.

BF. The one or more non-transitory computer-readable media of paragraph BE, wherein determining the cassette comprises: determining a transportation requirement associated with the item, wherein the transportation requirement comprises at least one of a locker temperature requirement, a locker padding requirement, or a locker security requirement; and determining that the cassette satisfies the transportation requirement associated with the item.

BG. The one or more non-transitory computer-readable media of paragraph BE, wherein the cassette is a first cassette, the operations further comprising: causing a second cassette to be attached to at least one of the vehicle body or the drive assembly of the delivery vehicle, wherein the second cassette comprises a passenger cassette comprising a passenger compartment.

BH. The one or more non-transitory computer-readable media of paragraph BG, the operations further comprising: determining a first pick-up location associated with the item; determining a second pick-up location associated with a passenger; determining a destination location associated with the passenger; determining a route including the first pick-up location, the second pick-up location, and the destination location; and transmitting the route to the delivery vehicle.

While the example clauses described above are described with respect to particular implementations, it should be understood that, in the context of this document, the content of the example clauses can be implemented via a method, device, system, a computer-readable medium, and/or another implementation. Additionally, any of examples A-BH may be implemented alone or in combination with any other one or more of the examples A-BH.

CONCLUSION

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed in any other component. It should also be understood, that components or steps discussed with respect to one example or implementation may be used in conjunction with components or steps of other examples.

A non-limiting list of agents and other objects in an environment may include but is not limited to pedestrians, animals, cyclists, trucks, motorcycles, other vehicles, or the like. Such objects in the environment have a "geometric pose" (which may also be referred to herein as merely "pose") comprising a location and/or orientation of the overall object relative to a frame of reference. In some examples, pose may be indicative of a position of an object (e.g., pedestrian), an orientation of the object, or relative appendage positions of the object. Geometric pose may be described in two-dimensions (e.g., using an x-y coordinate system) or three-dimensions (e.g., using an x-y-z or polar coordinate system), and may include an orientation (e.g., roll, pitch, and/or yaw) of the object. Some objects, such as pedestrians and animals, also have what is referred to herein as "appearance pose." Appearance pose comprises a shape and/or positioning of parts of a body (e.g., appendages, head, torso, eyes, hands, feet, etc.). As used herein, the term "pose" refers to both the "geometric pose" of an object relative to a frame of reference and, in the case of pedestrians, animals, and other objects capable of changing shape and/or positioning of parts of a body, "appearance pose." In some examples, the frame of reference is described with reference to a two- or three-dimensional coordinate system or map that describes the location of objects relative to a vehicle. However, in other examples, other frames of reference may be used.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more non-transitory computer-readable media storing instructions that, when executed by the one or more processors, cause the system to perform operations comprising:
receiving first recipient location data associated with a first delivery identifier and second recipient location data associated with a second delivery identifier;
receiving a first indication of a first locker of an autonomous delivery vehicle associated with the first delivery identifier;
receiving a second indication of a second locker of the autonomous delivery vehicle associated with the second delivery identifier;
determining a first delivery location based at least in part on the first recipient location data and the second recipient location data, wherein the first delivery location is different from the first recipient location data and the second recipient location data;
causing the autonomous delivery vehicle to drive to the first delivery location;
prior to arriving at the first delivery location, determining a delivery action performed on the autonomous delivery vehicle at the first delivery location, determining the delivery action comprising:
accessing a datastore to determine whether a stop signal associated with at least one of a determination that an item currently stored in the autonomous delivery vehicle is associated with the first delivery location, or a request for depositing an item in the autonomous delivery vehicle at the first delivery location exists, wherein an absence of the stop signal causes the autonomous delivery vehicle to drive to a next location without stopping at the first delivery location;
causing, based at least in part on the stop signal, the autonomous delivery vehicle to stop at the first delivery location for a predetermined time window in response to determining that the stop signal exists;
determining, based at least in part on the delivery action, a remaining set of items on the autonomous delivery vehicle to be delivered;
determining, after the delivery action, an updated delivery route including a second delivery location for the autonomous delivery vehicle; and
causing the autonomous delivery vehicle to drive to the second delivery location.

2. The system of claim 1, the operations further comprising: determining that:
a delivery time window associated with the first delivery location has elapsed; and
requests associated with the first delivery identifier and the second delivery identifier have been unfulfilled, the requests comprising one or more of receiving an item or depositing an item; and
causing the autonomous delivery vehicle to drive to the second delivery location, based at least in part on the determining that the delivery time window has elapsed.

3. The system of claim 1, wherein determining the first delivery location comprises:
receiving, while the autonomous delivery vehicle is traversing to a previous delivery location, updated first recipient location data associated with the first delivery identifier;
determining the first delivery location, based at least in part on the updated first recipient location data; and
transmitting, to the autonomous delivery vehicle, while the autonomous delivery vehicle is traversing to the previous delivery location, the first delivery location.

4. The system of claim 1, the operations further comprising:
determining that the autonomous delivery vehicle is traversing to the first delivery location; and
transmitting a notification to a user device associated with at least one of the first delivery identifier or the second delivery identifier, based at least in part on determining that the autonomous delivery vehicle is within at least one of a threshold distance or a threshold time of the first delivery location.

5. A method comprising:
receiving, by an item delivery system, a first recipient location associated with a first item;
receiving, by the item delivery system, a second recipient location associated with a second item;
determining, by the item delivery system, a first delivery location for an autonomous delivery vehicle based at least in part on the first recipient location and the second recipient location, wherein the first delivery location is different from the first recipient location or the second recipient location;
transmitting, by the item delivery system, the first delivery location to the autonomous delivery vehicle;

prior to arriving at the first delivery location, determining a delivery action performed on the autonomous delivery vehicle at the first delivery location, determining the delivery action comprising:
accessing a datastore to determine whether a stop signal associated with at least one of a determination that an item currently stored in the autonomous delivery vehicle is associated with the first delivery location, or a request for depositing an item in the autonomous delivery vehicle at the first delivery location exists, wherein an absence of the stop signal causes the autonomous delivery vehicle to drive to a next location without stopping at the first delivery location;
causing, based at least in part on the stop signal, the autonomous delivery vehicle to stop at the first delivery location for a predetermined time window in response to determining that the stop signal exists;
determining, based at least in part on the delivery action, a remaining set of items on the autonomous delivery vehicle to be delivered;
determining, by the item delivery system and after the delivery action, an updated delivery route including a second delivery location for the autonomous delivery vehicle; and
transmitting, by the item delivery system, the second delivery location to the autonomous delivery vehicle.

6. The method of claim 5, wherein:
receiving the first recipient location comprises receiving a first request associated with the first item, the first request including a first requested delivery time,
receiving the second recipient location comprises receiving a second request associated with the second item, the second request including a second requested delivery time, and
the first delivery location is determined based at least in part on the first requested delivery time and the second requested delivery time.

7. The method of claim 5, wherein determining the first delivery location comprises:
determining a first distance between the first delivery location and the first recipient location; and
determining a second distance between the first delivery location and the second recipient location.

8. The method of claim 5, further comprising:
causing the autonomous delivery vehicle to drive to the first delivery location;
determining that:
a delivery time window associated with the first delivery location has elapsed; and
a first request associated with the first item and a second request associated with the second item have been unfulfilled, wherein the first request and the second request comprise one or more of receiving an item or depositing an item; and
causing the autonomous delivery vehicle to drive to the second delivery location, based at least in part on the determining that the delivery time window has elapsed.

9. The method of claim 5, wherein determining the first delivery location comprises:
receiving, while the autonomous delivery vehicle is traversing to a previous delivery location, updated first recipient location data associated with the first item;
determining the first delivery location, based at least in part on the updated first recipient location data; and
transmitting, to the autonomous delivery vehicle, while the autonomous delivery vehicle is traversing to the previous delivery location, the first delivery location.

10. The method of claim 5, further comprising:
determining that the autonomous delivery vehicle is traversing to the first delivery location; and
transmitting a notification to a user device associated with at least one of the first item or the second item, based at least in part on determining that the autonomous delivery vehicle is within at least one of a threshold distance or a threshold time of the first delivery location.

11. The method of claim 5, further comprising:
receiving a third recipient location associated with a third item;
determining a third delivery location for the autonomous delivery vehicle, based at least in part on the third recipient location, wherein the third delivery location is different from the first delivery location; and
determining a first delivery time window associated with the first delivery location and a second delivery time window associated with the second delivery location, wherein the first delivery time window and the second delivery time window are determined based at least in part on the first delivery location and the second delivery location.

12. One or more non-transitory computer-readable media storing processor-executable instructions that, when executed by one or more processors, cause the one or more processors to perform operations comprising:
receiving first recipient location data associated with a first request;
receiving second recipient location data associated with a second request;
determining a first delivery location for an autonomous delivery vehicle based at least in part on the first recipient location data and the second recipient location data, wherein the first delivery location is different from the first recipient location data or the second recipient location data;
transmitting the first delivery location to the autonomous delivery vehicle;
prior to arriving at the first delivery location, determining a delivery action performed on the autonomous delivery vehicle at the first delivery location, determining the delivery action comprising:
accessing a datastore to determine whether a stop signal associated with at least one of a determination that an item currently stored in the autonomous delivery vehicle is associated with the first delivery location, or a request for depositing an item in the autonomous delivery vehicle at the first delivery location exists, wherein an absence of the stop signal causes the autonomous delivery vehicle to drive to a next location without stopping at the first delivery location;
causing, based at least in part on the stop signal, the autonomous delivery vehicle to stop at the first delivery location for a predetermined time window in response to determining that the stop signal exists;
determining, based at least in part on the delivery action, a remaining set of items on the autonomous delivery vehicle to be delivered;
determining, after the delivery action, an updated delivery route including a second delivery location for the autonomous delivery vehicle; and transmitting the second delivery location to the autonomous delivery vehicle, wherein transmitting the second delivery location to the autonomous delivery vehicle causes the autonomous delivery vehicle to traverse to the second delivery location.

13. The one or more non-transitory computer-readable media of claim 12, wherein:
the first request is associated with a first requested delivery time,
the second request is associated with a second requested delivery time, and
the first delivery location is determined based at least in part on the first requested delivery time and the second requested delivery time.

14. The one or more non-transitory computer-readable media of claim 12, wherein determining the first delivery location comprises:
determining a first distance between the first delivery location and the first recipient location data; and
determining a second distance between the first delivery location and the second recipient location data.

15. The one or more non-transitory computer-readable media of claim 12, the operations further comprising:
causing the autonomous delivery vehicle to drive to the first delivery location;
determining that:
a delivery time window associated with the first delivery location has elapsed; and
the first request and the second request have been unfulfilled, wherein the first request and the second request comprise one or more of receiving an item or depositing an item; and
causing the autonomous delivery vehicle to drive to the second delivery location, based at least in part on the determining that the delivery time window has elapsed.

16. The one or more non-transitory computer-readable media of claim 12, wherein determining the first delivery location comprises:
receiving, while the autonomous delivery vehicle is traversing to a previous delivery location, updated first recipient location data associated with the first request;
determining the first delivery location, based at least in part on the updated first recipient location data; and
transmitting, to the autonomous delivery vehicle, while the autonomous delivery vehicle is traversing to the previous delivery location, the first delivery location.

17. The one or more non-transitory computer-readable media of claim 12, the operations further comprising:
determining that the autonomous delivery vehicle is traversing to the first delivery location; and
transmitting a notification to a user device associated with at least one of the first request or the second request, based at least in part on determining that the autonomous delivery vehicle is within at least one of a threshold distance or a threshold time of the first delivery location.

18. The one or more non-transitory computer-readable media of claim 12, the operations further comprising:
determining, prior to a delivery time window associated with the first delivery location having elapsed, that the first request and the second request have been fulfilled, wherein the first request and the second request comprise one or more of receiving an item or depositing an item; and
causing the autonomous delivery vehicle to drive to the second delivery location, prior to the delivery time window elapsing, based at least in part on the determining that the first request and the second request have been fulfilled.

19. The one or more non-transitory computer-readable media of claim 12, the operations further comprising:
determining, based at least in part on the first request and the second request, a delivery time window associated with the first delivery location;
receiving, while the autonomous delivery vehicle is traversing to the first delivery location, an updated first request including an updated requested delivery time associated with a first item;
determining, based at least in part on the updated requested delivery time, an updated delivery time window associated with the first delivery location; and
transmitting, to the autonomous delivery vehicle, while the autonomous delivery vehicle is traversing to the first delivery location, the updated delivery time window.

20. The one or more non-transitory computer-readable media of claim 19, the operations further comprising:
determining, based at least in part on the updated delivery time window, an updated second delivery location for the autonomous delivery vehicle; and
causing the autonomous delivery vehicle to drive to the updated second delivery location, based at least in part on the determining that the updated delivery time window has elapsed.

\* \* \* \* \*